US009990113B2

(12) United States Patent
Alonso Ruiz et al.

(10) Patent No.: US 9,990,113 B2
(45) Date of Patent: Jun. 5, 2018

(54) DEVICES, METHODS, AND GRAPHICAL USER INTERFACES FOR MOVING A CURRENT FOCUS USING A TOUCH-SENSITIVE REMOTE CONTROL

(71) Applicant: Apple Inc., Cupertino, CA (US)

(72) Inventors: Marcos Alonso Ruiz, San Francisco, CA (US); Nicole M. Wells, San Francisco, CA (US); Justin T. Voss, Santa Clara, CA (US); Blake R. Seely, San Francisco, CA (US); Matthew D. Ricketson, San Francisco, CA (US); Henrique D. Penha, San Francisco, CA (US); Grace H. Hwang, San Francisco, CA (US); Graham R. Clarke, Mountain View, CA (US); Jeffrey L. Robbin, Los Altos, CA (US); William M. Bachman, San Jose, CA (US); Benjamin W. Keighran, Cupertino, CA (US); Jennifer L. Folse, San Francisco, CA (US); Jonathan Lochhead, Scotts Valley, CA (US); Joe R. Howard, San Jose, CA (US); Joshua K. McGlinn, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 173 days.

(21) Appl. No.: 14/866,525

(22) Filed: Sep. 25, 2015

(65) Prior Publication Data

US 2017/0068410 A1    Mar. 9, 2017

Related U.S. Application Data

(60) Provisional application No. 62/215,252, filed on Sep. 8, 2015.

(51) Int. Cl.
 *G06F 3/048* (2013.01)
 *G06F 3/0484* (2013.01)
 (Continued)

(52) U.S. Cl.
 CPC .......... *G06F 3/0484* (2013.01); *G06F 3/0416* (2013.01); *G06F 3/0482* (2013.01);
 (Continued)

(58) Field of Classification Search
 CPC .................................................. G06F 3/0484
 (Continued)

(56) References Cited

U.S. PATENT DOCUMENTS 5,367,631 A   11/1994   Levy
5,687,331 A   11/1997   Volk et al.
(Continued)

FOREIGN PATENT DOCUMENTS

AU   2015101204 A4   10/2015
EP   0 609 819 A1   8/1994
(Continued)

OTHER PUBLICATIONS

Christie et al., Remote/TV User Interface Interactions, U.S. Appl. No. 14/262,435, filed Apr. 25, 2014, 155 pages.
(Continued)

*Primary Examiner* — William Titcomb
(74) *Attorney, Agent, or Firm* — Morgan, Lewis & Bockius LLP

(57) ABSTRACT

An electronic device provides, to a display, data to present a user interface that includes: a plurality of user interface objects, and a current focus on a first user interface object. The device receives an input that corresponds to a gesture detected on a touch-sensitive surface of a user input device. The gesture includes a movement of a contact across the touch-sensitive surface followed by a lift-off of the contact
(Continued)

from the touch-sensitive surface. The gesture includes a characteristic movement distance and a characteristic movement speed. In accordance with a determination that the gesture satisfies coasting criteria, the device moves the current focus in the user interface; and decelerates movement of the current focus across the series of user interface objects at a first deceleration rate that is based on: the characteristic movement distance of the gesture, and the characteristic movement speed of the gesture.

24 Claims, 51 Drawing Sheets

(51) Int. Cl.

| | | |
|---|---|---|
| G06F 3/0487 | (2013.01) | |
| G06F 3/041 | (2006.01) | |
| G06F 3/0482 | (2013.01) | |
| G06F 3/0486 | (2013.01) | |
| H04N 21/00 | (2011.01) | |
| G06F 3/0488 | (2013.01) | |
| H04N 21/422 | (2011.01) | |
| H04M 1/725 | (2006.01) | |

(52) U.S. Cl.
CPC .......... *G06F 3/0486* (2013.01); *G06F 3/0487* (2013.01); *G06F 3/0488* (2013.01); *G06F 3/04842* (2013.01); *G06F 3/04883* (2013.01); *H04M 1/7253* (2013.01); *H04N 21/00* (2013.01); *H04N 21/42224* (2013.01); *H04M 1/72533* (2013.01); *H04M 2250/22* (2013.01)

(58) Field of Classification Search
USPC ........................................................ 715/767
See application file for complete search history.

(56) References Cited

U.S. PATENT DOCUMENTS

| | | | |
|---|---|---|---|
| 5,973,694 | A | 10/1999 | Steele et al. |
| 7,109,975 | B2 | 9/2006 | Fedorak et al. |
| 7,331,869 | B2 | 2/2008 | Blanco |
| 7,552,396 | B1 | 6/2009 | Bicheno et al. |
| 8,538,459 | B2* | 9/2013 | Choi ................. H04M 1/72566 455/412.1 |
| 8,943,036 | B1 | 1/2015 | Coudron |
| 8,963,847 | B2 | 2/2015 | Hunt |
| 8,984,436 | B1 | 3/2015 | Tseng et al. |
| 9,189,094 | B2 | 11/2015 | Morikawa et al. |
| 9,383,904 | B2* | 7/2016 | Lee ................... G06F 3/04883 |
| 9,535,594 | B1* | 1/2017 | Alonso Ruiz ......... G06F 3/0487 |
| 9,591,224 | B2* | 3/2017 | Jung ................. H04N 5/23293 |
| 9,710,136 | B2* | 7/2017 | Roh ...................... G06F 3/0484 |
| 9,778,766 | B2* | 10/2017 | Choi ...................... G06F 3/041 |
| 2001/0030667 | A1 | 10/2001 | Kelts |
| 2002/0120934 | A1 | 8/2002 | Abrahams |
| 2003/0004638 | A1 | 1/2003 | Villers et al. |
| 2004/0210851 | A1 | 10/2004 | Premchandran et al. |
| 2004/0263472 | A1 | 12/2004 | Tachikawa |
| 2005/0212757 | A1 | 9/2005 | Marvit et al. |
| 2006/0236251 | A1 | 10/2006 | Kataoka et al. |
| 2006/0268100 | A1 | 11/2006 | Karukka et al. |
| 2007/0021108 | A1 | 1/2007 | Bocking et al. |
| 2007/0055947 | A1 | 3/2007 | Ostojic et al. |
| 2007/0192734 | A1 | 8/2007 | Berstis et al. |
| 2008/0062128 | A1 | 3/2008 | Brodersen et al. |
| 2008/0104537 | A1 | 5/2008 | Scott |
| 2008/0229206 | A1 | 9/2008 | Seymour et al. |
| 2009/0007016 | A1 | 1/2009 | Lindberg et al. |
| 2009/0013254 | A1 | 1/2009 | Walker et al. |
| 2009/0121903 | A1 | 5/2009 | Misage |
| 2009/0167701 | A1 | 7/2009 | Ronkainen |
| 2009/0177989 | A1 | 7/2009 | Ma et al. |
| 2010/0042947 | A1 | 2/2010 | Ostojic et al. |
| 2010/0194682 | A1 | 8/2010 | Orr et al. |
| 2010/0231534 | A1 | 9/2010 | Chaudhri et al. |
| 2011/0148774 | A1 | 6/2011 | Pihlaja |
| 2011/0185309 | A1 | 7/2011 | Challinor et al. |
| 2011/0231798 | A1 | 9/2011 | Cok |
| 2011/0302532 | A1 | 12/2011 | Missig |
| 2012/0015693 | A1* | 1/2012 | Choi ................. H04M 1/72566 455/566 |
| 2012/0019732 | A1 | 1/2012 | Lee et al. |
| 2012/0030569 | A1 | 2/2012 | Migos et al. |
| 2012/0038571 | A1 | 2/2012 | Susani |
| 2012/0047462 | A1 | 2/2012 | Moon et al. |
| 2012/0066593 | A1 | 3/2012 | Schneider |
| 2012/0070129 | A1 | 3/2012 | Lin et al. |
| 2012/0233640 | A1 | 9/2012 | Odryna et al. |
| 2012/0331506 | A1 | 12/2012 | Arriola et al. |
| 2013/0055119 | A1 | 2/2013 | Luong |
| 2013/0097564 | A1 | 4/2013 | Morikawa et al. |
| 2013/0246932 | A1* | 9/2013 | Zaveri ..................... G06F 3/017 715/740 |
| 2013/0263251 | A1 | 10/2013 | Fleizach et al. |
| 2013/0300682 | A1* | 11/2013 | Choi ................... H04M 1/0268 345/173 |
| 2013/0307792 | A1 | 11/2013 | Andres et al. |
| 2014/0053113 | A1 | 2/2014 | Zoon et al. |
| 2014/0115522 | A1 | 4/2014 | Kataoka et al. |
| 2014/0118251 | A1 | 5/2014 | Liang et al. |
| 2014/0143733 | A1 | 5/2014 | Jung et al. |
| 2014/0176479 | A1 | 6/2014 | Wardenaar |
| 2014/0191954 | A1 | 7/2014 | Marvit et al. |
| 2014/0191983 | A1 | 7/2014 | Choi et al. |
| 2014/0240239 | A1 | 8/2014 | Takahashi et al. |
| 2014/0270708 | A1 | 9/2014 | Girgensohn et al. |
| 2014/0292685 | A1 | 10/2014 | Meegan et al. |
| 2014/0292706 | A1 | 10/2014 | Hunt et al. |
| 2014/0325368 | A1 | 10/2014 | Cragun et al. |
| 2015/0007025 | A1 | 1/2015 | Sassi et al. |
| 2015/0053753 | A1 | 2/2015 | Bystrov et al. |
| 2015/0058796 | A1 | 2/2015 | Thakur et al. |
| 2015/0074603 | A1 | 3/2015 | Abe et al. |
| 2015/0077326 | A1 | 3/2015 | Kramer et al. |
| 2015/0078634 | A1 | 3/2015 | Mankowski |
| 2015/0185877 | A1 | 7/2015 | Watanabe et al. |
| 2015/0189215 | A1 | 7/2015 | Kameoka |
| 2015/0195335 | A1 | 7/2015 | Park |
| 2015/0346984 | A1 | 12/2015 | Flint et al. |
| 2015/0358685 | A1 | 12/2015 | Adjesson |
| 2015/0370425 | A1 | 12/2015 | Chen et al. |
| 2016/0224235 | A1 | 8/2016 | Forsstrom et al. |
| 2016/0370956 | A1 | 12/2016 | Penha et al. |
| 2016/0370957 | A1 | 12/2016 | Penha et al. |
| 2016/0370976 | A1 | 12/2016 | Penha et al. |
| 2016/0370982 | A1 | 12/2016 | Penha et al. |
| 2017/0055039 | A1 | 2/2017 | Earle |
| 2017/0068430 | A1 | 3/2017 | Brown et al. |
| 2017/0068511 | A1 | 3/2017 | Brown et al. |

FOREIGN PATENT DOCUMENTS

| | | |
|---|---|---|
| EP | 0 890 910 A2 | 1/1999 |
| EP | 2 209 311 A1 | 7/2010 |
| GB | 2409017 A | 6/2005 |
| KR | 2011-0089403 A | 8/2011 |
| KR | 2011-0118802 A | 11/2011 |
| KR | 2014-0083300 A | 7/2014 |
| WO | WO 98/21645 | 5/1998 |
| WO | WO 2005/103863 A2 | 11/2005 |
| WO | WO 2009/136236 A1 | 11/2009 |
| WO | WO 2010/078523 A1 | 7/2010 |
| WO | WO 2011/100623 A2 | 8/2011 |
| WO | WO 2011/149357 A1 | 12/2011 |
| WO | WO 2011/156161 A2 | 12/2011 |
| WO | WO 2013/094991 A1 | 6/2013 |
| WO | WO 2013/169842 A2 | 11/2013 |
| WO | WO 2013/169849 A2 | 11/2013 |
| WO | WO 2013/169865 A2 | 11/2013 |
| WO | WO 2013/169875 A2 | 11/2013 |

(56) References Cited

FOREIGN PATENT DOCUMENTS

| WO | WO 2014/105278 A1 | 7/2014 |
|----|-------------------|--------|
| WO | WO 2014/105279 A1 | 7/2014 |
| WO | WO 2014/143633 A1 | 9/2014 |

OTHER PUBLICATIONS

Focus (computing)—Wikipedia, the free encyclopedia, https://en.wikipedia.org.wiki/Focus_(computing), 4 pages.

Office Action, dated Mar. 11, 2016, received in Danish Patent Application No. 201500590, which corresponds with U.S. Appl. No. 14/867,004, 9 pages.

Office Action, dated Mar. 8, 2016, received in Danish Patent Application No. 201500591, which corresponds with U.S. Appl. No. 14/868,298, 10 pages.

Office Action, dated Mar. 11, 2016, received in U.S. Appl. No. 14/866,986, 10 pages.

Notice of Allowance, dated Mar. 28, 2016, received in U.S. Appl. No. 14/867,004, 12 pages.

Office Action, dated Apr. 11, 2016, received in Danish Patent Application No. 201500583, which corresponds with U.S. Appl. No. 14/866,570, 8 pages.

Office Action, dated Apr. 7, 2016, received in Danish Patent Application No. 201500586, which corresponds with U.S. Appl. No. 14/866,986, 8 pages.

Dolby Laboratories, "Kogan KALED39SMTWA User Manual," https://assets.kogan.com/files/usermanuals/KALED39SMTWA-A, Oct. 12, 2012, 38 pages.

Notice of Allowance, dated Jul. 26, 2016, received in U.S. Appl. No. 14/867,004, 5 pages.

Office Action, dated Aug. 2, 2016, received in Australian Patent Application No. 2016100650, which corresponds with U.S. Appl. No. 14/867,004, 4 pages.

Office Action, dated Jul. 11, 2016, received in Danish Patent Application No. 201500590, which corresponds with U.S. Appl. No. 14/867,004, 3 pages.

Certificate of Examination, dated Aug. 4, 2016, received in Australian Patent Application No. 2016100651, which corresponds with U.S. Appl. No. 14/866,986, 1 page.

Office Action, dated Jul. 15, 2016, received in Danish Patent Application No. 201500591, which corresponds with U.S. Appl. No. 14/868,298, 4 pages.

Notice of Allowance, dated Jul. 29, 2016, received in U.S. Appl. No. 14/866,986, 6 pages.

Office Action, dated Aug. 29, 2016, received in Chinese Patent Application No. 201620468315.3, which corresponds with U.S. Appl. No. 14/867,004, 1 page.

Certificate of Registration, dated Aug. 29, 2016, received in German Patent Application No. 202016003233.0, which corresponds with U.S. Appl. No. 14/867,004, 3 pages.

Office Action, dated Sep. 9, 2016, received in Danish Patent Application No. 201500590, which corresponds with U.S. Appl. No. 14/867,004, 2 pages.

Office Action, dated Oct. 27, 2016, received in Danish Patent Application No. 201500590, which corresponds with U.S. Appl. No. 14/867,002, 2 pages.

Innovation (unexamined) Patent, dated Sep. 1, 2016, received in Australian Patent Application No. 2016101424, which corresponds with U.S. Appl. No. 14/866,570, 1 page.

Office Action, dated Oct. 28, 2016, received in Australian Patent Application No. 2016101424, which corresponds with U.S. Appl. No. 14/866,570, 7 pages.

Office Action, dated Sep. 19, 2016, received in Danish Patent Application No. 201500583, which corresponds with U.S. Appl. No. 14/866,570, 3 pages.

Innovation (unexamined) Patent, dated Sep. 29, 2016, received in Application No. 2016100651, which corresponds with U.S. Appl. No. 14/866,986, 1 page.

Office Action, dated Sep. 28, 2016, received in Chinese Patent Application No. 201620468752.5, which corresponds with U.S. Appl. No. 14/866,986, 1 page.

Certificate of Registration, dated Aug. 29, 2016, received in German Patent Application No. 202016003250.0, which corresponds with U.S. Appl. No. 14/866,986, 3 pages.

Office Action, dated Sep. 9, 2016, received in Danish Patent Application No. 201500591, which corresponds with U.S. Appl. No. 14/868,298, 2 pages.

Innovation (unexamined) Patent, dated Aug. 18, 2016, received in Australian Patent Application No. 2016101423, which corresponds with U.S. Appl. No. 14/866,986, 1 page.

Office Action, dated Oct. 20, 2016, received in Australian Patent Application No. 2016101423, which corresponds with U.S. Appl. No. 14/866,986, 7 pages.

Office Action, dated Sep. 19, 2016, received in Danish Patent Application No. 201500586, which corresponds with U.S. Appl. No. 14/866,986, 8 pages.

International Search Report and Written Opinion, dated Nov. 3, 2016, received in International Patent Application No. PCT/2016/033641, which corresponds with U.S. Appl. No. 14/867,004, 19 pages.

Office Action, dated Nov. 18, 2016, received in U.S. Appl. No. 14/867,004, 12 pages.

Office Action, dated Dec. 15, 2016, received in Chinese Patent Application No. 201620468315.3, which corresponds with U.S. Appl. No. 14/867,004, 1 page.

Office Action, dated Nov. 30, 2016, received in Australian Patent Application No. 2016101667, which corresponds with U.S. Appl. No. 14/868,298, 6 pages.

Office Action, dated Dec. 15, 2016, received in Chinese Patent Application No. 201620468752.5, which corresponds with U.S. Appl. No. 14/868,298, 3 page.

Notice of Allowance, dated Dec. 16, 2016, received in U.S. Appl. No. 14/872,042, 11 pages.

Corrected Notice of Allowance, dated Jan. 4, 2017, received in U.S. Appl. No. 14/872,042, 2 pages.

International Search Report and Written Opinion, dated Dec. 12, 2016, received in International Patent Application No. PCT/US2016/046412, which corresponds with U.S. Appl. No. 14/867,004, 20 pages.

International Search Report and Written Opinion, dated Jan. 19, 2017, received in International Patent Application No. PCT/US2016/046409, which corresponds with U.S. Appl. No. 14/866,570, 18 pages.

Notice of Allowance, dated Mar. 10, 2017, received in U.S. Appl. No. 14/867,004, 5 pages.

Office Action, dated Mar. 2, 2017, received in Danish Patent Appplicaiton No. 201500590, which corresponds with U.S. Appl. No. 14/867,004, 3 pages.

Office Action, dated May 30, 2017, received in Danish Patent Appplicaiton No. 201500590, which corresponds with U.S. Appl. No. 14/867,004, 2 pages.

Intent to Grant, dated Jul. 5, 2017, received in Danish Patent Appplicaiton No. 201500590, which corresponds with U.S. Appl. No. 14/867,004, 2 pages.

Notice of Allowance, dated Sep. 21, 2017, received in U.S. Appl. No. 14/866,570, 9 pages.

Office Action, dated Apr. 28, 2017, received in Australian Patent Application No. 2016101424, which corresponds with U.S. Appl. No. 14/866,570, 3 pages.

Office Action, dated Aug. 1, 2017, received in Australian Patent Application No. 2017100472, which corresponds with U.S. Appl. No. 14/866,570, 3 pages.

Intent to Grant, dated Jul. 3, 2017, received in Danish Patent Application No. 201500583, which corresponds with U.S. Appl. No. 14/866,570, 2 pages.

Office Action, dated Oct. 4, 2017, received in U.S. Appl. No. 14/868,298, 12 pages.

Office Action, dated Sep. 29, 2017, received in U.S. Appl. No. 14/872,011, 16 pages.

(56) References Cited

OTHER PUBLICATIONS

Notice of Allowance, dated Jul. 12, 2017, received in Danish Patent Application No. 201500586, which corresponds with U.S. Appl. No. 14/866,986, 2 pages.

Extended European Search Report, dated Oct. 13, 2017, received in European Patent Application No. 17175448.4, which corresponds with U.S. Appl. No. 14/867,004, 9 pages.

Office Action, dated Feb. 2, 2018, received in Australian Patent Application No. 2017200632, which corresponds with U.S. Appl. No. 14/867,004, 4 pages.

Notice of Allowance, dated Jan. 29, 2018, received in Danish Patent Application No. 201500590, which corresponds with U.S. Appl. No. 14/867,004, 2 pages.

Innovation Patent, dated Jan. 30, 2018, received in Australian Patent Application No. 2017100472, which corresponds with U.S. Appl. No. 14/866,570, 1 page.

Patent, dated Jul. 24, 2017, received in Danish Patent Application No. 201500591, which corresponds with U.S. Appl. No. 14/868,298, 5 pages.

Notice of Acceptance, dated Dec. 20, 2017, received in Australian Patent Application No. 2016318322, which corresponds with U.S. Appl. No. 14/866,986, 3 pages.

Notice of Allowance, dated Jan. 4, 2018, received in U.S. Appl. No. 14/866,570, 8 pages.

Office Action, dated Dec. 7, 2017, received in Korean Patent Application No. 2017-7033777, which corresponds with U.S. Appl. No. 14/867,004, 5 pages.

Notice of Allowance, dated Oct. 23, 2017, received in Danish Patent Application No. 201500583, which corresponds with U.S. Appl. No. 14/866,570, 2 pages.

Patent, dated Jan. 2, 2018, received in Danish Patent Application No. 201500583, which corresponds with U.S. Appl. No. 14/866,570, 2 pages.

Patent, dated Oct. 23, 2017, received in Danish Patent Application No. 201500586, which corresponds to U.S. Appl. No. 14/866,986, 7 pages.

Apple, "Final Cut Pro X: Pan Audio", https://support.apple.com/kb/PH12578?locale=en_US, Apr. 17, 2017, 4 pages.

Reddit, "I Made An Intelligent SMS Notification App that Vibrates Differently Based on the Contents" http://www.reddit.com/r/Android/comments/1uksxi/i_made_an_intelligent_sms_notification_app_that/, Jan. 6, 2014, 8 pages.

YouTube, "Hands-On With Immersion HD Integrator Hi-Fi Haptics", http://www.engadget.com, Feb. 23, 2012, 9 pages.

Webster, Customize Vibration Alert with Mumble! [App Review], http://www.androidguys.com/201401/21/customize-vibration-alerts-mumble-app-review, Jan. 21, 2014, 5 pages.

Woods, "11 Android Apps to Make Notifications More Interesting", http://www.thenextweb.com, Apr. 19, 2014, 6 pages.

Office Action, dated Oct. 17, 2017, received in European Patent Application No. 16730557.2, which corresponds with U.S. Appl. No. 14/867,004, 9 pages.

Notice of Allowance, dated Feb. 23, 2018, received in Japanese Patent Application No. 2016-558207, which corresponds with U.S. Appl. No. 14/867,004, 5 pages.

Notice of Allowance, dated Feb. 28, 2018, received in Korean Patent Application No. 2017-7033777, which corresponds with U.S. Appl. No. 14/867,004, 4 pages.

* cited by examiner

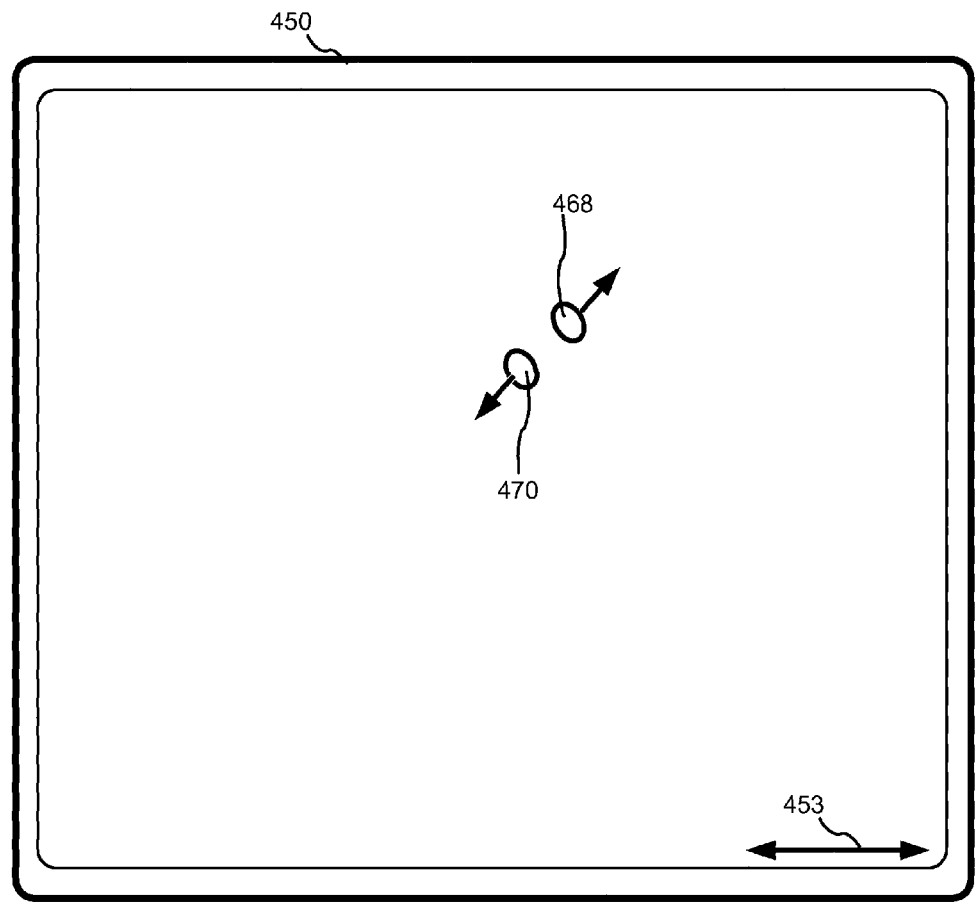
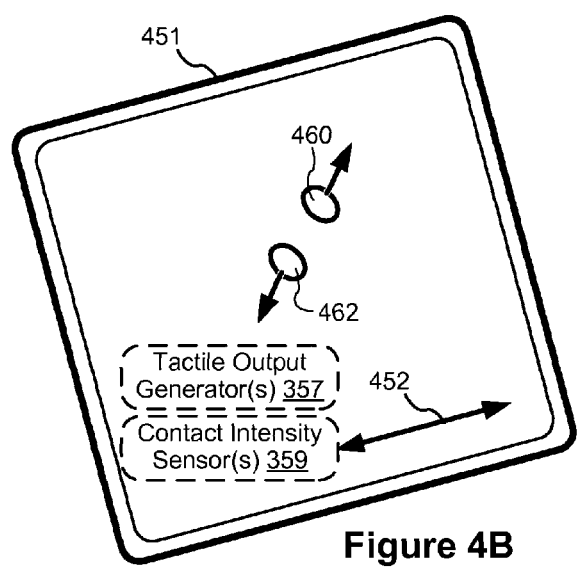
Figure 4B

600

| 602 Provide, to a display, data to present a user interface with a plurality of user interface objects. The plurality of user interface objects includes a first user interface object; and a current focus is on the first user interface object. |

↓

| 604 While the display is presenting the user interface, receive a first input that corresponds to movement of a contact across the touch-sensitive surface of the user input device. The movement of the contact across the touch-sensitive surface includes: a first component of movement of the contact that corresponds to movement along a first axis on the display, and a second component of movement of the contact that corresponds to movement along a second axis on the display that is perpendicular to the first axis. |
| 606 The first axis is a dominant axis of the movement of the contact across the touch-sensitive surface. |
| 608 The first axis is determined as the dominant axis based in part on a number of prior swipe gestures along the first axis. |
| 610 The first axis is a horizontal axis and the second axis is a vertical axis. |

↓

| 612 In response to receiving the first input that corresponds to the movement of the contact across the touch-sensitive surface of the user input device: |
| 614 In accordance with a determination that the first axis is a dominant axis: move the current focus in the user interface along the first axis by an amount that is based on the magnitude of the first component of movement; and move the current focus in the user interface along the second axis by an amount that is based on the magnitude of the second component of movement. The amount of movement of the current focus along the second axis is reduced relative to the amount of movement of the current focus along the first axis by a scaling factor that is based on a rate of movement of the contact across the touch-sensitive surface. |

612 In response to receiving the first input that corresponds to the movement of the contact across the touch-sensitive surface of the user input device:

616 In accordance with a determination that the second axis is a dominant axis: move the current focus in the user interface along the first axis by an amount that is based on the magnitude of the first component of movement; and move the current focus in the user interface along the second axis by an amount that is based on the magnitude of the second component of movement. The amount of movement of the current focus along the first axis is reduced relative to the amount of movement of the current focus along the second axis by the scaling factor that is based on the rate of movement of the contact across the touch-sensitive surface.

618 In accordance with a determination that a speed of the contact moving across the touch-sensitive surface satisfies one or more movement-component reduction criteria, a first scaling factor is used as the scaling factor; and, in accordance with a determination that the speed of the contact moving across the touch-sensitive surface does not satisfy the one or more movement-component reduction criteria, a second scaling factor, that is lower than the first scaling factor, is used as the scaling factor.

620 The speed of the contact moving across the touch-sensitive surface is determined at each detection time of a sequence of detection times based on the movement of the contact between the detection time and an immediately preceding detection time.

622 The second scaling factor is determined in accordance with the speed of the contact across the touch-sensitive surface.

624 The scaling factor increases as the speed of the contact across the touch-sensitive surface increases.

702 Provide, to a display, data to present a user interface that includes: (a) a plurality of user interface objects, and (b) a current focus on a first user interface object of the plurality of user interface objects.

704 While the display is presenting the user interface, receive an input that corresponds to a gesture detected on the touch-sensitive surface of a user input device. The gesture includes a movement of a contact across the touch-sensitive surface followed by a lift-off of the contact from the touch-sensitive surface. The gesture includes a characteristic movement distance and a characteristic movement speed.

706 In accordance with a determination that the gesture satisfies coasting criteria:

708 Move the current focus in the user interface.

710 Prior to decelerating the movement of the current focus, in accordance with the determination that the gesture satisfies the coasting criteria, the current focus moves on the display at a speed that corresponds to the speed of movement of the contact at an end of the gesture.

712 Decelerate movement of the current focus across the series of user interface objects at a first deceleration rate that is based on: the characteristic movement distance of the gesture, and the characteristic movement speed of the gesture.

Figure 7A

---
714 In accordance with a determination that a movement metric based on both the distance of the characteristic movement distance of the gesture and the characteristic movement speed of the gesture satisfies a first movement-metric threshold, decelerate movement of the current focus across the series of user interface objects using a first deceleration rate.

716 In accordance with a determination that the movement metric based on both the characteristic movement distance of the gesture across the touch-sensitive surface and the characteristic movement speed of the gesture satisfies a second movement-metric threshold, decelerate movement of the current focus across the series of user interface objects using a second deceleration rate that is distinct from the first deceleration rate.

718 In accordance with a determination that the movement metric based on both of the characteristic movement distance of the gesture and the characteristic movement speed of the gesture meets movement-metric criteria based on the first movement-metric threshold and the second movement-metric threshold, decelerate movement of the current focus across the series of user interface objects using a third deceleration rate that is distinct from the first deceleration rate and the second deceleration rate.

---

---
720 In accordance with a determination that the gesture satisfies distance criteria, distinct from the coasting criteria, move the current focus from the first user interface object contact to a user interface object that is adjacent to the first user interface object.

802 Provide, to a display, data to present a user interface that includes: a plurality of user interface objects, and a current focus on the first user interface object of the first group of user interface objects. The plurality of user interface objects includes a first group of user interface objects and a second group of user interface objects. The first group of user interface objects includes at least a first user interface object.

> 804 The first group of user interface objects corresponds to user interface objects of a first type; and the second group of user interface objects corresponds to user interface objects of a second type that is distinct from the first type.

806 While the display is presenting the user interface that includes the plurality of user interface objects, receive a first input that corresponds to a first user input on the user input device.

808 In response to receiving the first input and in accordance with a determination that the first user input on the user input device corresponds to a request to move the current focus to a user interface object in the second group of user interface objects:

> 810 Determine a projection of the first user interface object in a direction on the display that corresponds to a direction of the first user input on the user input device.

> 812 Identify one or more user interface objects that overlap with the projection of the first user interface object in the direction on the display that corresponds to the direction of the first user input on the user input device.

> 814 Move the current focus to a second user interface object of the one or more identified user input objects.

808 In response to receiving the first input and in accordance with a determination that the first user input on the user input device corresponds to a request to move the current focus to a user interface object in the second group of user interface objects:

(A)

816 In response to receiving the first input and in accordance with the determination that the first user input on the user input device corresponds to a request to move the current focus to a user interface object in the second group of user interface objects, select the second user interface object of the one or more identified user interface objects as a destination of the current focus.

818 The second user interface object of the one or more identified user interface objects is selected based on a distance between the first user interface object and the second user interface object.

820 The second user interface object of the one or more identified user interface objects is selected as a destination of the current focus in response to the first user input.

(B)

822 The first group of user interface objects is arranged in a first sequence; the first user interface object is located at a position other than a first position in the first sequence; the second group of user interface objects is arranged in a second sequence; the second user interface object is located at a position, in the second sequence, that is distinct from the position of the first user interface object in the first sequence. After moving the current focus to the second user interface object, while the current focus is on the second user interface object of the second group of user interface objects, receive a second input that corresponds to a second user input on the user input device; and, in response to receiving the second input and in accordance with a determination that the second user input on the user input device corresponds to a request to move the current focus to a user interface object in the first group of user interface objects, move the current focus back to the first user interface object.

Figure 8B

824 The user input device is a remote user input device that includes a touch-sensitive surface; and the first user input includes a movement of a contact across the touch-sensitive surface.

826 Determine whether the movement of the contact exceeds predefined movement criteria; and, in response to determining that a distance of the movement of the contact exceeds the predefined movement criteria: move the current focus to the second user interface object; and tilt the second user interface object in accordance with a distance of the movement of the contact that exceeds the predefined movement criteria.

828 The current focus moves to the second user interface object in accordance with a scaled movement of the contact across the touch-sensitive surface.

Figure 8C

DEVICES, METHODS, AND GRAPHICAL USER INTERFACES FOR MOVING A CURRENT FOCUS USING A TOUCH-SENSITIVE REMOTE CONTROL

RELATED APPLICATIONS

This application claims priority to U.S. Provisional Application Ser. No. 62/215,252, filed Sep. 8, 2015, entitled "Devices, Methods, and Graphical User Interfaces for Moving a Current Focus Using a Touch-Sensitive Remote Control," which is incorporated by reference herein in its entirety.

This relates to U.S. Provisional Application Ser. No. 62/181,698, filed Jun. 18, 2015, entitled "Device, Method, and Graphical User Interface for Navigating Media Content;" U.S. Provisional Application Ser. No. 62/215,644, filed Sep. 8, 2015, entitled "Device, Method, and Graphical User Interface for Navigating Media Content;" and U.S. Provisional Application Ser. No. 62/215,244, filed Sep. 8, 2015, entitled "Device, Method, and Graphical User Interface for Providing Audiovisual Feedback," all of which are incorporated by reference herein in their entireties.

TECHNICAL FIELD

This relates generally to electronic devices in communication with touch-sensitive remote controls, including but not limited to electronic devices in communication with touch-sensitive remote controls and display devices.

BACKGROUND

Displays such as television displays are widely used for viewing information and entertainment. For example, televisions are typically used to watch movies and television programs. Remote controls are commonly used to interact with digital media players, televisions, and/or set-top boxes that control what is presented on the display. For example, a conventional remote control typically includes buttons to allow a user to control presentation of media content (e.g., a play button, a pause button, a stop button, a fast forward button, and a reverse button). Remote controls are also used to interact with user interface objects on displays. For example, remote controls are used to move a current focus among application icons, channel icons, and/or content icons on a television display. Activation of these icons leads to the display of a corresponding application, channel, or content on the display.

But existing devices and methods for moving a current focus on displays such as television displays are cumbersome and inefficient.

SUMMARY

Accordingly, disclosed herein are electronic devices with faster, more efficient methods and interfaces for moving a current focus on displays such as television displays. Such methods and interfaces optionally complement or replace conventional methods for interacting with user interface objects on displays. Such methods and interfaces reduce the number, extent, and/or nature of the inputs from a user and produce a more efficient human-machine interface.

The above deficiencies and other problems associated with user interfaces for electronic devices are reduced or eliminated by the disclosed devices. In some embodiments, the device is a digital media player. In some embodiments, the device is a television or set-top box. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad or is in communication with a touchpad. In some embodiments, the device has a touch-sensitive surface or touch-sensitive display (also known as a "touch screen" or "touch-screen display") or is in communication with a touch-sensitive surface or touch-sensitive display. In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Executable instructions for performing these functions are, optionally, included in a transitory computer readable storage medium or other computer program product configured for execution by one or more processors.

In accordance with some embodiments, a method is performed at an electronic device with one or more processors and memory. The device is in communication with a display and a user input device that includes a touch-sensitive surface. The method includes, providing, to the display, data to present a user interface with a plurality of user interface objects. The plurality of user interface objects includes a first user interface object, and a current focus is on the first user interface object. The method also includes, while the display is presenting the user interface, receiving a first input that corresponds to movement of a contact across the touch-sensitive surface of the user input device. The movement of the contact across the touch-sensitive surface includes a first component of movement of the contact that corresponds to movement along a first axis on the display, and a second component of movement of the contact that corresponds to movement along a second axis on the display that is perpendicular to the first axis. The method further includes, in response to receiving the first input that corresponds to the movement of the contact across the touch-sensitive surface of the user input device, in accordance with a determination that the first axis is a dominant axis: moving a current focus in the user interface along the first axis by an amount that is based on the magnitude of the first component of movement; and moving the current focus in the user interface along the second axis by an amount that is based on the magnitude of the second component of movement. The amount of movement of the current focus along the second axis is reduced relative to the amount of movement of the current focus along the first axis by a scaling factor that is based on a rate of movement of the contact across the touch-sensitive surface. The method further includes, in accordance with a determination that the second axis is a dominant axis: moving a current focus in the user interface along the first axis by an amount that is based on the magnitude of the first component of movement; and moving the current focus in the user interface along the second axis by an amount that is based on the magnitude of the second component of movement. The amount of movement of the current focus along the first axis is reduced relative to the amount of movement of the current focus along the second first by the scaling factor that is based on the rate of movement of the contact across the touch-sensitive surface.

In accordance with some embodiments, a method is performed at an electronic device with one or more processors and memory. The device is in communication with a display and a user input device that includes a touch-sensitive surface. The method includes, providing, to the display, data to present a user interface that includes: (a) a plurality of user interface objects, and (b) a current focus on a first user interface object of the plurality of user interface objects. The method also includes, while the display is presenting the user interface, receiving an input that corresponds to a gesture detected on the touch-sensitive surface of the user input device. The gesture includes a movement of a contact across the touch-sensitive surface followed by a lift-off of the contact from the touch-sensitive surface. The gesture includes a characteristic movement distance and a characteristic movement speed. The method further includes, in accordance with a determination that the gesture satisfies coasting criteria: moving the current focus in the user interface; and, decelerating movement of the current focus across the series of user interface objects at a first deceleration rate that is based on the characteristic movement distance of the gesture, and the characteristic movement speed of the gesture.

In accordance with some embodiments, a method is performed at an electronic device with one or more processors and memory. The device is in communication with a display and a user input device (e.g., a user input device that includes a touch-sensitive surface). The method includes, providing, to the display, data to present a user interface that includes: a plurality of user interface objects. The plurality of user interface objects includes a first group of user interface objects and a second group of user interface objects, and the first group of user interface objects includes at least a first user interface object. The user interface also includes a current focus on the first user interface object of the first group of user interface objects. The method also includes, while the display is presenting the user interface that includes the plurality of user interface objects, receiving a first input that corresponds to a first user input on the user input device; in response to receiving the first input and in accordance with a determination that the first user input on the user input device corresponds to a request to move the current focus to a user interface object in the second group of user interface objects: determining a projection of the first user interface object in a direction on the display that corresponds to a direction of the first user input on the user input device; identifying one or more user interface objects that overlap with the projection of the first user interface object in the direction on the display that corresponds to the direction of the first user input on the user input device; and, moving the current focus to a second user interface object of the one or more identified user input objects.

In accordance with some embodiments, an electronic device is in communication with a display unit that is configured to display user interfaces. The electronic device includes a processing unit. The processing unit is configured to provide, to the display unit, data to present a user interface with a plurality of user interface objects. The plurality of user interface objects includes a first user interface object; and a current focus is on the first user interface object. The processing unit is also configured to, while the display is presenting the user interface, receive a first input that corresponds to movement of a contact across the touch-sensitive surface of the user input device. The movement of the contact across the touch-sensitive surface includes: a first component of movement of the contact that corresponds to movement along a first axis on the display, and a second component of movement of the contact that corresponds to movement along a second axis on the display that is perpendicular to the first axis. The processing unit is also configured to, in response to receiving the first input that corresponds to the movement of the contact across the touch-sensitive surface of the user input device: in accordance with a determination that the first axis is a dominant axis: move a current focus in the user interface along the first axis by an amount that is based on the magnitude of the first component of movement; and move the current focus in the user interface along the second axis by an amount that is based on the magnitude of the second component of movement. The amount of movement of the current focus along the second axis is reduced relative to the amount of movement of the current focus along the first axis by a scaling factor that is based on a rate of movement of the contact across the touch-sensitive surface. The processing unit is also configured to, in accordance with a determination that the second axis is a dominant axis: move a current focus in the user interface along the first axis by an amount that is based on the magnitude of the first component of movement; and move the current focus in the user interface along the second axis by an amount that is based on the magnitude of the second component of movement. The amount of movement of the current focus along the first axis is reduced relative to the amount of movement of the current focus along the second first by the scaling factor that is based on the rate of movement of the contact across the touch-sensitive surface.

In accordance with some embodiments, an electronic device is in communication with a display unit that is configured to display user interfaces. The electronic device includes a processing unit. The processing unit is configured to provide, to the display unit, data to present a user interface that includes: (a) a plurality of user interface objects, and (b) a current focus on a first user interface object of the plurality of user interface objects. The processing unit is also configured to, while the display is presenting the user interface, receive an input that corresponds to a gesture detected on the touch-sensitive surface of the user input device. The gesture includes a movement of a contact across the touch-sensitive surface followed by a lift-off of the contact from the touch-sensitive surface. The gesture includes a characteristic movement distance and a characteristic movement speed. The processing unit is also configured to, in accordance with a determination that the gesture satisfies coasting criteria: move the current focus in the user interface; and, decelerate movement of the current focus across the series of user interface objects at a first deceleration rate that is based on: the characteristic movement distance of the gesture, and the characteristic movement speed of the gesture.

In accordance with some embodiments, an electronic device is in communication with a display unit that is configured to display user interfaces. The electronic device includes a processing unit. The processing unit is configured to provide, to the display unit, data to present a user interface that includes: a plurality of user interface objects. The plurality of user interface objects includes a first group of user interface objects and a second group of user interface objects; and the first group of user interface objects includes at least a first user interface object. The user interface also includes a current focus on the first user interface object of the first group of user interface objects. The processing unit is also configured to, while the display is presenting the user interface that includes the plurality of user interface objects, receive a first input that corresponds to a first user input on the user input device; in response to receiving the first input and in accordance with a determination that the first user input on the user input device corresponds to a request to move the current focus to a user interface object in the second group of user interface objects: determine a projection of the first user interface object in a direction on the display that corresponds to a direction of the first user input on the user input device; identify one or more user interface objects that overlap with the projection of the first user interface object in the direction on the display that corresponds to the direction of the first user input on the user input device; and, move the current focus to a second user interface object of the one or more identified user input objects.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium (e.g., a non-transitory computer readable storage medium, or alternatively, a transitory computer readable storage medium) has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices in communication with displays are provided with faster, more efficient methods and interfaces for moving a current focus on the displays (e.g., television displays), thereby increasing the effectiveness, efficiency, and user satisfaction with such devices. Such methods and interfaces may complement or replace conventional methods for interacting with user interface objects on displays, such as television displays.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6B are flow diagrams illustrating a method of moving a current focus in accordance with some embodiments.

FIGS. 7A-7C are flow diagrams illustrating a method of moving a current focus in accordance with some embodiments.

FIGS. 8A-8C are flow diagrams illustrating a method of moving a current focus in accordance with some embodiments.

DESCRIPTION OF EMBODIMENTS

Figure 1A:
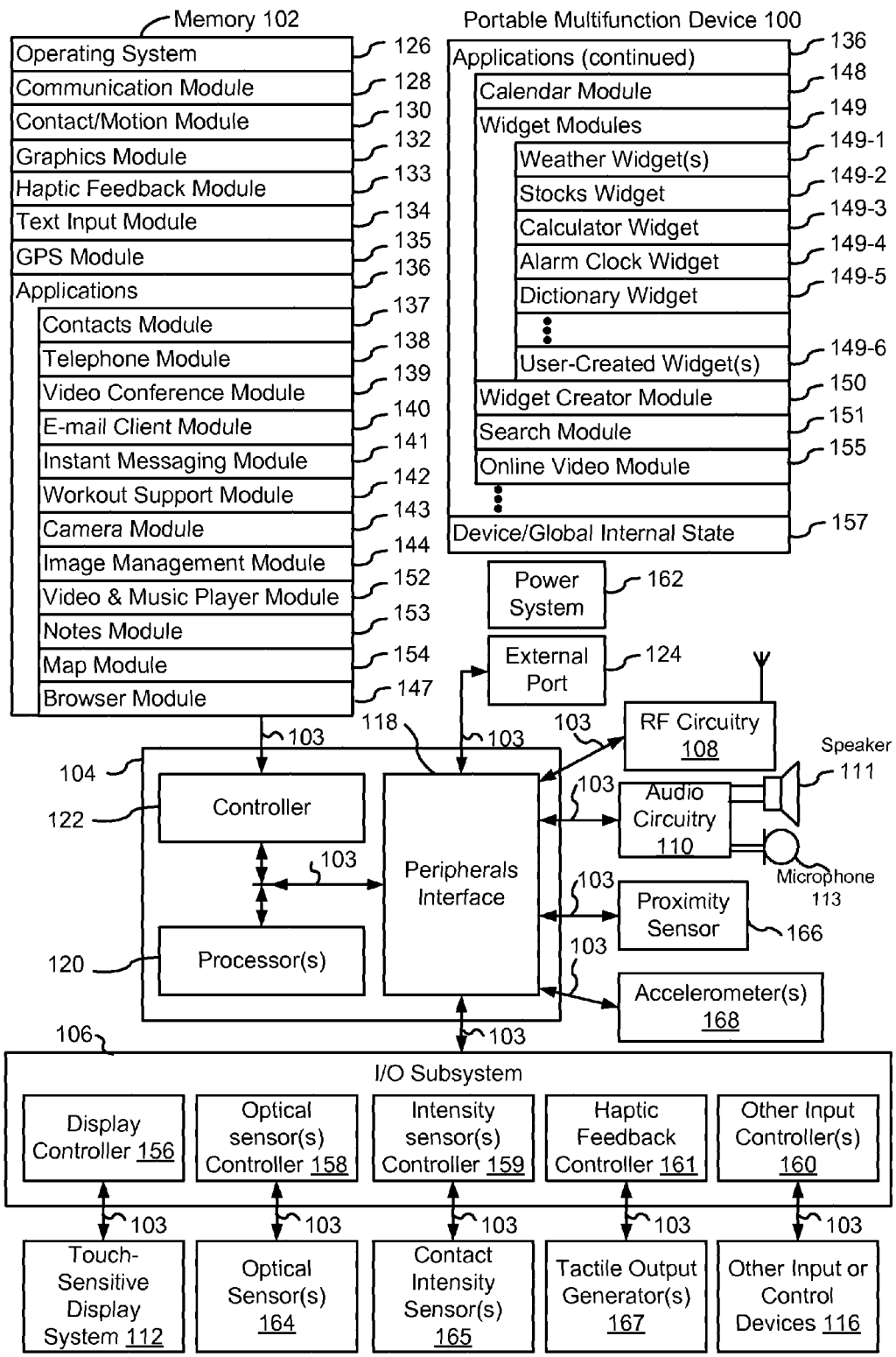
FIG. 1A is a block diagram illustrating a portable multifunction device with a touch-sensitive display in accordance with some embodiments.

Remote controls are often used to navigate, select, and interact with content and applications on displays, such as television displays. For example, a conventional remote control typically includes a play button, a pause button, a stop button, a fast forward button, and a reverse button to allow a user to control playback of media content.

In addition, certain remote controls include arrow keys to move a current focus among user interface objects on the display. However, when a user wants to move the current focus over multiple user interface objects, the user needs to press the arrow keys multiple times, which is slow, cumbersome, and inefficient. In some embodiments described herein, inputs that correspond to touch inputs on remote controls with touch-sensitive surfaces are used to move the current focus faster and more efficiently. For remote controls with touch-sensitive surfaces, however, inputs on touch-sensitive surfaces can move the current focus to unintended locations, because inputs on the touch-sensitive surfaces often do not align perfectly with a displayed grid of user interface objects (e.g., a "horizontal" swipe on a touch-sensitive surface may not be perfectly horizontal). By separating the movement of an input on a touch-sensitive surface into horizontal and vertical components and reducing the scaling of a non-dominant component relative to a dominant component, movement of the current focus to an unintended location on the display is reduced.

In addition, controlling how the current focus moves (e.g., glides) after lift-off of an input on a touch-sensitive surface further facilitates more efficient navigation through multiple user interface objects. Devices and methods for selecting deceleration rates based on user inputs and devices and methods for accurate movement of the current focus (e.g., devices and methods for moving the current focus to an adjacent user interface object) described herein further improve accuracy and efficiency when navigating through user interface objects by moving a current focus on a display using a remote control.

Furthermore, conventional devices and methods for moving a current focus on a display are not readily configured for navigating among user interface objects of different sizes and/or user interface objects located in a non-uniform pattern. Some of the embodiments described herein use a projection of a user interface object that has the current focus to identify a destination user interface object, which works with user interface objects of different sizes and/or arrangements, thereby improving efficiency and accuracy when moving the current focus through user interface objects of different sizes and/or at non-uniform locations.

Below, FIGS. 1A-1B, 2, and 3 provide a description of exemplary devices. FIGS. 4A-4C, and 5A-5GG, illustrate exemplary user interfaces for moving a current focus. FIGS. 6A-6B, 7A-7C, and 8A-8C are flow diagrams illustrating methods of moving a current focus. The user interfaces in FIGS. 5A-5GG are used to illustrate the processes in FIGS. 6A-6B, 7A-7C, and 8A-8C.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, first video information could be termed second video information, and, similarly, second video information could be termed first video information, without departing from the scope of the various described embodiments. The first video information and the second video information are both video information, but they are not the same video information, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a digital media player, such as Apple TV® from Apple Inc. of Cupertino, Calif. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer. In some embodiments, the desktop computer has a touch-sensitive surface (e.g., a touch-screen display and/or a touchpad).

In the discussion that follows, an electronic device that communicates with and/or includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more non-transitory computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
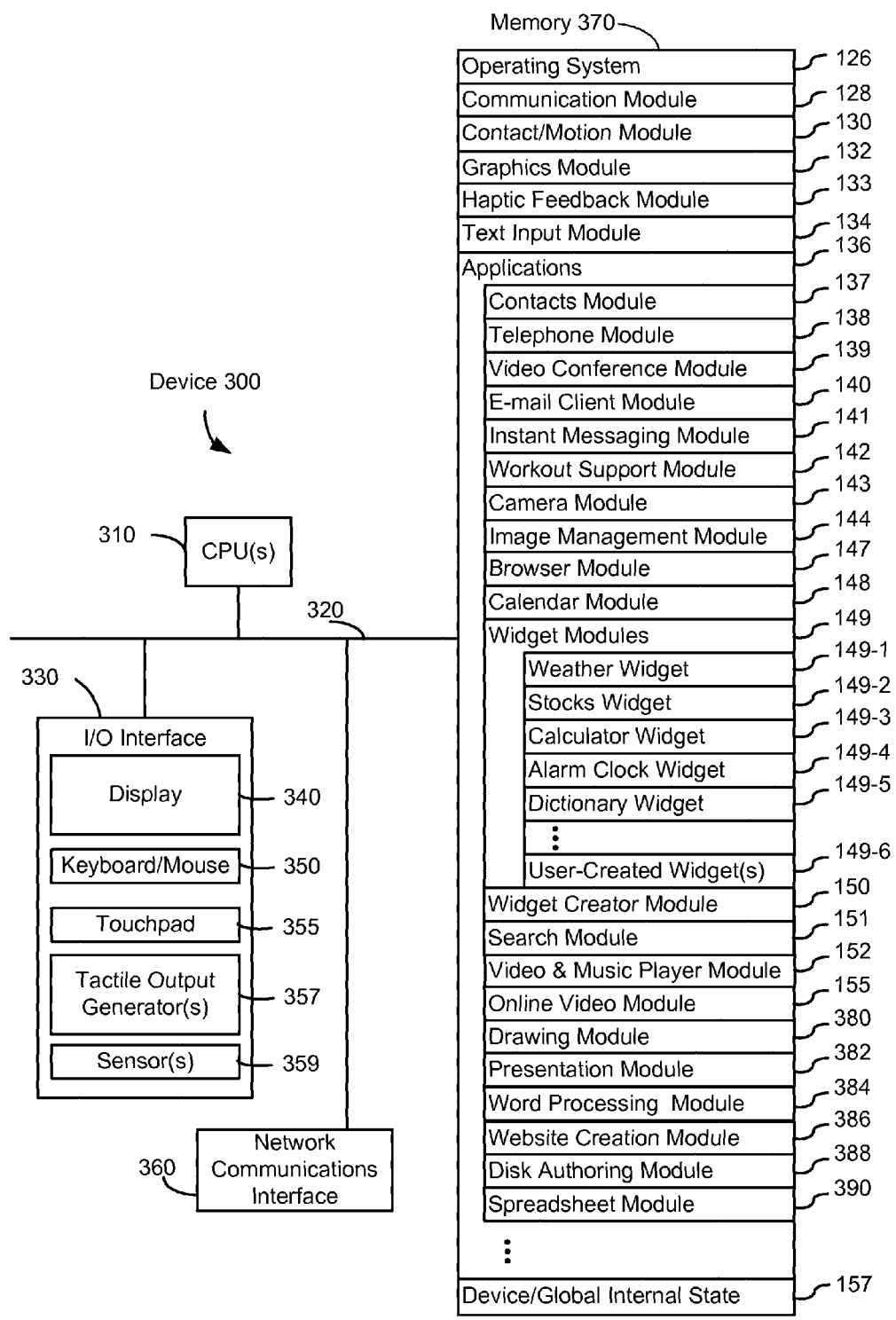
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
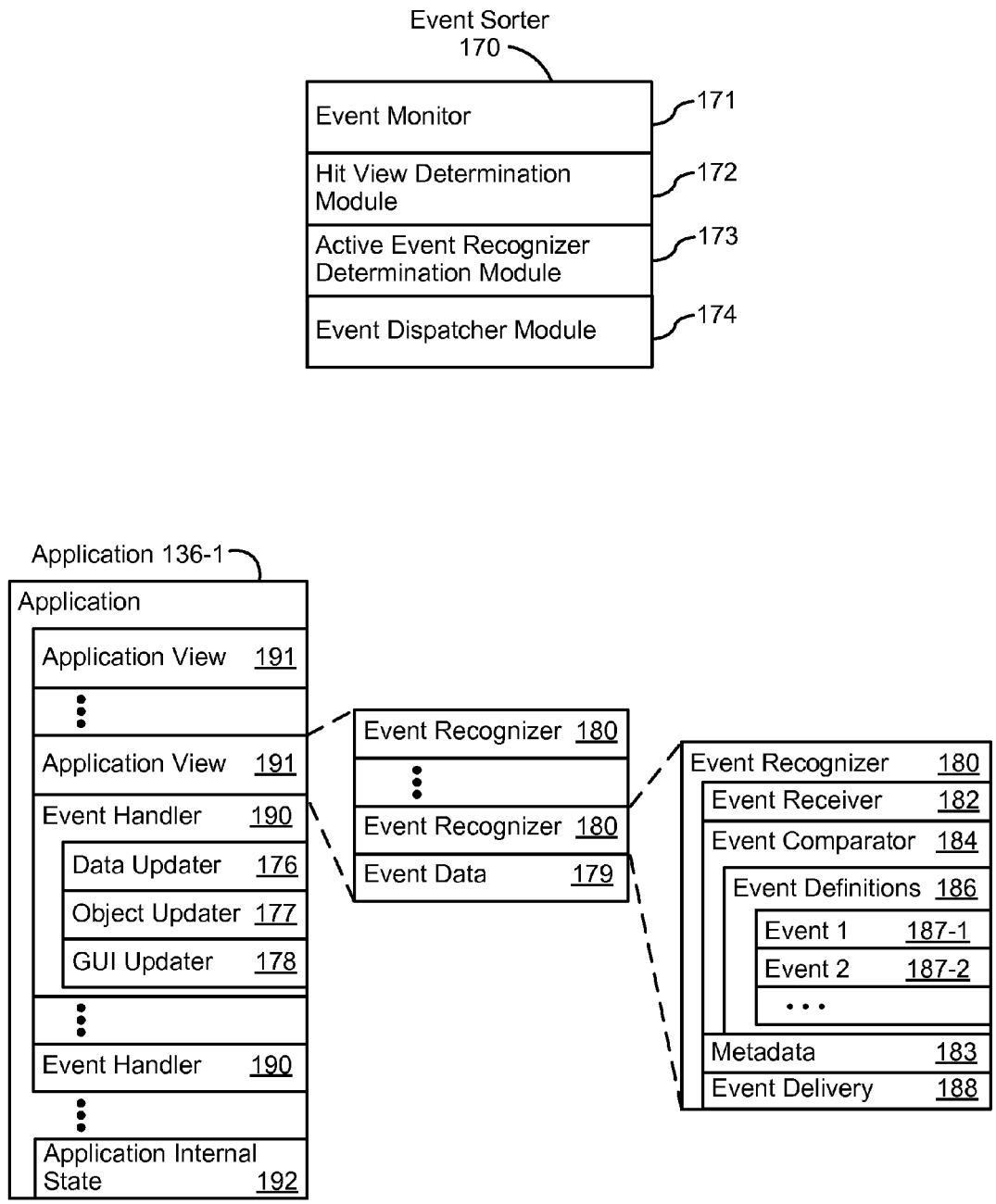
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, respective event recognizer 180 activates event handler 190 associated with an event when one or more particular sub-events of an event are recognized. In some embodiments, respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
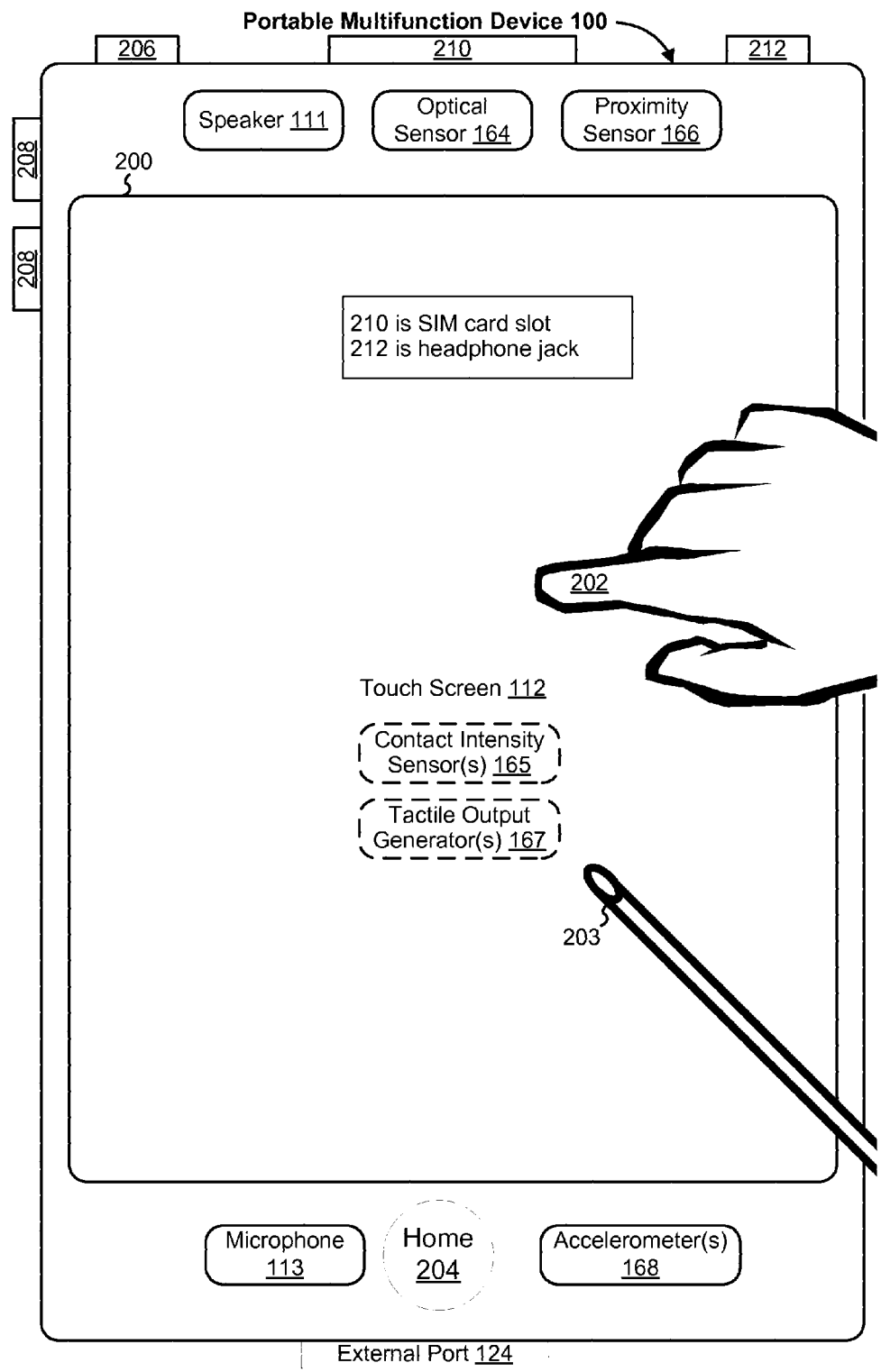
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
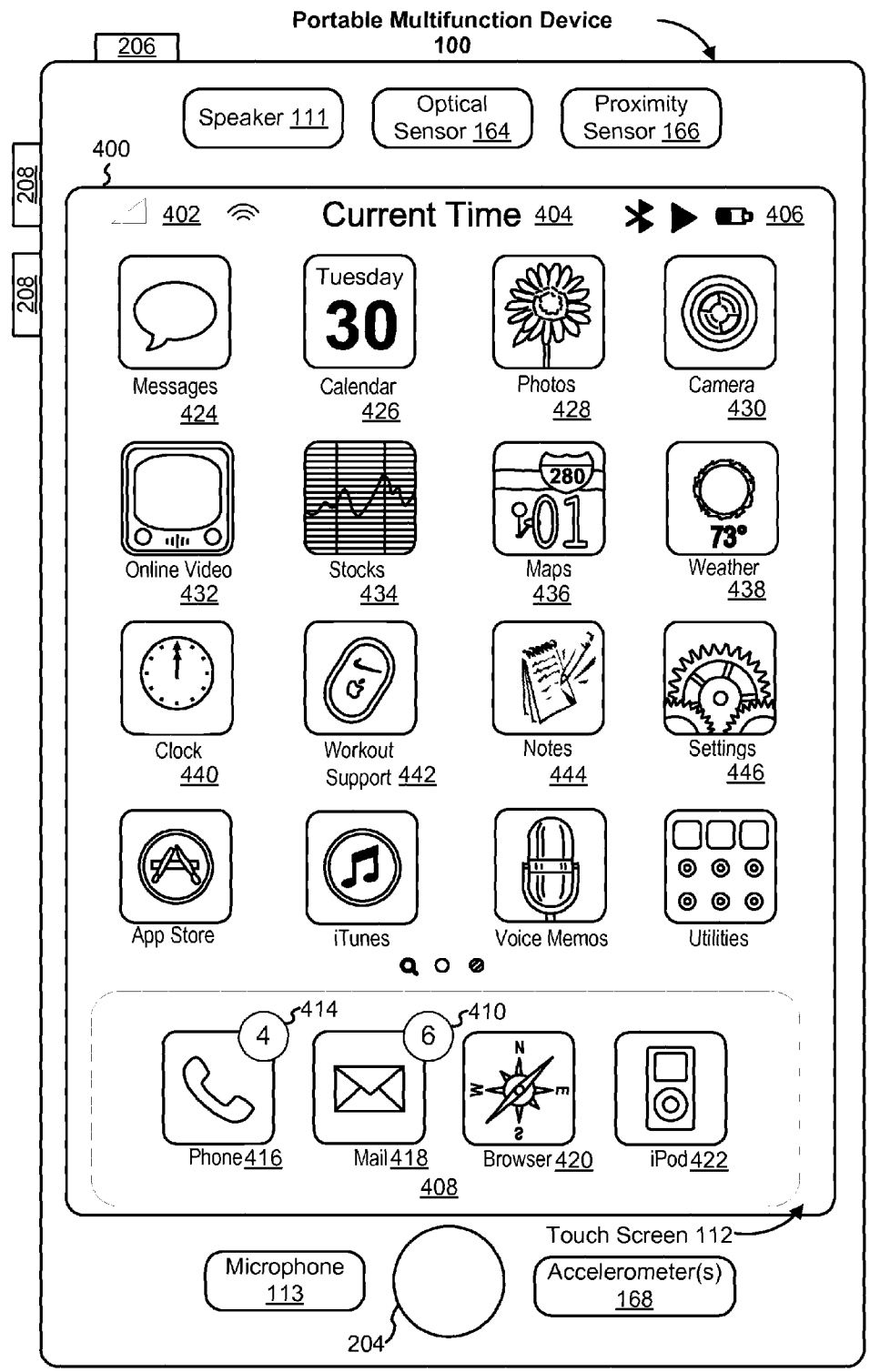
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
a Bluetooth indicator;
Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input), or input of another type, on the same device (e.g., a button press). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, the focus selector is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). The focus selector is also called herein "current focus."

Figure 4C:
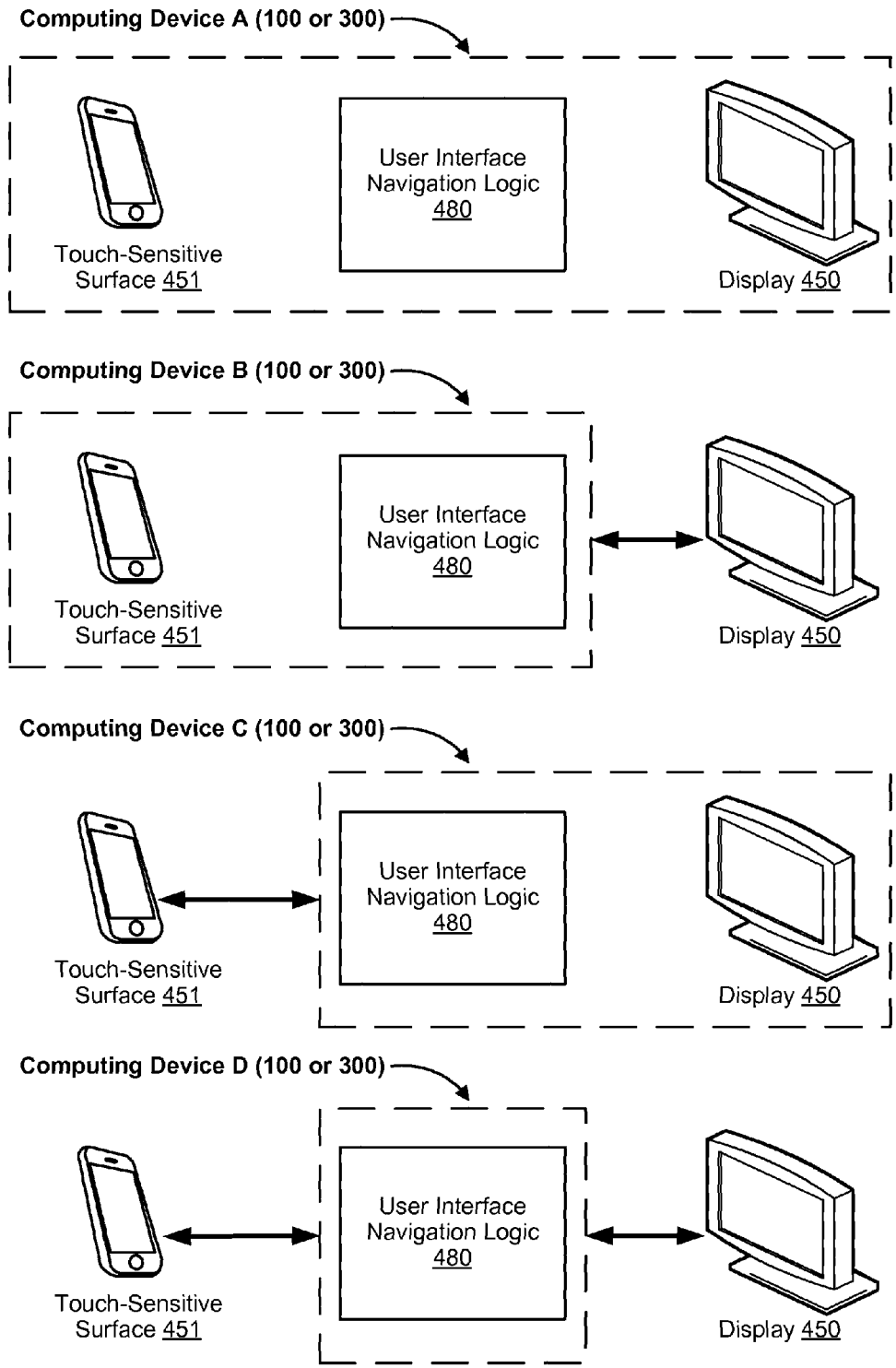
FIG. 4C illustrates exemplary electronic devices that are in communication with a display and touch-sensitive surface where, for at least a subset of the electronic devices the display and/or touch-sensitive surface is integrated into the electronic device in accordance with some embodiments.

FIG. 4C illustrates exemplary electronic devices that are in communication with display 450 and touch-sensitive surface 451. For at least a subset of the computing devices, display 450 and/or touch-sensitive surface 451 is integrated into the computing device in accordance with some embodiments. While the examples described in greater detail below are described with reference to touch-sensitive surface 451 and display 450 that are in communication with a computing device (e.g., portable multifunction device 100 in FIGS. 1A-1B or device 300 in FIG. 3), it should be understood that in accordance with some embodiments, the touch-sensitive surface and/or the display are integrated with the computing device, while in other embodiments one or more of the touch-sensitive surface and the display are separate from the computing device. Additionally, in some embodiments the computing device has an integrated display and/or an integrated touch-sensitive surface and is in communication with one or more additional displays and/or touch-sensitive surfaces that are separate from the computing device.

In some embodiments, all of the operations described below with reference to FIGS. 5A-5GG are performed on a single computing device with user interface navigation logic 480 (e.g., Computing Device A described below with reference to FIG. 4C). However, it should be understood that frequently multiple different computing devices are linked together to perform the operations described below with reference to FIGS. 5A-5GG (e.g., a computing device with user interface navigation logic 480 communicates with a separate computing device with a display 450 and/or a separate computing device with a touch-sensitive surface 451). In any of these embodiments, the computing device that is described below with reference to FIGS. 5A-5GG is the computing device (or devices) that contain(s) the user interface navigation logic 480. Additionally, it should be understood that the user interface navigation logic 480 could be divided between a plurality of distinct modules or computing devices in various embodiments; however, for the purposes of the description herein, the user interface navigation logic 480 will be primarily referred to as residing in a single computing device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on the display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the user interface navigation logic 480).

In some embodiments, both the display 450 and the touch-sensitive surface 451 are integrated with the computing device (e.g., Computing Device A in FIG. 4C) that contains the user interface navigation logic 480. For example, the computing device may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, the touch-sensitive surface 451 is integrated with the computing device while the display 450 is not integrated with the computing device (e.g., Computing Device B in FIG. 4C) that contains the user interface navigation logic 480. For example, the computing device may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the computing device while the touch-sensitive surface 451 is not integrated with the computing device (e.g., Computing Device C in FIG. 4C) that contains the user interface navigation logic 480. For example, the computing device may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 451 is integrated with the computing device (e.g., Computing Device D in FIG. 4C) that contains the user interface navigation logic 480. For example, the computing device may be a stand-alone computing device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 450. In some embodiments, the audio system (e.g., a stereo system) is a stand-alone system that is separate from the computing device and the display 450.

User Interfaces and Associated Processes

Attention is now directed towards embodiments of user interfaces ("UI") and associated processes that may be implemented with an electronic device that communicates with and/or includes a display and a touch-sensitive surface, such as one of Computing Devices A-D in FIG. 4C.

FIGS. 5A-5GG illustrate exemplary user interfaces for moving a current focus in accordance with some embodiments. The user interfaces in these figures are used to illustrate the processes described below, including the processes in FIGS. 6A-6B, 7A-7C, and 8A-8C. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A. Although some of the examples which will follow will be given with reference to inputs on a remote user input device (e.g., a remote control) that is separate from the device, in some embodiments, the device includes an integrated user input device (e.g., a trackpad).

Figure 5A:
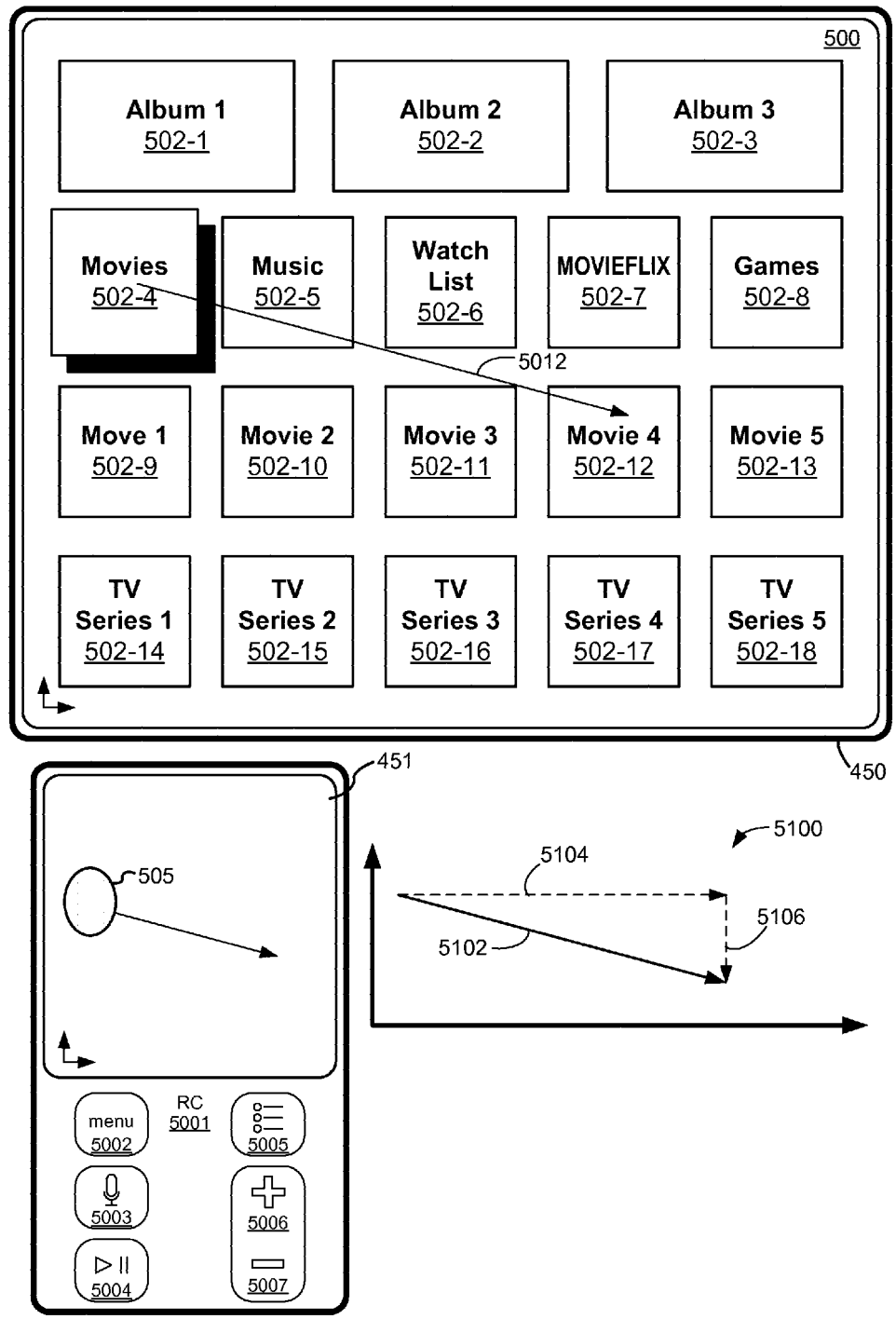
FIGS. 5A-5GG illustrate exemplary user interfaces for moving a current focus in accordance with some embodiments.

FIG. 5A illustrates display 450 and corresponding remote control 5001 (e.g., that both communicate with device 100 or 300). In some embodiments, remote control 5001 has touch-sensitive surface 451. In some embodiments, remote control 5001 also has one or more buttons or affordances, such as menu button 5002, microphone button 5003, play/pause button 5004, watch list button 5005, volume increase button 5006, and/or volume decrease button 5007. In some embodiments, menu button 5002, or an analogous affordance, allows home screen user interface 500 to be displayed on display 450 (e.g., pressing menu button 5002, while display 450 displays another user interface, initiates replacing display of the another user interface with home screen user interface 500). In some embodiments, microphone button 5003, or an analogous affordance, allows a user to provide verbal commands or voice entry to the device (e.g., device 100 or 300). In some embodiments, play/pause button 5004 is used to play or pause audio or visual media portrayed on display 450 by device (e.g., device 100 or 300). In some embodiments, watch list button 5005 allows a watch list user interface to be displayed on display 450. In some embodiments, a watch list user interface provides a user with a plurality of audio/visual media items to play using device (e.g., audio/visual media items previously selected by a user for play using device 100 or 300).

FIG. 5A illustrates home screen user interface 500 (also called herein "home screen"), displayed on display 450. Home screen 500 includes a plurality of user interface objects, such as icons that correspond to various media content items (e.g., album icons 502-1 through 502-3, application icons 502-4 through 502-8, movie icons 502-9 through 502-13, and television content icons 502-14 through 502-18, etc.). Each icon, when activated (e.g., by a tap gesture on touch-sensitive surface 451 while the focus selector (also called a current focus) is on the respective icon), initiates displaying a user interface of a corresponding application, channel, content item, or group of content items on display 450.

FIG. 5A also illustrates that a current focus is on icon 502-4. In FIG. 5A, icon 502-4 with the current focus is visually distinguished from the other icons (e.g., icon 502-4 is enlarged and a shadow is also displayed to provide a visual perception that icon 502-4 is standing out from display 450).

Figure 5B:
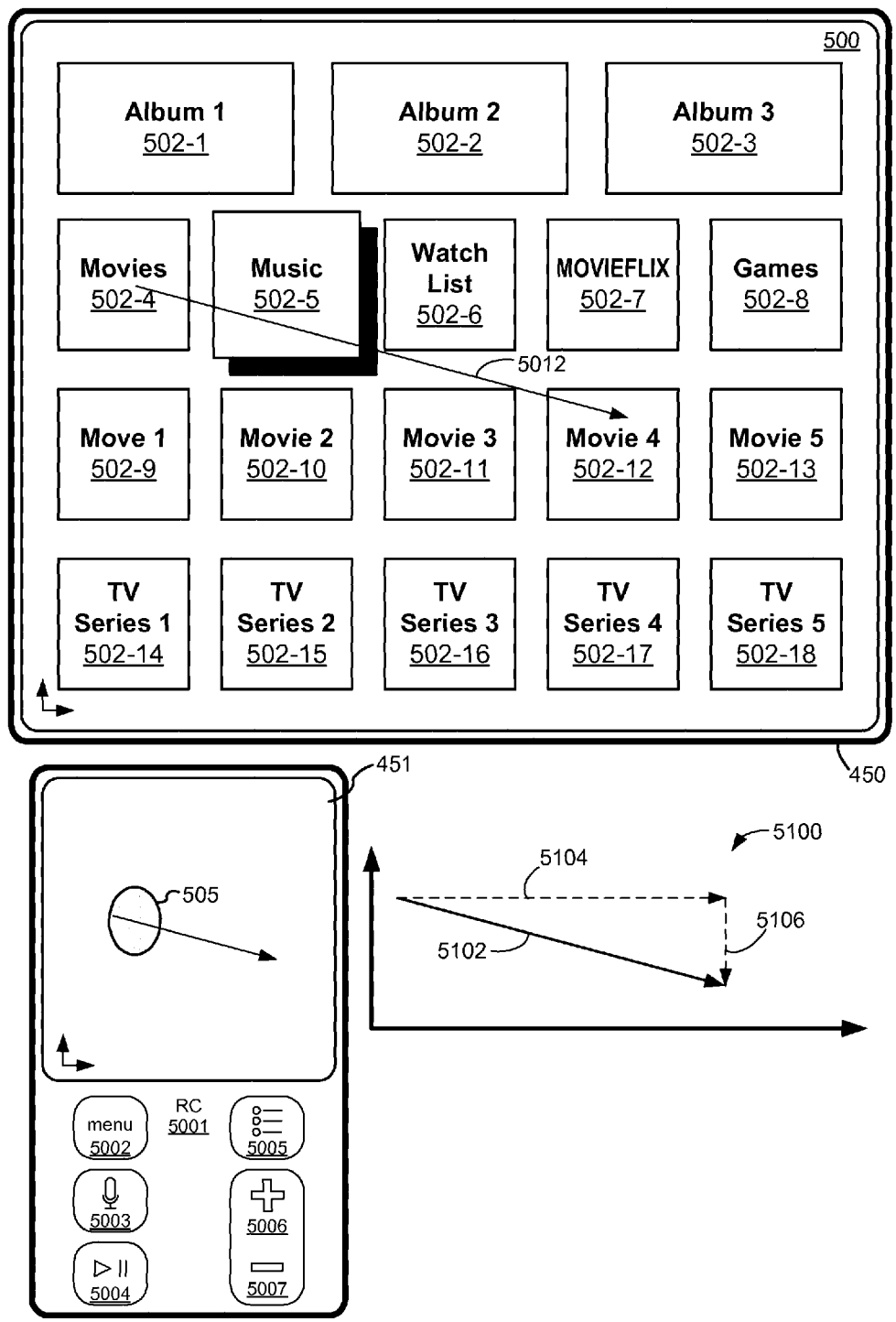
Figure 5C:
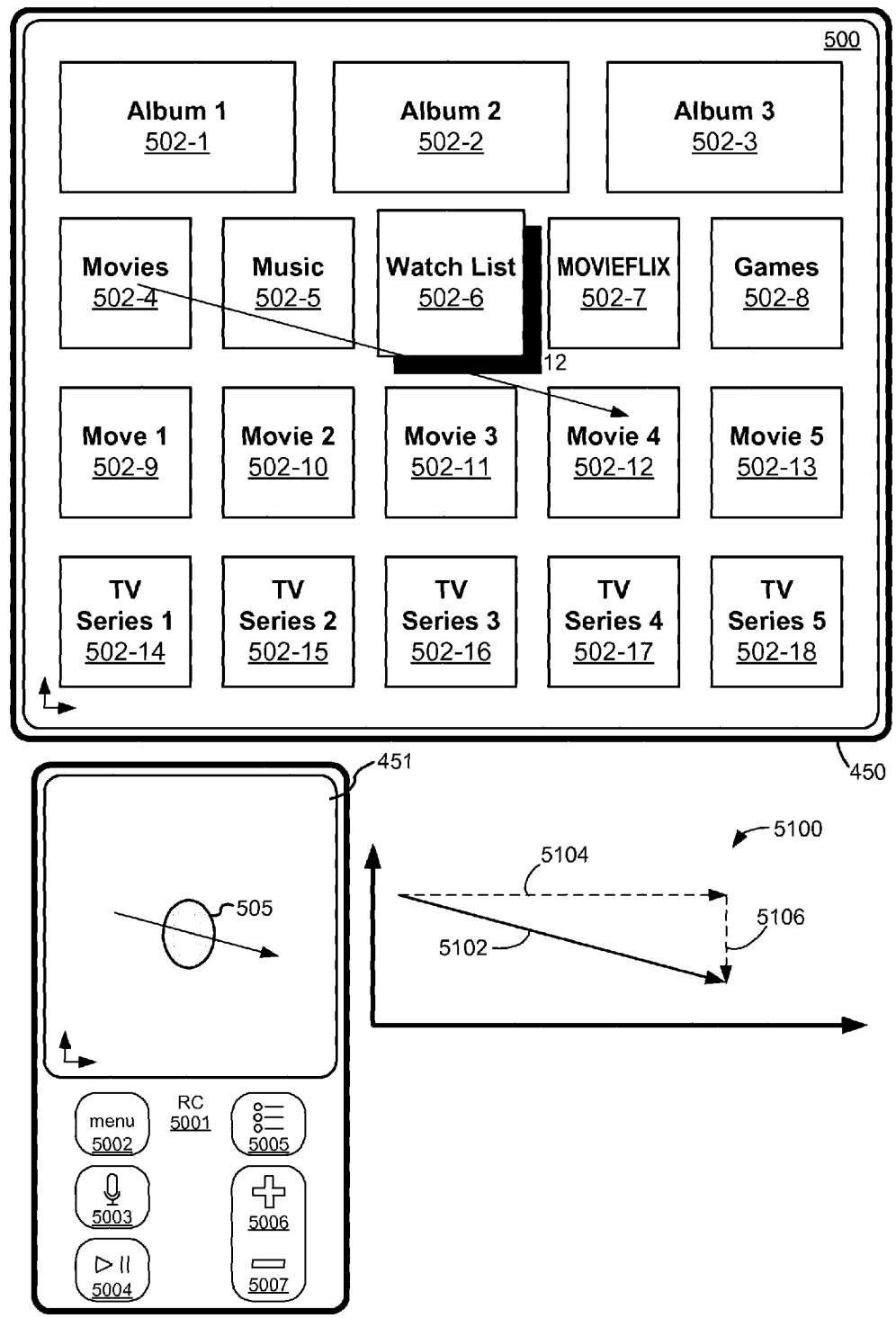
Figure 5D:
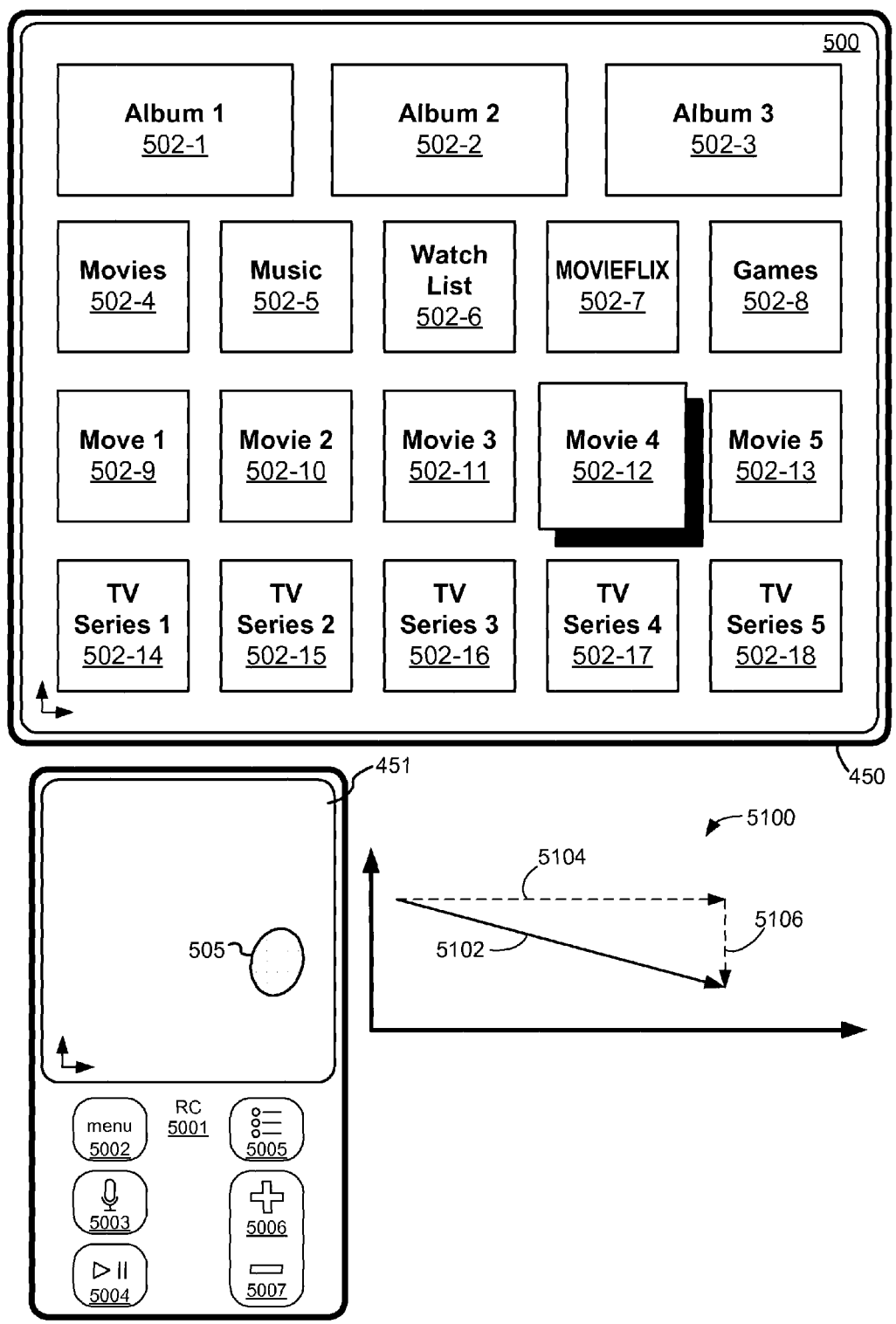

FIGS. 5A-5D illustrate detection of a movement of contact 505 that corresponds to a swipe gesture on touch-sensitive surface 451. In FIGS. 5A-5D, contact 505 moves at an angle relative to a horizontal axis or a vertical axis of touch-sensitive surface 451 (e.g., contact 505 moves in a direction that is not parallel to the horizontal axis or the vertical axis of touch-sensitive surface 451). FIGS. 5A-5D also illustrate movement 5012 of the current focus from icon 502-4 to icon 502-12 (e.g., a movement of the current focus from icon 502-4 to icon 502-5 as shown in FIG. 5B, followed by a movement of the current focus from icon 502-5 to icon 502-6 as shown in FIG. 5C and a movement of the current focus from icon 502-6 to icon 502-12 as shown in FIG. 5D) that is based on the movement of contact 505 across touch-sensitive surface 451 (e.g., the overall direction of movement 5012 of the current focus corresponds to the direction of the movement of contact 505 across touch-sensitive surface 451 and the distance of movement 5012 of the current focus is based on the distance of the movement of contact 505 across touch-sensitive surface 451). Diagram 5100 in FIG. 5A shows movement 5102 of contact 505, which has horizontal component 5104 and vertical component 5106 (because contact 505 moves across touch-sensitive surface 451 in both horizontal and vertical directions).

As shown in FIGS. 5A-5D, in navigating through a plurality of user interface objects (e.g., an array or grid of icons), an input on a touch-sensitive surface can lead to an unintended operation. For example, swiping a thumb sideways on a touch-sensitive commonly moves a contact point at an angle relative to a horizontal axis of touch-sensitive surface 451 or along a curve instead of a straight line on touch-sensitive surface 451. Thus, when a user intends to move the current focus horizontally from icon 502-4 to icon 502-7, the movement of contact 505 with a thumb may not be aligned with the horizontal axis of touch-sensitive surface 451 and move the current focus to another icon (e.g., icon 502-12). In such a case, the user needs to provide additional input to move the current focus from icon 502-12 to icon 502-7, which is cumbersome, inefficient, and time-consuming.

Figure 5E:
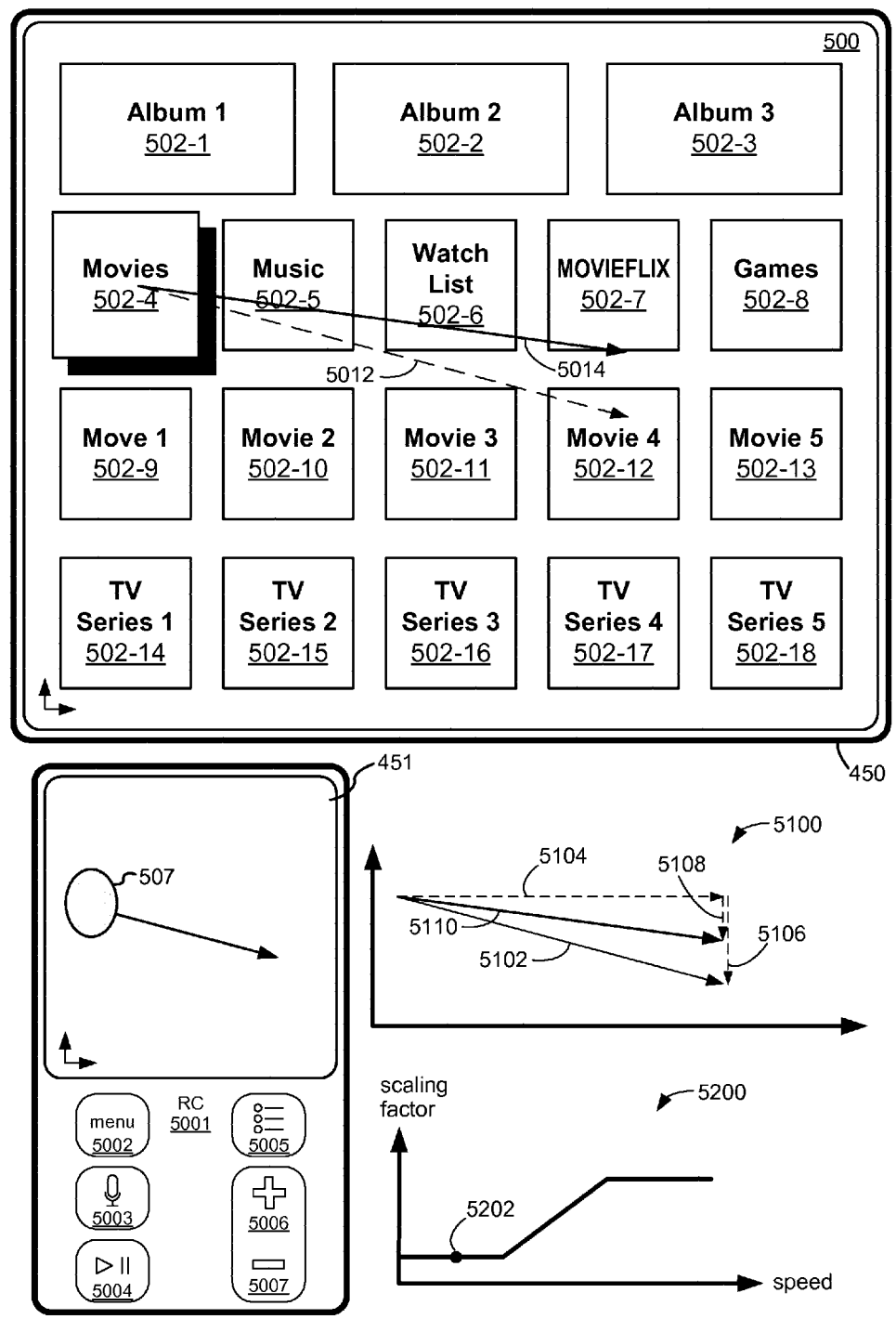
Figure 5F:
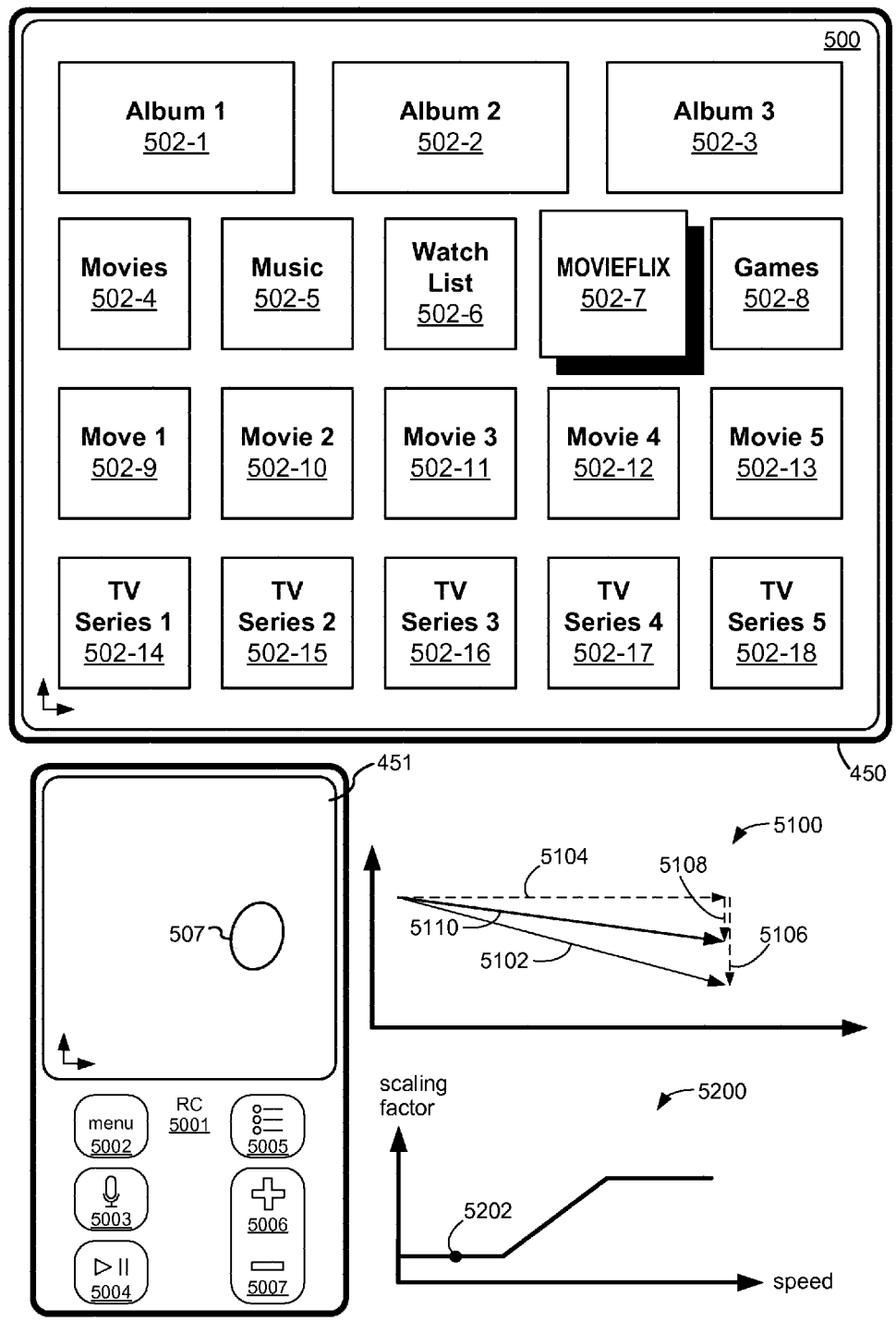

FIGS. 5E-5F illustrate detection of a movement of contact 507 that corresponds to a swipe gesture on touch-sensitive surface 451. The movement of contact 507 across touch-sensitive surface 451 shown in FIGS. 5E-5F matches the movement of contact 505 across touch-sensitive surface 451 shown in FIG. 5A-5D. However, movement 5014 of the current focus in FIGS. 5E-5F has a direction that is different from the direction of movement of the current focus in FIGS. 5A-5D.

Diagram 5100 in FIG. 5E shows movement 5102 of contact 505, which has horizontal component 5104 and vertical component 5106, as shown in FIG. 5A. Instead of moving the current focus based on the detected input (e.g., moving the current focus in the direction of movement 5102), components of the input are separately used to determine the movement of the current focus. For example, by comparing horizontal component 5104 and vertical component 5106, a dominant axis is determined. In the example shown in FIGS. 5E-5F, the horizontal axis is determined as the dominant axis, because horizontal component 5104 is larger than vertical component 5106. For moving the current focus, horizontal component 5104, which corresponds to the dominant axis, is typically used without scaling, but vertical component 5106, which corresponds to a non-dominant axis, is scaled before use (e.g., scaled vertical component 5108, which is less than "detected" vertical component 5106, is used instead of vertical component 5106). As a result, movement 5110, which corresponds to horizontal component 5104 and scaled vertical component 5108, is used to determine movement 5014 of the current focus. If unscaled vertical component 5106 is used, the current focus moves to icon 502-12 along movement 5012. Instead, by using scaled vertical component 5108, the current focus moves to icon 502-7 along movement 5014 as shown in FIG. 5F. Thus, although the movement of contact 507 is not perfectly aligned with the horizontal axis of touch-sensitive surface 451, the vertical component of the movement of contact 507 is reduced so that the current focus moves horizontally from icon 502-4 to icon 502-7.

In some embodiments, the scaling factor for scaling a vertical component or a horizontal component varies depending on a speed of the movement of a contact. Diagram 5200 in FIG. 5E shows an exemplary scaling factor as a function of a speed of the movement of a contact. In the example shown in FIG. 5E, a low scaling factor is used when the speed of the movement of a contact is low (e.g., a vertical component or a horizontal component is reduced by a factor of 2 (or 1.5, 1.4, 1.3, 1.2, 1.1, etc.) when the speed of the movement of a contact is low), and a high scaling factor is used when the speed of the movement of a contact is high (e.g., a vertical component or a horizontal component is reduced by a factor of 4 (or 5, 6, 7, 8, 9, 10, etc.) when the speed of the movement of a contact is high). Point 5202 in diagram 5200 represents that the movement of contact 507 has a low speed, and thus, a low scaling factor (e.g., 2) is used. In some embodiments, a scaling factor of one is used when the speed of the movement of a contact is low, and a scaling factor greater than one is used when the speed of the movement of a contact is high. This allows the user interface to provide feedback to a slow movement of a contact in two dimensions (e.g., the tilting and parallax that indicate the movement of the current focus in both up/down and right/left directions without scaling the input) while making the movement of the current focus precise when the contact moves quickly across the touch-sensitive surface.

This method of scaling a movement component in a non-dominant direction has advantages over a method of mechanically fixing the movement of the current focus to a dominant direction and disregarding the movement of the contact in a non-dominant direction. For example, when the icons are configured to display an animation based on horizontal and vertical movements of a contact (e.g., tilting an icon based on the movement of the contact), disregarding the movement of the contact in the non-dominant direction restricts the animation, which is not compatible with providing an animation in both horizontal and vertical directions. In addition, in case the user intends to move the current focus diagonally, fixing the movement of the current focus along either horizontal or vertical axis unduly restricts the movement of the current focus. For example, instead of moving the current focus diagonally, the user may need to move the current focus in two steps: first move horizontally, and then move vertically. In comparison, scaling the movement component in the non-dominant direction allows the animation along both axes, and also allows a movement of the current focus in diagonal directions as well as horizontal and vertical directions.

Figure 5G:
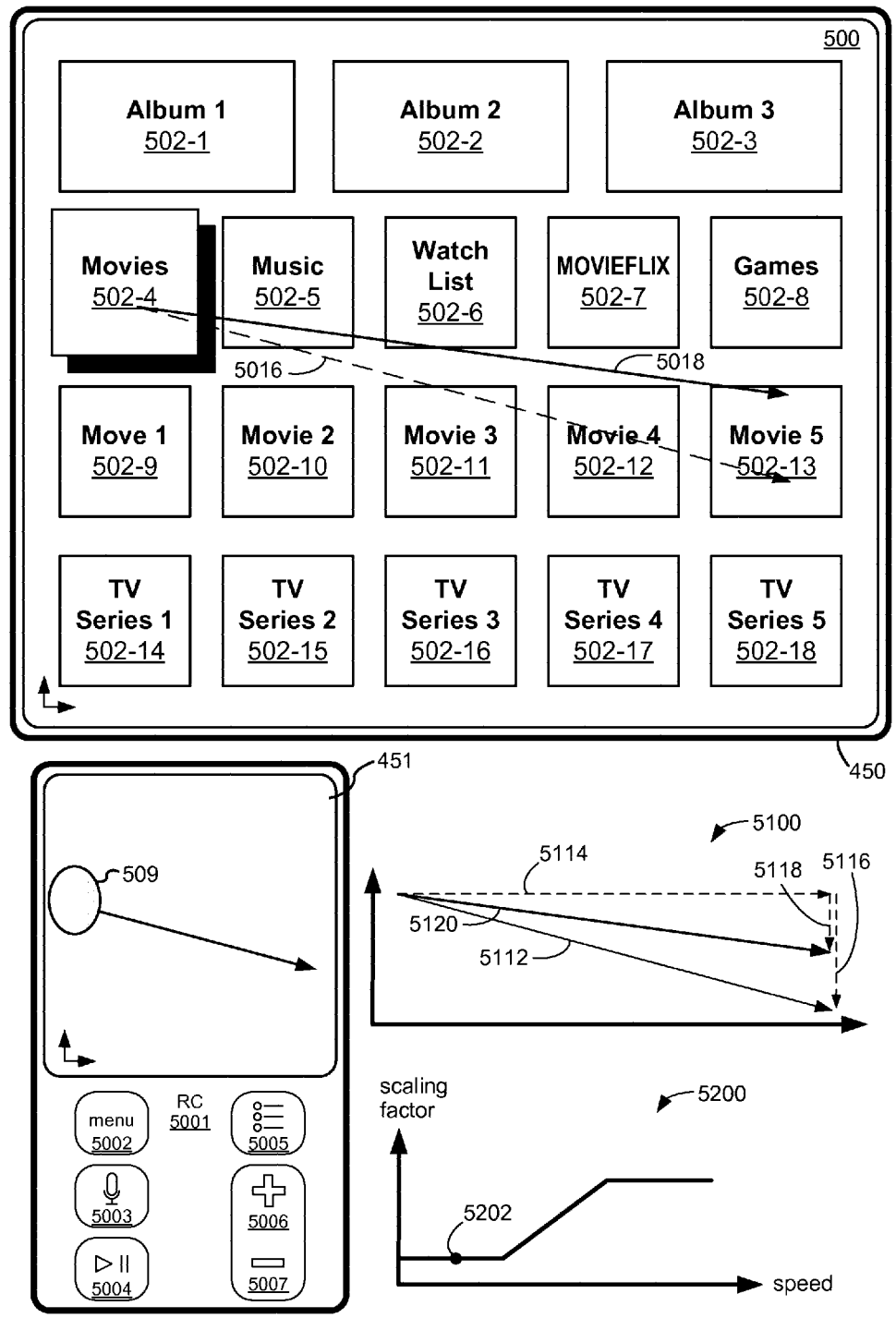
Figure 5H:
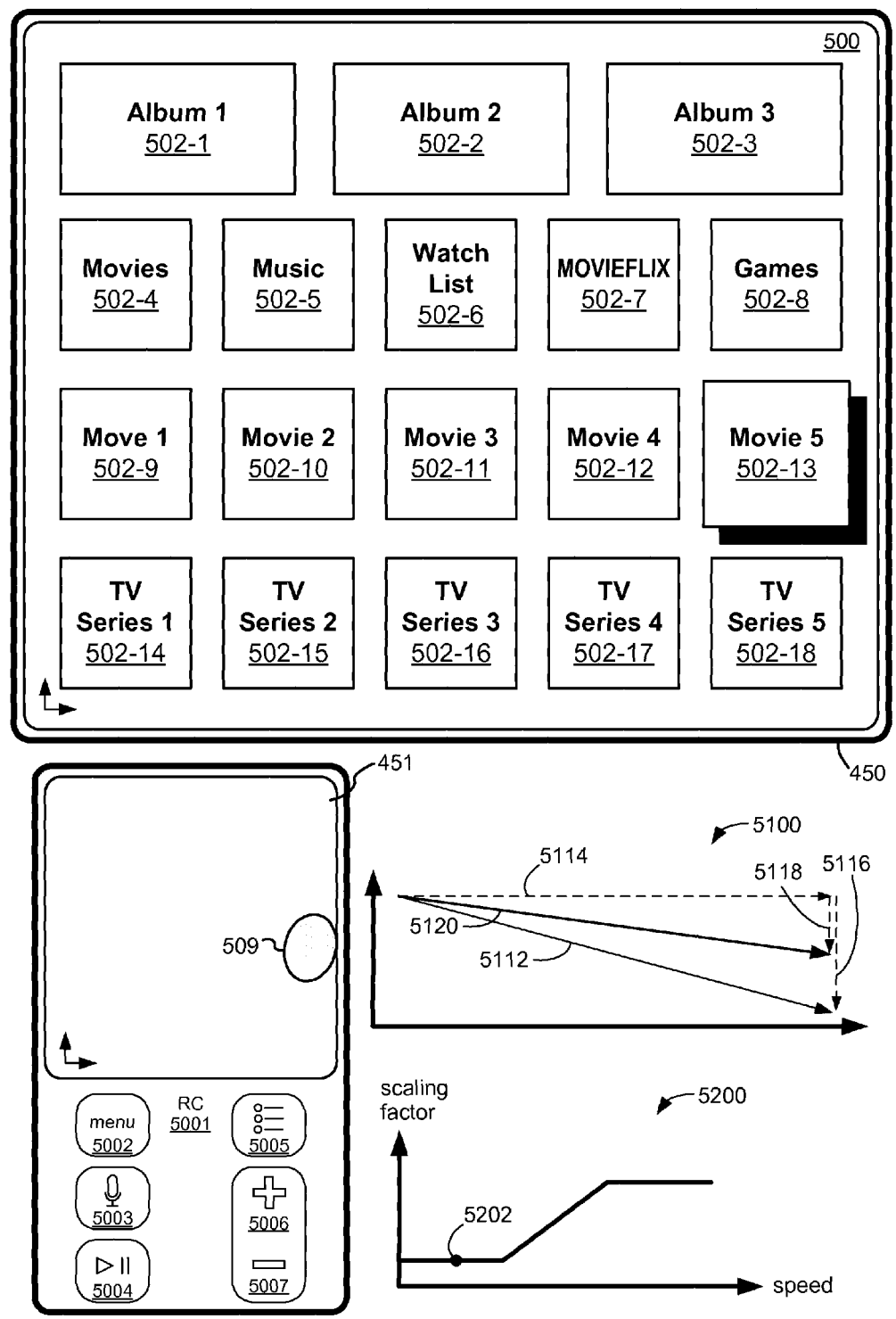

For example, FIGS. 5G-5H illustrate a movement of contact 509 on touch-sensitive surface 451 in accordance with some embodiments. In FIGS. 5G-5H, contact 509 moves across touch-sensitive surface 451 in the same direction as the movement of contact 507 across touch-sensitive surface 451 shown in FIG. 5E-5F. However, in FIGS. 5G-5H, contact 509 travels across touch-sensitive surface 451 further than contact 507 does in FIGS. 5E-5F. Diagram 5100 in FIG. 5G shows movement 5112 of contact 509, which has horizontal component 5114 and vertical component 5116. Instead of movement 5112, movement 5120 that is based on horizontal component 5114 and scaled vertical component 5118 is used to determine movement 5018 of the current focus. In FIGS. 5G-5H, although scaled vertical component 5118 is used, because the vertical movement of contact 509 is large so that the current focus moves not only in the horizontal direction but also in the vertical direction (e.g., collectively in a diagonal direction), from icon 502-4 to icon 502-13. Movement 5016 of the current focus, based on the movement of contact 509 without scaling, also places the current focus on the same icon 502-13 in this case.

Diagram 5200 in FIGS. 5G and 5H again illustrates that, in some embodiments, the scaling factor is determined based on a speed of the movement of contact 509. Point 5202 in diagram 5200 represents that contact 509 moves at a low speed, and thus, a low scaling factor (e.g., 2) is used (e.g., scaled vertical component 5118 is half of vertical component 5116).

Figure 5I:
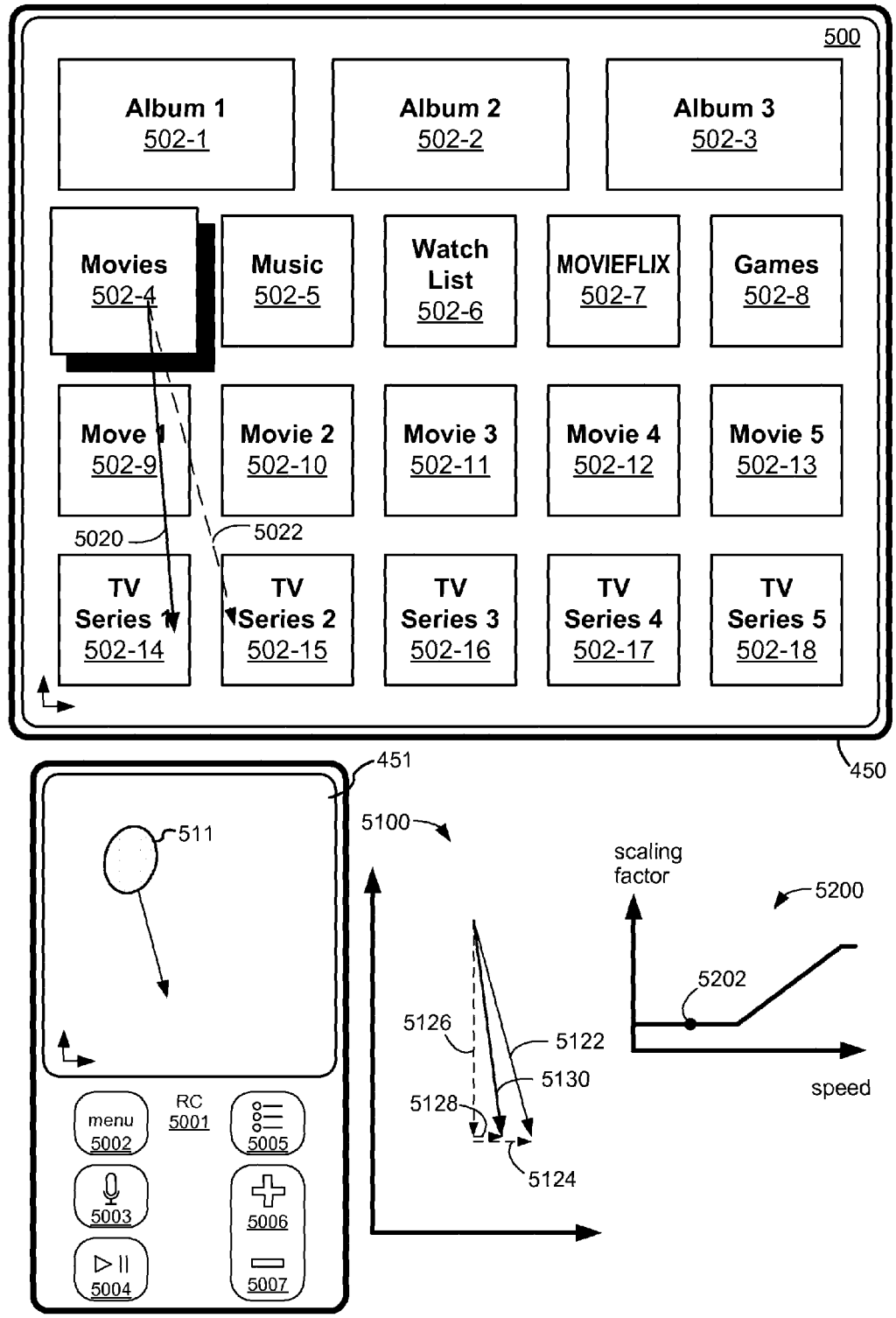
Figure 5J:
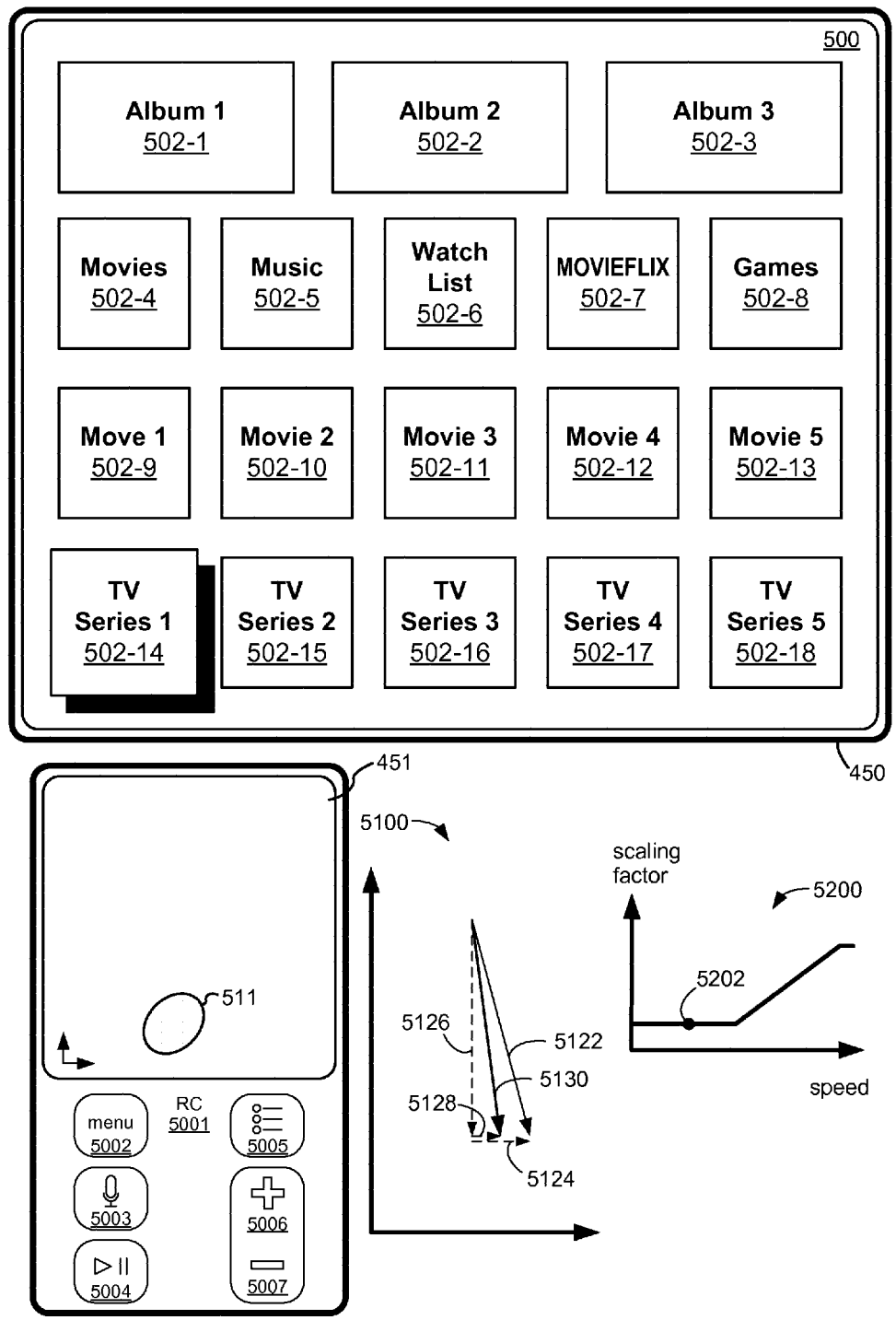

FIGS. 5I-5J illustrates a movement of the current focus in response to a primarily vertical movement of contact 511 in accordance with some embodiments. In FIGS. 5I-5J, contact 511 moves across touch-sensitive surface 451. Movement 5022 of the current focus, based on the movement of contact 511 without scaling, places the current focus on icon 502-15.

As explained above, using a scaled movement component facilitates moving the current focus along a horizontal or vertical direction. Diagram 5100 in FIG. 5I shows that movement 5122 of contact 511 includes horizontal component 5124 and vertical component 5126. By comparing horizontal component 5124 and vertical component 5126, a vertical axis is determined to be a dominant axis (e.g., because vertical component 5126, which corresponds to a vertical distance traveled by contact 511 across touch-sensitive surface 451, is larger than horizontal component 5124, which corresponds to a horizontal distance traveled by contact 511 across touch-sensitive surface 451). Instead of movement 5122 of contact 511, movement 5130 that is based on vertical component 5126 and scaled horizontal component 5128 is used to determine movement 5020 of the current focus. In response to the movement of contact 511, the current focus moves vertically from icon 502-4 to icon 502-14.

Figure 5K:
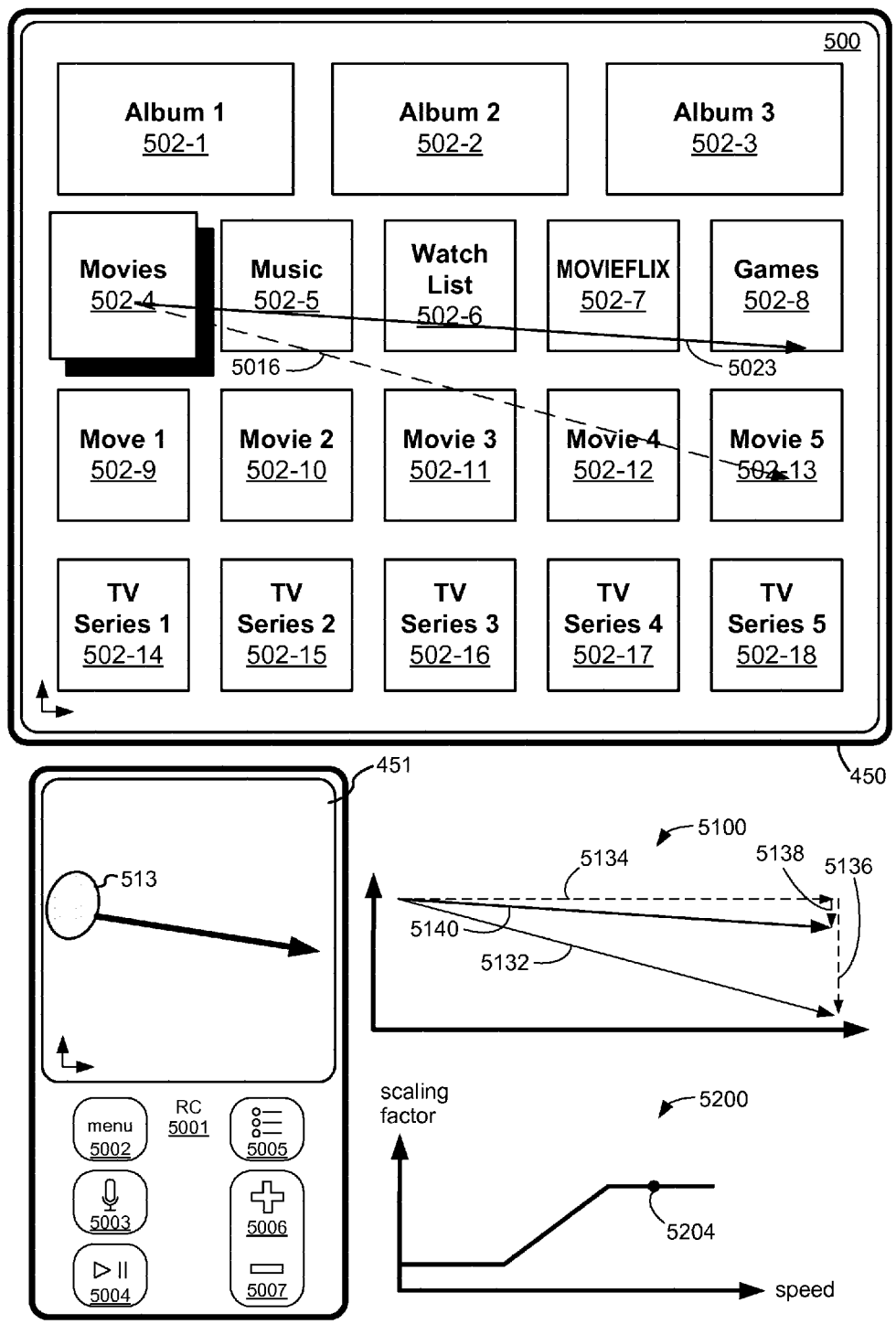
Figure 5L:
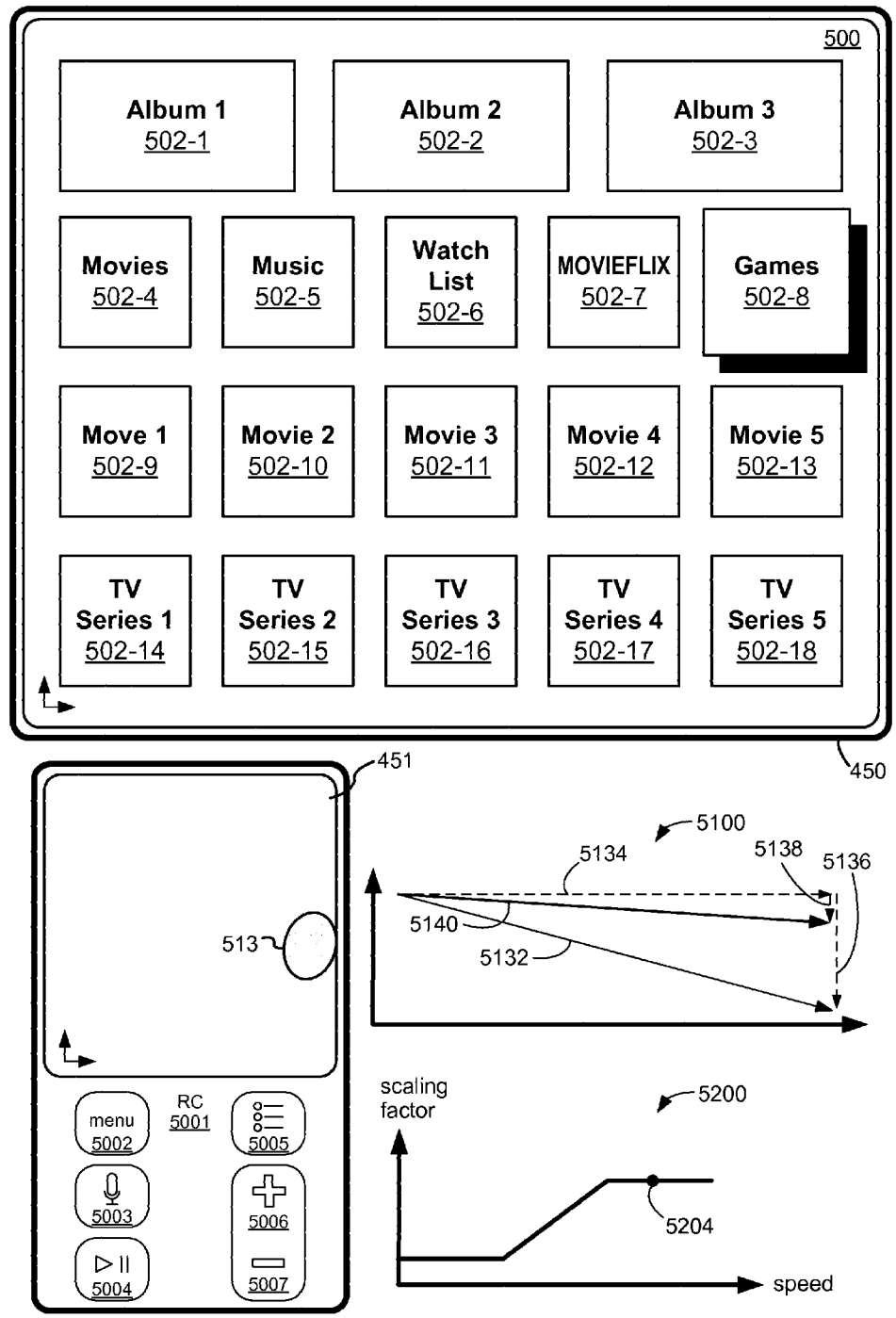

FIGS. 5K-5L illustrate a fast movement of contact 513 across touch-sensitive surface 451 in accordance with some embodiments. The movement of contact 513 is similar to the movement of contact 509 shown in FIGS. 5G-5H (e.g., contact 513 and contact 509 move in the same direction and by the same distance). However, although contact 513 moves in the same direction and the same distance as contact 509 shown in FIGS. 5G-5H, contact 513 moves faster than contact 509 shown in FIGS. 5G-5H. Diagram 5200 in FIG. 5K illustrates that a high scaling factor (e.g., 4) is selected based on the speed of the movement of contact 513 (e.g., point 5204 in diagram 5200 represents that contact 513 moves at a fast speed). Diagram 5100 in FIG. 5K shows that movement 5132 of contact 513 includes horizontal component 5134 and vertical component 5136. Instead of movement 5132 of contact 513, movement 5140 that is based on horizontal component 5134 and scaled vertical component 5138 is used to determine movement 5023 of the current focus. In response to the movement of contact 513 across touch-sensitive surface 451, the current focus moves horizontally from icon 502-4 to icon 502-8.

Figure 5M:
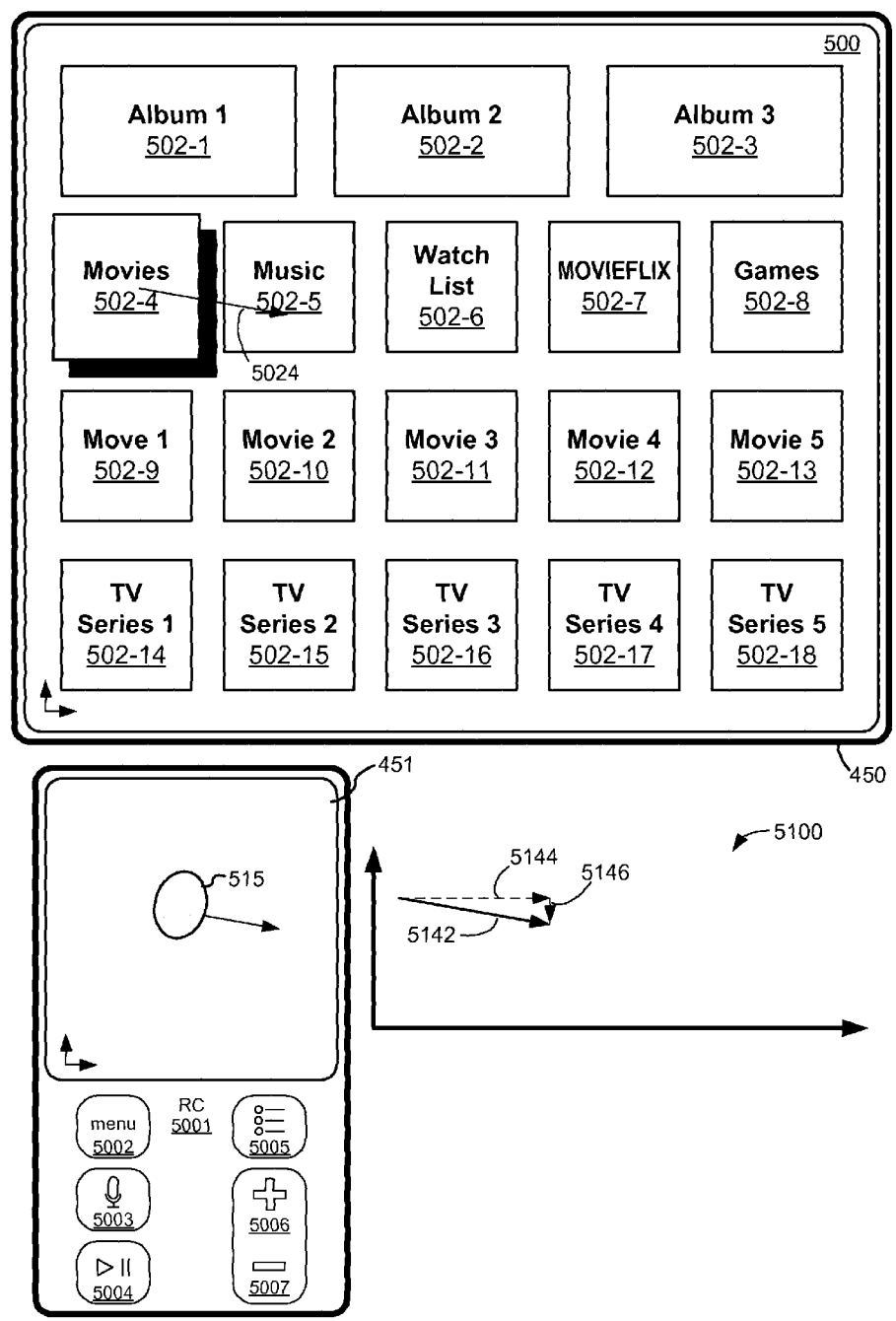
Figure 5N:
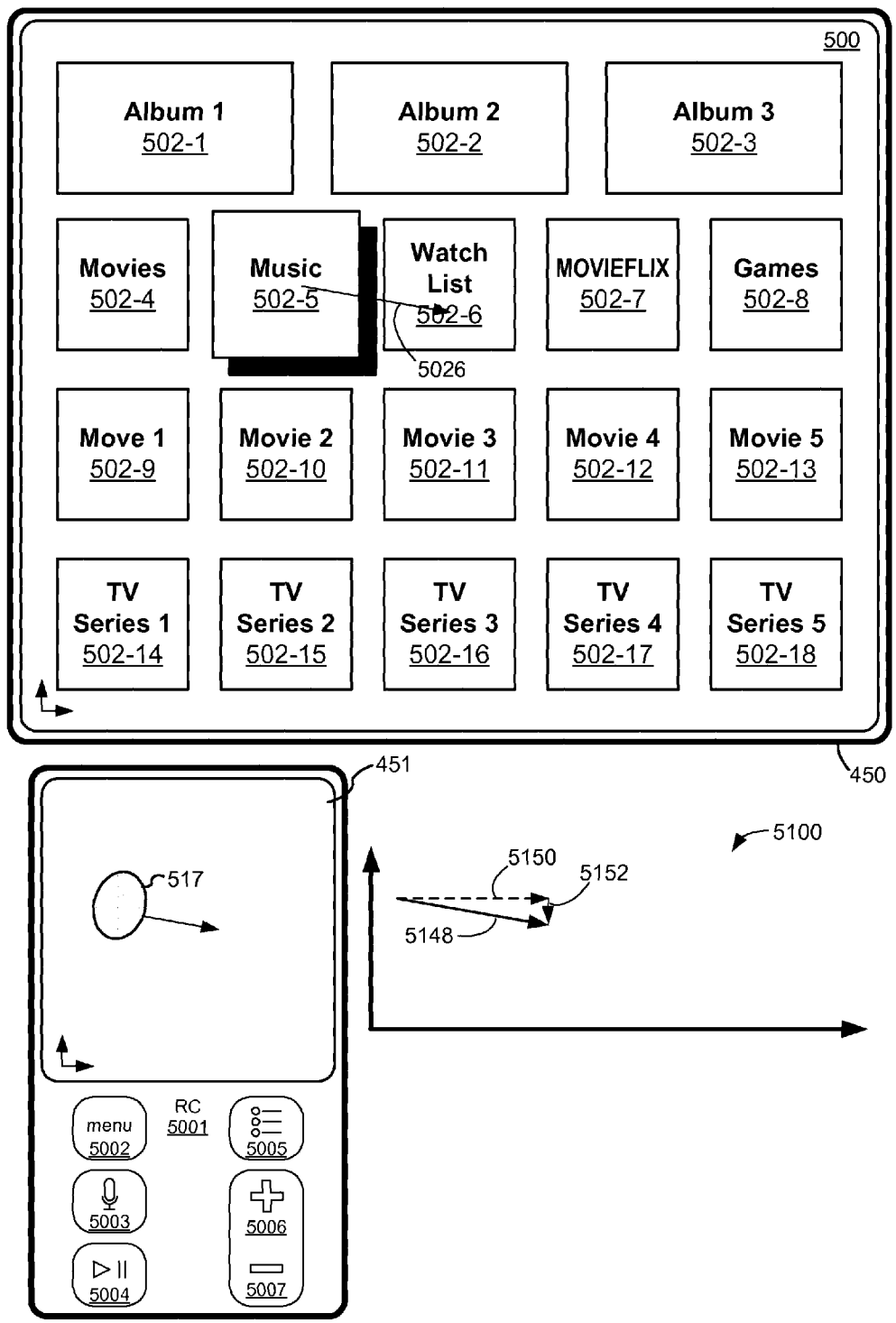

FIGS. 5M-5P illustrate a series of inputs affecting the processing of a subsequent input in accordance with some embodiments. FIG. 5M shows detection of a movement of contact 515 across touch-sensitive surface 451. Diagram 5100 in FIG. 5M shows that movement 5142 of contact 515 has horizontal component 5144 and vertical components 5146. Movement 5024 of the current focus is determined based on either movement 5142 of contact 515 or a movement that is based on a scaled component (e.g., a scaled vertical component). In FIGS. 5M-5N, the current focus moves horizontally from icon 502-4 to icon 502-5.

FIG. 5N also shows detection of a movement of contact 517 (which is separate from, and subsequent to, contact 515) across touch-sensitive surface 451. Diagram 5100 in FIG. 5N shows that movement 5148 of contact 517 has horizontal component 5150 and vertical component 5152. Movement 5026 of the current focus is determined, and as a result, the current focus moves horizontally from icon 502-5 to icon 502-6.

Figure 5O:
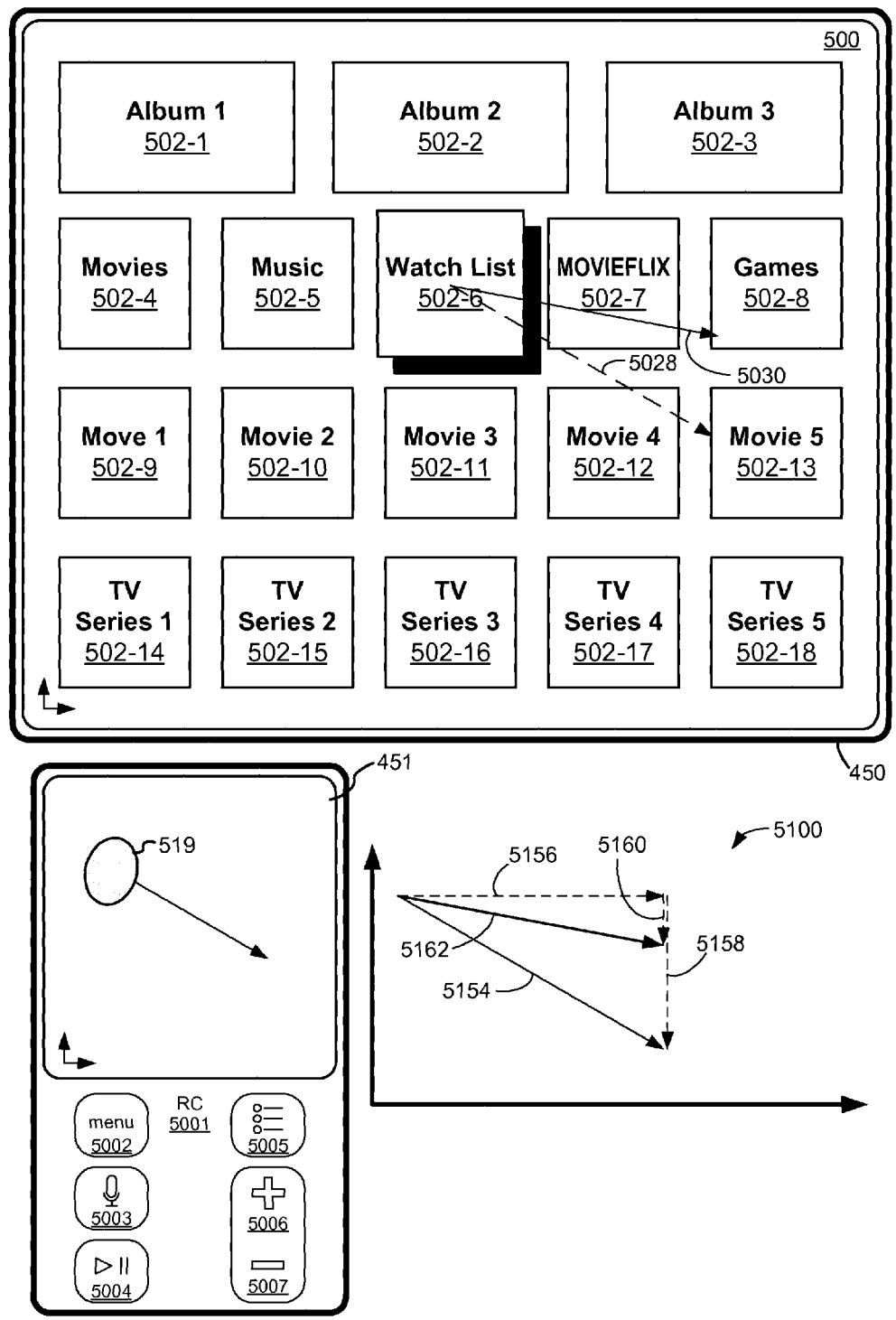
Figure 5P:
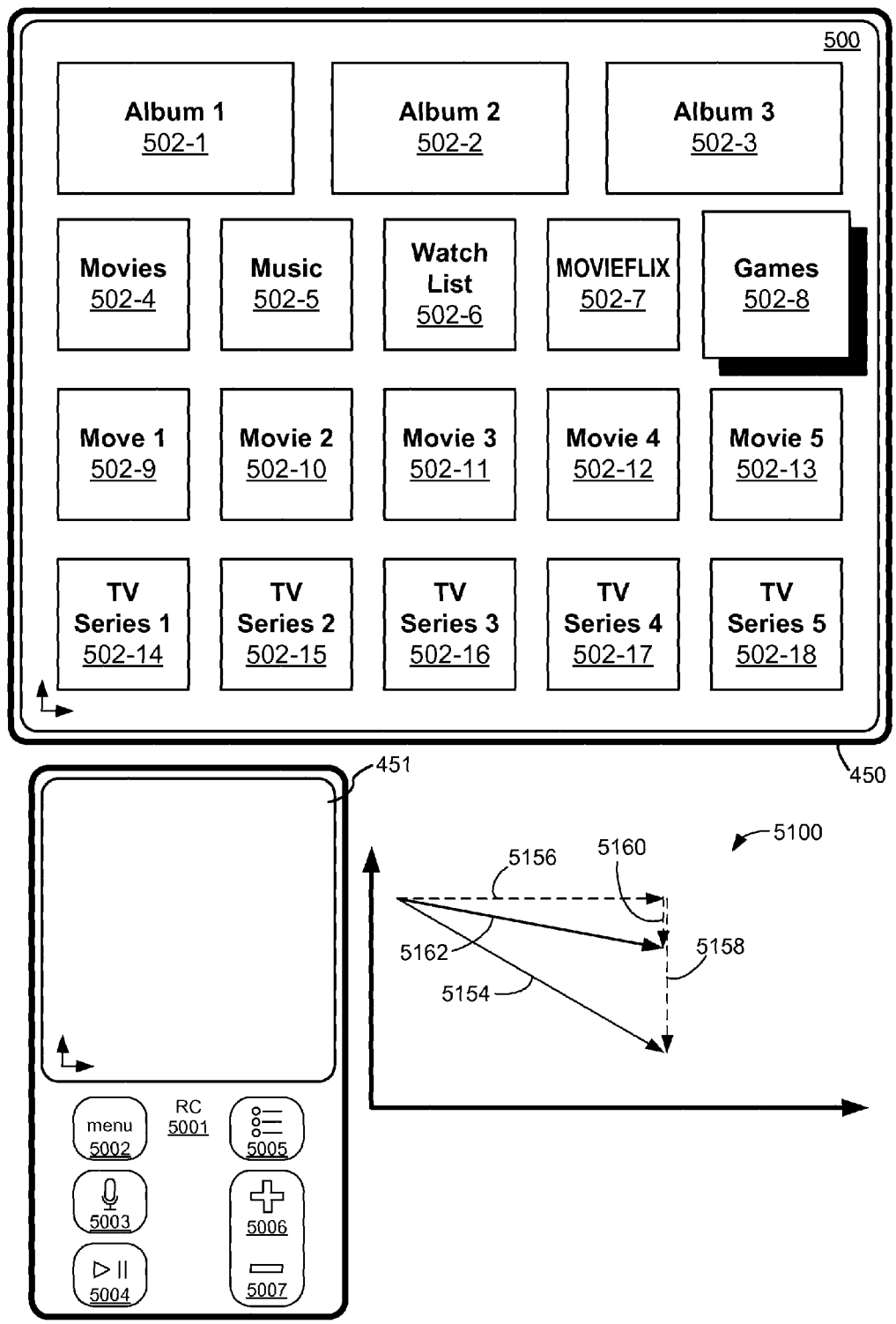

FIG. 5O shows detection of a movement of contact 519 (which is separate from, and subsequent to, contact 517) across touch-sensitive surface 451. Diagram 5100 in FIG. 5O shows that movement 5154 of contact 519 has horizontal component 5156 and vertical component 5158. If vertical component 5158 is used to determine the movement of the current focus (e.g., movement 5028) instead of a scaled vertical component, the current focus moves from icon 502-6 to icon 502-13. However, movement 5162 that is based on horizontal component 5156 and scaled vertical component 5160 is used to determine movement 5030 of the current focus. In some embodiments, the scaling factor for scaled vertical component 5160 is determined based on a number of immediate prior inputs that correspond to movements of the current focus in a particular direction. For example, in FIGS. 5M-5P, contacts 515 and 517 caused horizontal movements of the current focus, and the scaling factor is determined accordingly (e.g., based on the fact that two prior inputs correspond to horizontal movements of the current focus). For example, the scaling factor may be 3 when two prior inputs correspond to movements of the current focus in a particular direction, and 4 when three prior inputs correspond to movements of the current focus in the particular direction. In some embodiments, prior inputs within a predefined time window (e.g., 3 seconds, etc.) are used for determining the scaling factor. This operation assumes that when a user repeatedly moves the current focus in a particular direction (e.g., either a horizontal direction or a vertical direction), the user will likely want to move the current focus further in the same particular direction with subsequent inputs. Thus, FIG. 5P shows that the current focus has moved horizontally from icon 502-6 to icon 502-8.

Figure 5Q:
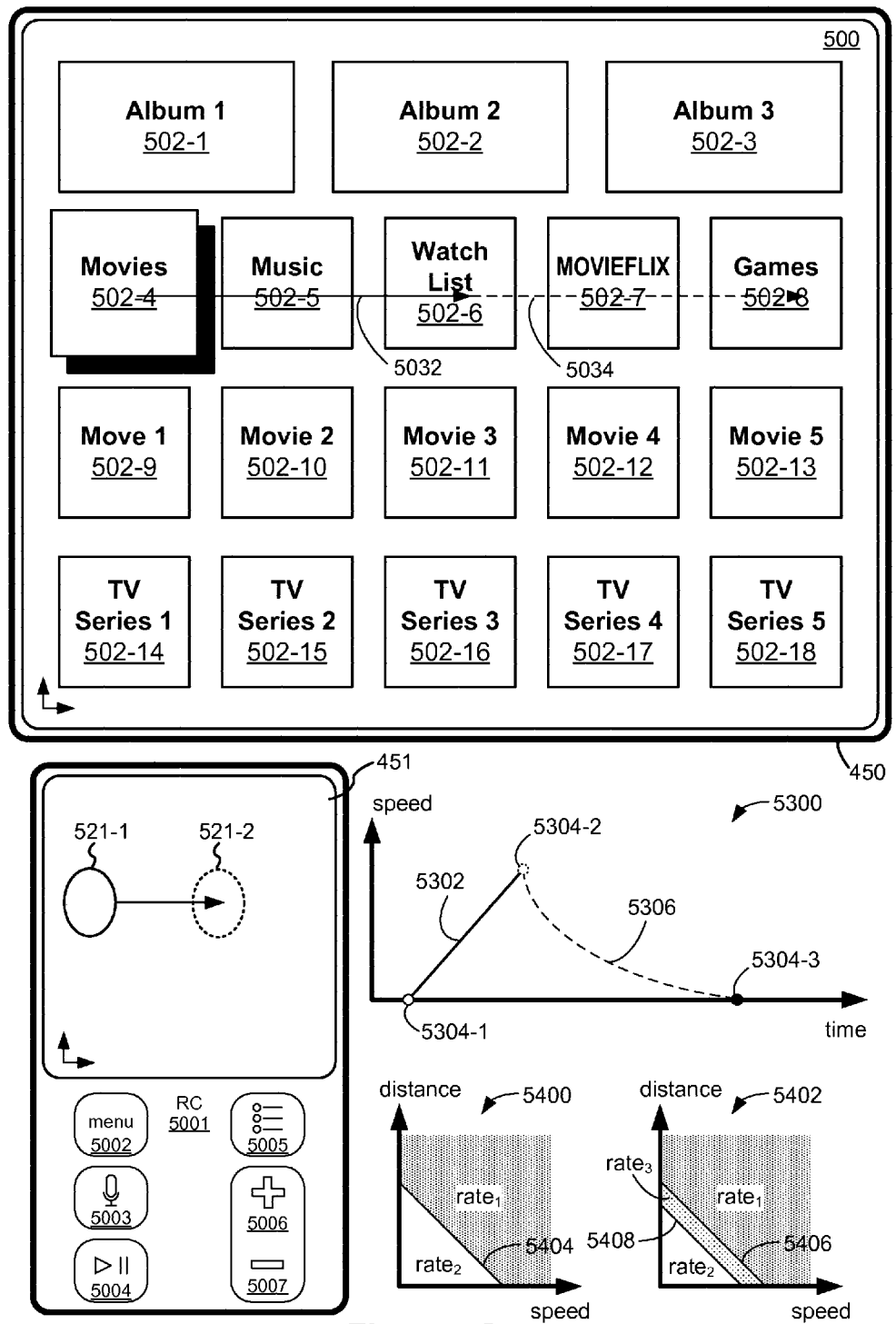

FIG. 5Q illustrates coasting (or gliding) of the current focus in accordance with some embodiments.

In FIG. 5Q, contact 521 moves across touch-sensitive surface 451 from location 521-1 to location 521-2, and is lifted off of touch-sensitive surface 451 at location 521-2. In response, the current focus moves from icon 502-4 to icon 502-6 (e.g., movement 5032 of the current focus). Subsequent to the lift-off of contact 521, the current focus continues to move toward icon 502-8 (e.g., movement 5034 of the current focus). Diagram 5300 in FIG. 5Q illustrates the speed of the movement of the current focus over time. During time period 5302, contact 521 remains in contact with touch-sensitive surface 451 (e.g., from time point 5304-1 to time point 5304-2), and the current focus moves in accordance with the speed of the movement of contact 521. During time period 5306, contact 521 is no longer detected on touch-sensitive surface 451 (e.g., from time point 5304-2 to time point 5304-3, due to the lift-off of contact 521 or decreased intensity applied by contact 521 on touch-sensitive surface below a detection threshold), but the current focus continues to move until its speed decelerates and falls below movement criteria (e.g., the speed is zero or below a certain speed threshold).

FIG. 5Q also illustrates that, in some embodiments, the deceleration rate is determined based on a distance traveled by contact 521 across touch-sensitive surface 451 and/or a speed of the movement of contact 521 across touch-sensitive surface 451. For example, diagrams 5400 and 5402 show that a weighted sum of the distance traveled by contact 521 and the speed of the movement of contact 521 is used to determine the deceleration rate. In some embodiments, the weighted sum is a dimensionless number. In diagram 5400, when the weighted sum is above threshold 5404, a first deceleration rate (e.g., rate$_1$) is used. When the weighted sum is below threshold 5404, a second deceleration rate (e.g., rate$_2$) is used. Diagram 5402 shows that instead of using two deceleration rates, additional deceleration rate(s) can be used. For example, when the weighted sum is above threshold 5406, the first deceleration rate is used, and when the weighted sum is below threshold 5408, the second deceleration rate is sued. When the weighted sum is between threshold 5406 and threshold 5408, another deceleration rate (e.g., a third deceleration rate, rate$_3$) is used. In some embodiments, an interpolation of rate$_1$ and rate$_2$ based on the weighted sum is used.

Figure 5R:
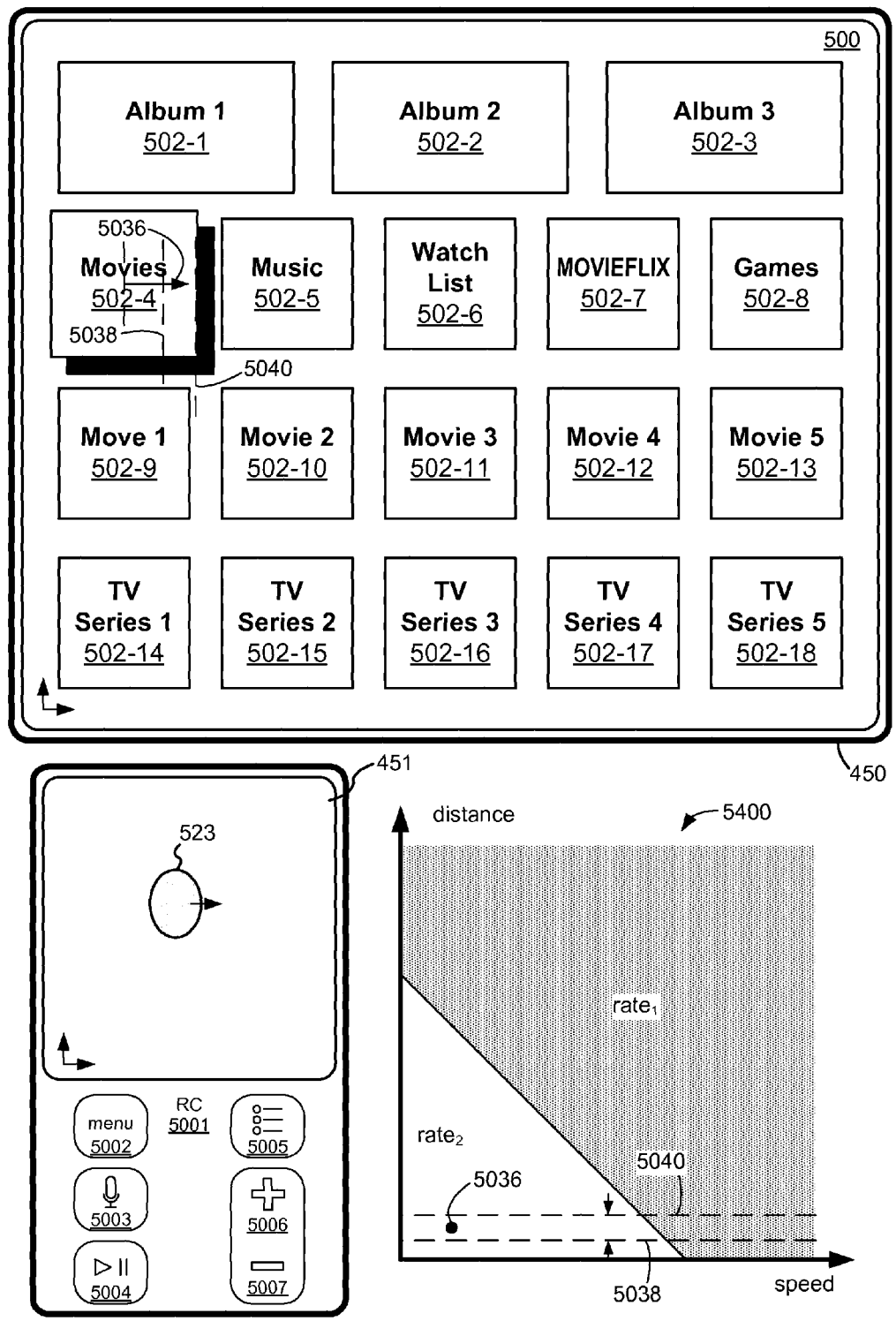
Figure 5S:
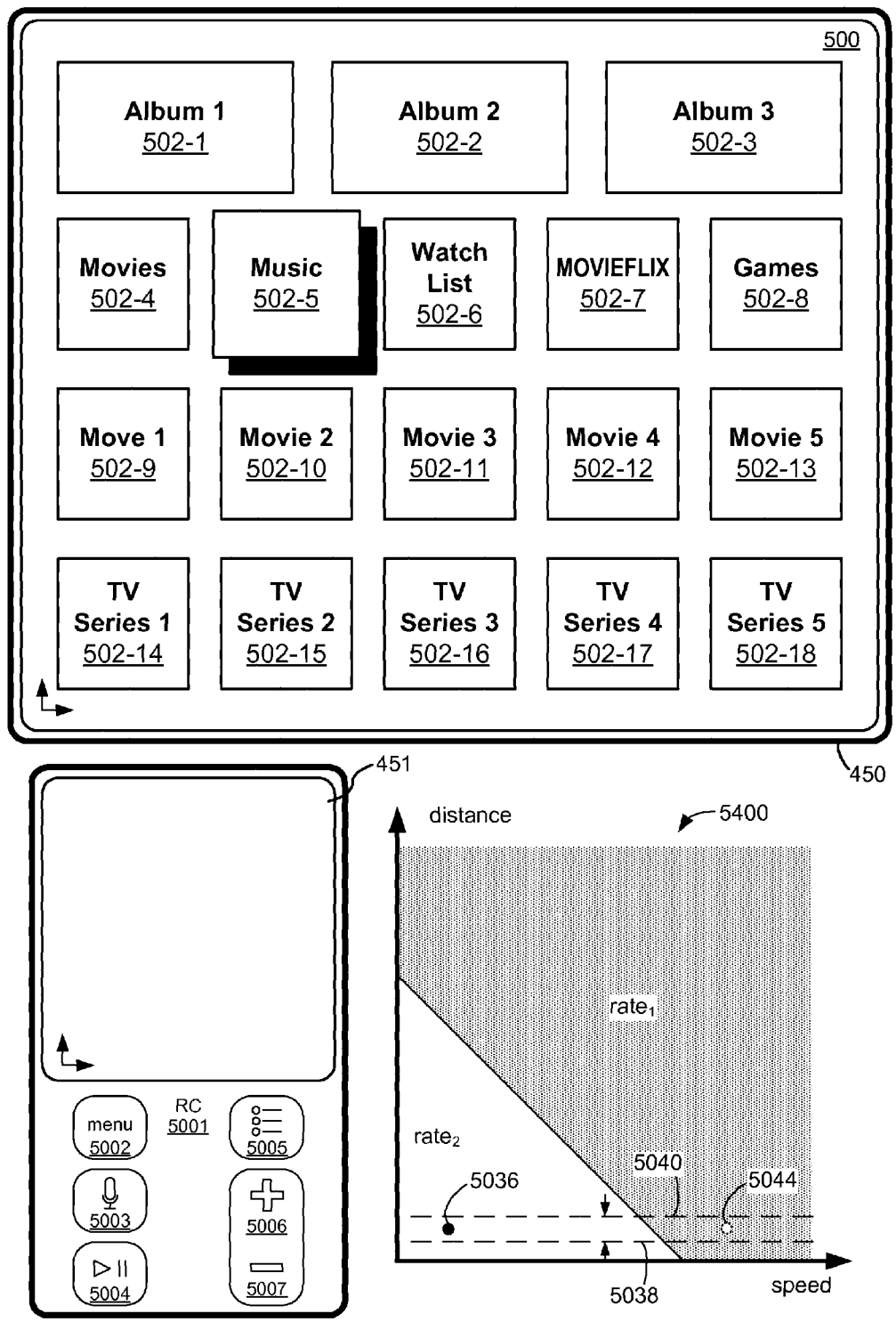

FIGS. 5R-5S illustrate a movement of the current focus to an adjacent icon in accordance with some embodiments.

FIG. 5R shows a movement of contact 523 across touch-sensitive surface 451. When contact 523 moves by a distance that corresponds to at least a predefined fraction of a width or half width of the current icon (e.g., the icon on which the current focus is located), the current focus moves from the current icon to an adjacent icon. For example, in response to the movement of contact 523 across touch-sensitive surface 451 that corresponds to movement 5036 of the current focus by more than distance threshold 5038, the current focus moves from icon 502-4 to icon 502-5, as shown in FIG. 5S. This facilitates moving the current focus with a small movement of contact 523. Thus, even if the user does not move the contact across touch-sensitive surface 451 far enough to a distance that corresponds to the distance from icon 502-4 to icon 502-5, the user can easily navigate through the icons. This improves the responsiveness of the device to user inputs (e.g., short inputs), thereby eliminating the need for the user to provide multiple inputs until a distance of an input corresponds to a distance from the current icon to an adjacent icon.

In some embodiments, this operation (of moving the current focus to an adjacent icon) occurs when the movement of contact 523 is less than the width or half width of the current icon (e.g., distance threshold 5040). In some embodiments, when contact 523 moves by at least the width or half width of the current icon, the current focus continues to move (e.g., glides), after contact 523 ceases to be detected, depending on the speed of the movement of contact 523.

Diagram 5400 in FIG. 5R illustrates that this operation (e.g., moving the current focus to an adjacent icon) is performed independent of the speed of contact 523, as long as the distance of the movement of the current focus due to the movement of contact 523 is above distance threshold 5038 (and optionally, below distance threshold 5040). For example, even when the speed of contact 523 is low (e.g., as represented by point 5036 in diagram 5400), because the movement of contact 523 corresponds to a movement of the current focus between distance threshold 5038 and distance threshold 5040, the current focus moves from icon 502-4 to adjacent icon 502-5, as shown in FIG. 5S.

FIG. 5S shows that a fast movement of contact 523 (e.g., as represented by point 5044 in diagram 5400) also moves the current focus from icon 502-4 to adjacent icon 502-5.

Figure 5T:
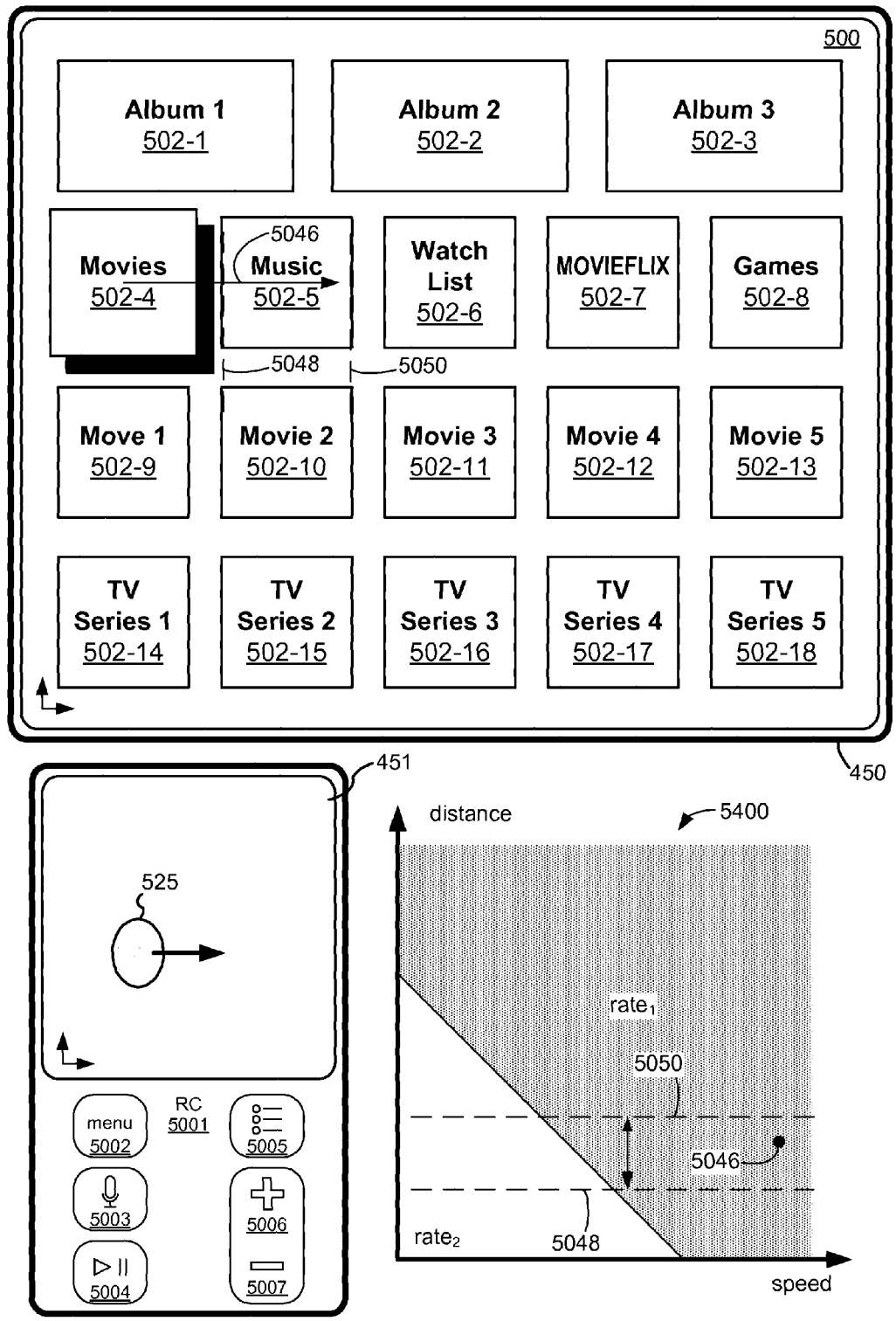
Figure 5U:
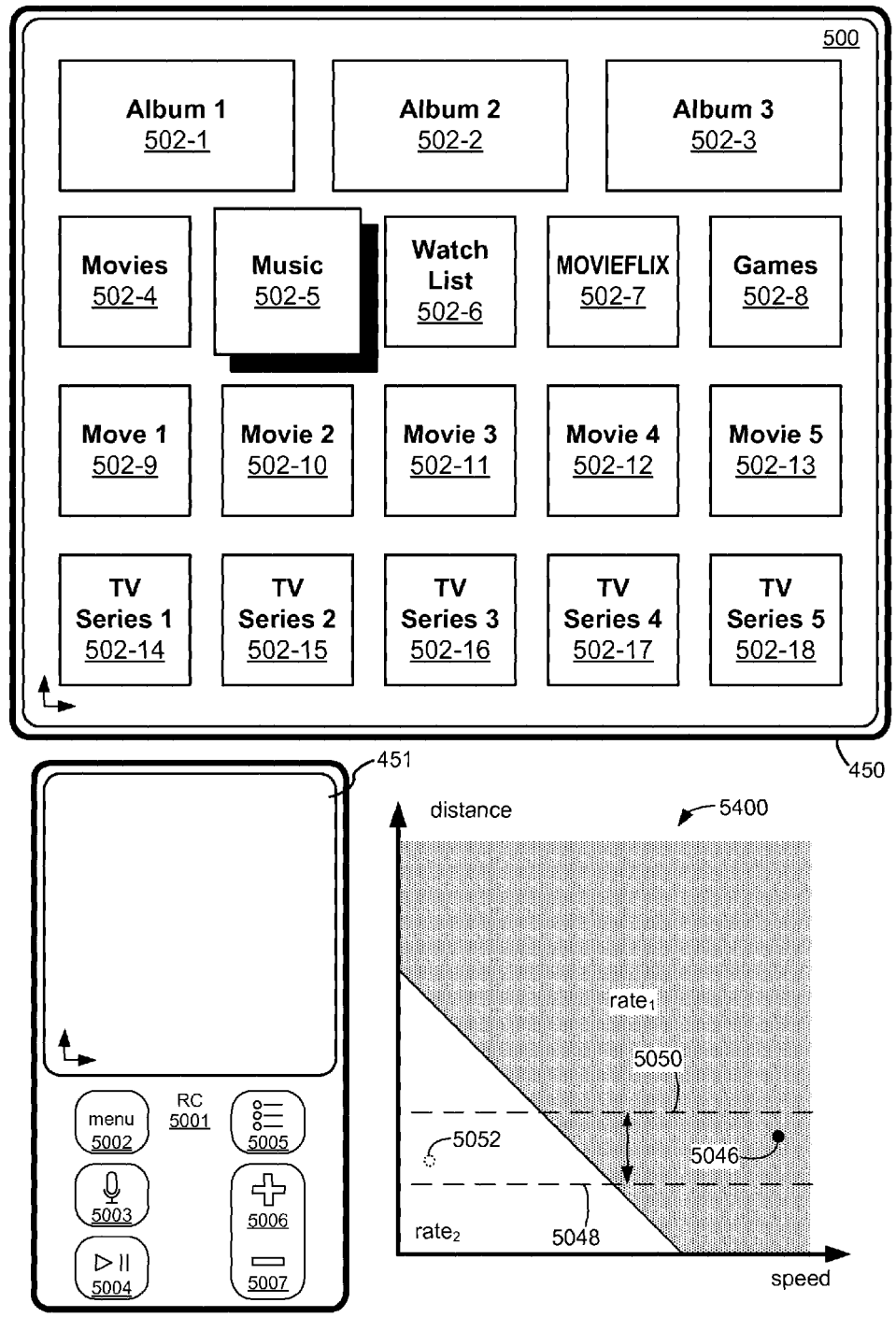

FIGS. 5T-5U illustrate a movement of the current focus to an adjacent icon in accordance with some embodiments. FIG. 5T shows a movement of contact 525 across touch-sensitive surface 451, and the current focus moves accordingly (e.g., the current focus moves discretely from icon 502-4 to icon 502-5). When contact 525 ceases to be detected on touch-sensitive surface 451 while the current focus is still on icon 502-5 (e.g., the movement of contact 525 corresponds to movement 5046 of the current focus between distance threshold 5046 and distance threshold 5050), the current focus remains on icon 502-5 regardless of the speed of the movement of contact 525, as shown in FIG. 5U. For example, the current focus does not continue to move after contact 525 ceases to be detected, even if the movement of contact 525 has a fast speed (e.g., as represented by point 5046 in diagram 5400). This reduces excessive movements of the current focus, thereby improving accuracy and efficiency in navigating through multiple icons.

FIG. 5U shows that a slow movement of contact 525 (e.g., as represented by point 5052 in diagram 5400) also moves the current focus from icon 502-4 to adjacent icon 502-5.

FIGS. 5V-5Z illustrates moving a current focus between groups of user interface objects in accordance with some embodiments.

Figure 5V:
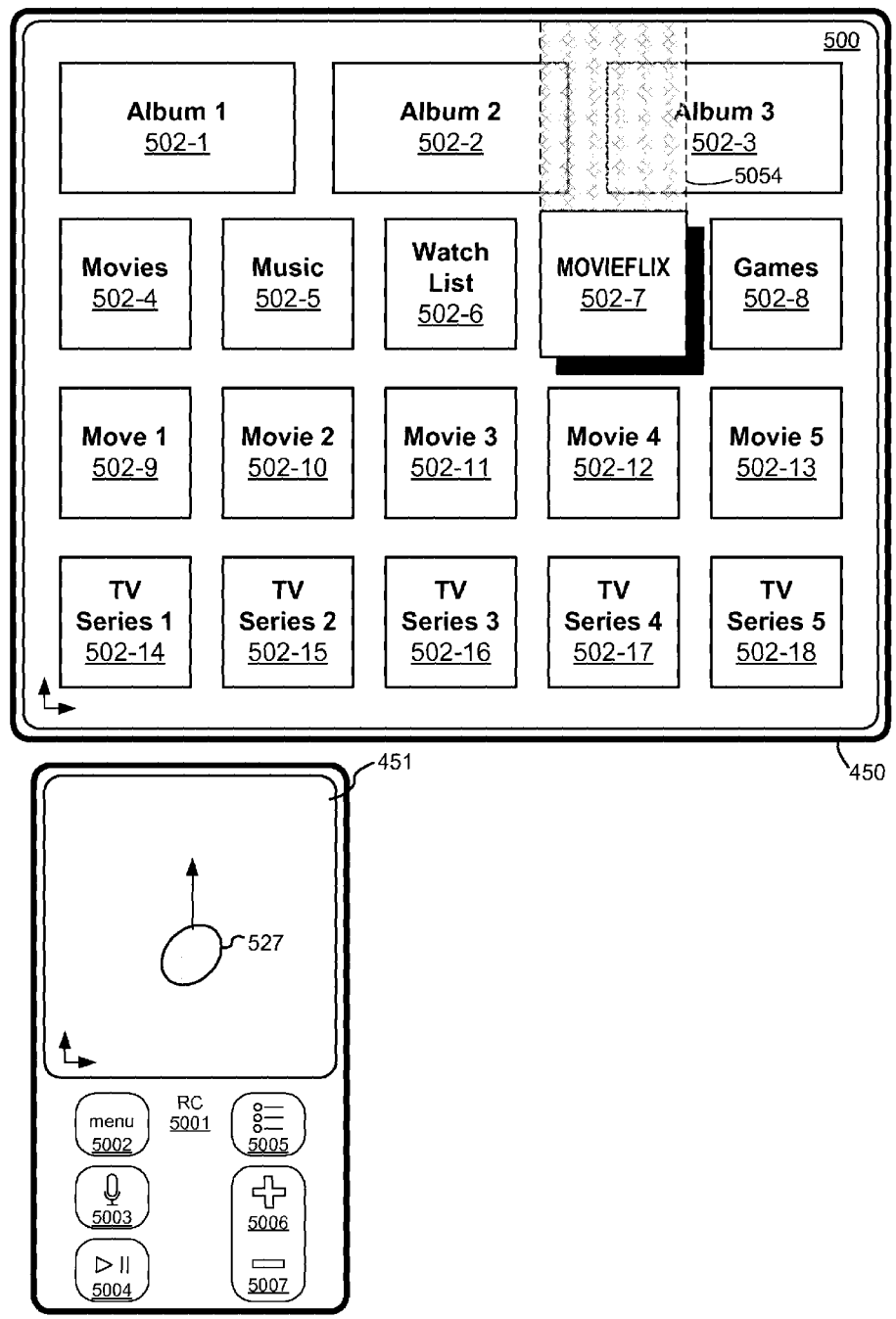
Figure 5W:
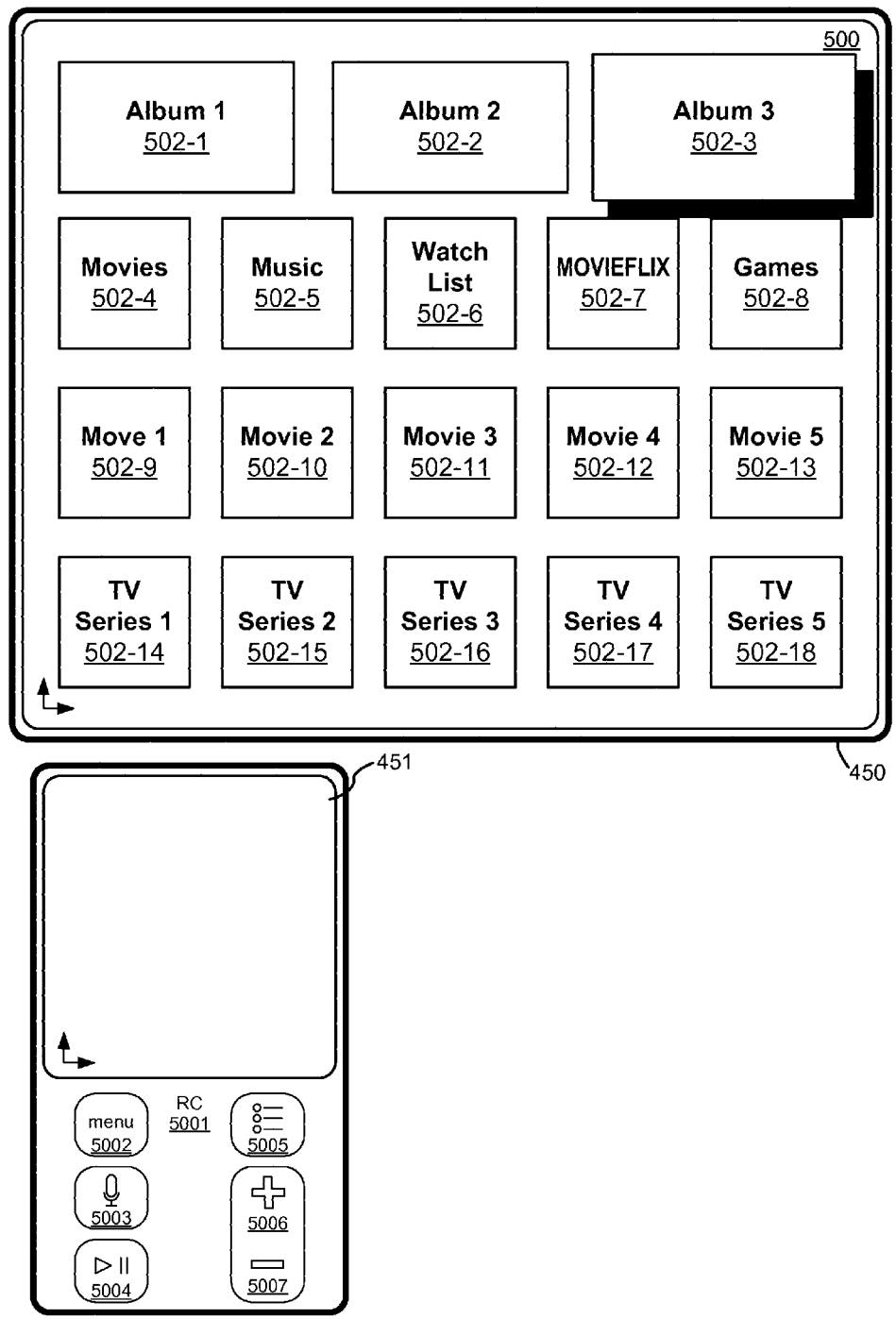

FIG. 5V shows a plurality of icons with a current focus on icon 502-7. FIG. 5V also shows a movement of contact 527 across touch-sensitive surface 451, which corresponds to a request to move the current focus up. In response to detecting the movement of contact 527, icon 502-7 is projected in the direction of the movement of contact 527, and user interface objects that overlap with projection 5054 (e.g., icon 502-2 and icon 502-3) are identified. In some embodiments, between icon 502-2 and icon 502-3, an icon that is closer to the current icon 502-7 is selected (e.g., icon 502-3), and the current focus moves from icon 502-7 to icon 502-3, as shown in FIG. 5W.

Figure 5X:
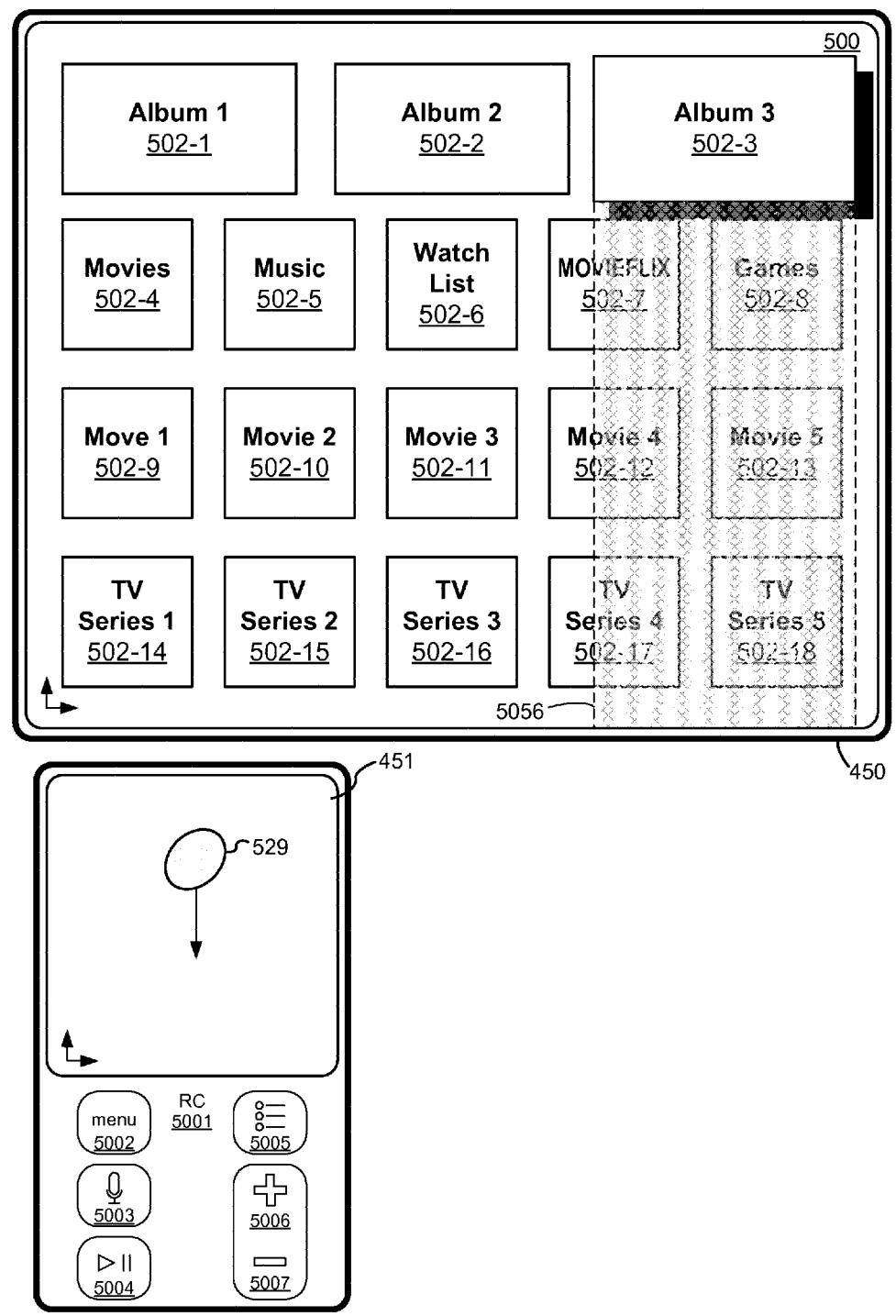

FIG. 5X shows a movement of contact 529 across touch-sensitive surface 451, which corresponds to a request to move the current focus down. In response to detecting the movement of contact 529, icon 502-3 is projected in the direction of the movement of contact 529, and user interface objects that overlap with projection 5056 (e.g., icons 502-7, 502-8, 502-12, 502-13, 502-17, and 502-18) are identified.

Figure 5Y:
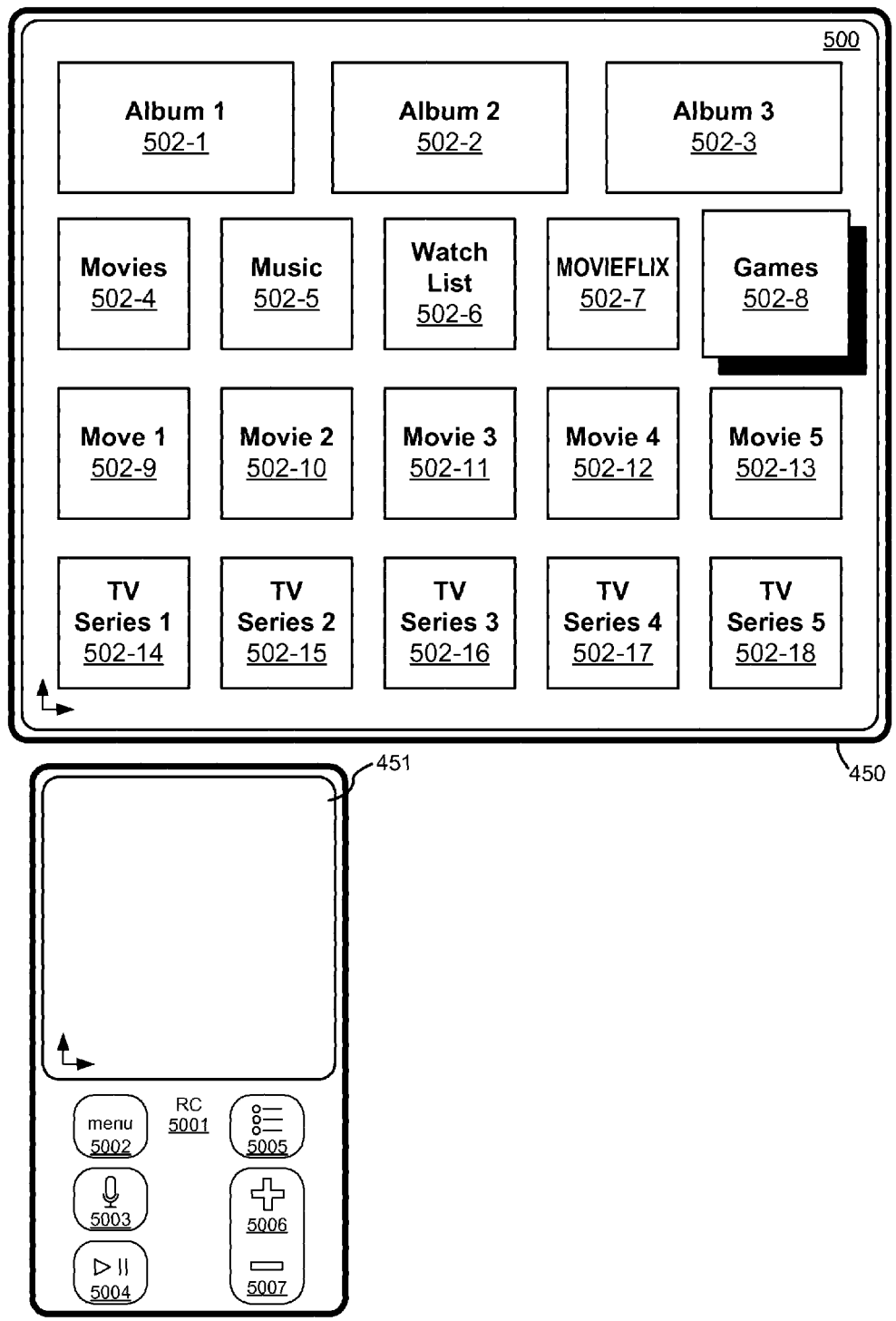

FIG. 5Y shows that an icon that is closer to icon 502-3 is selected (e.g., icon 502-8), and the current focus moves from icon 502-3 to icon 502-8.

Figure 5Z:
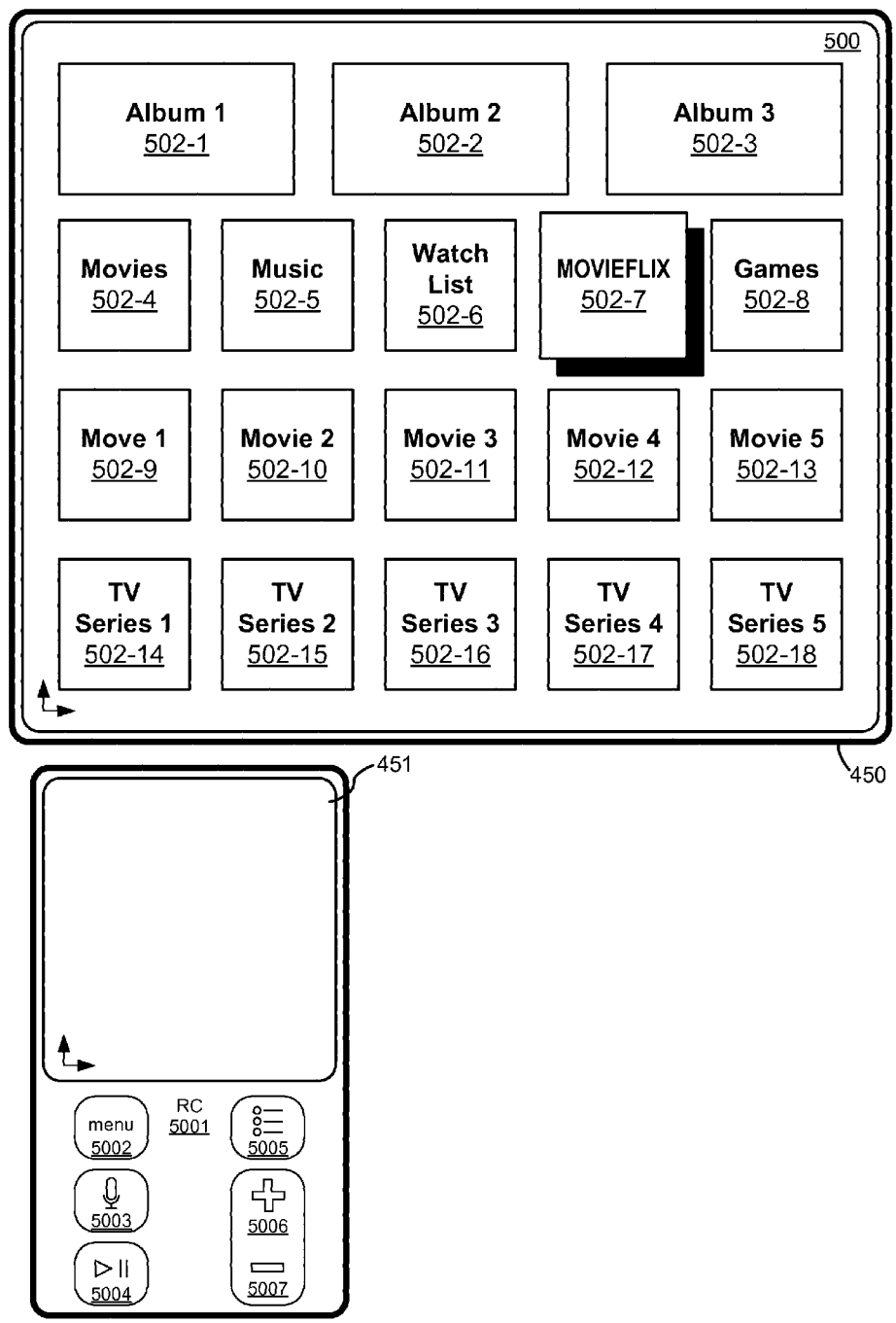
Figure 5A:
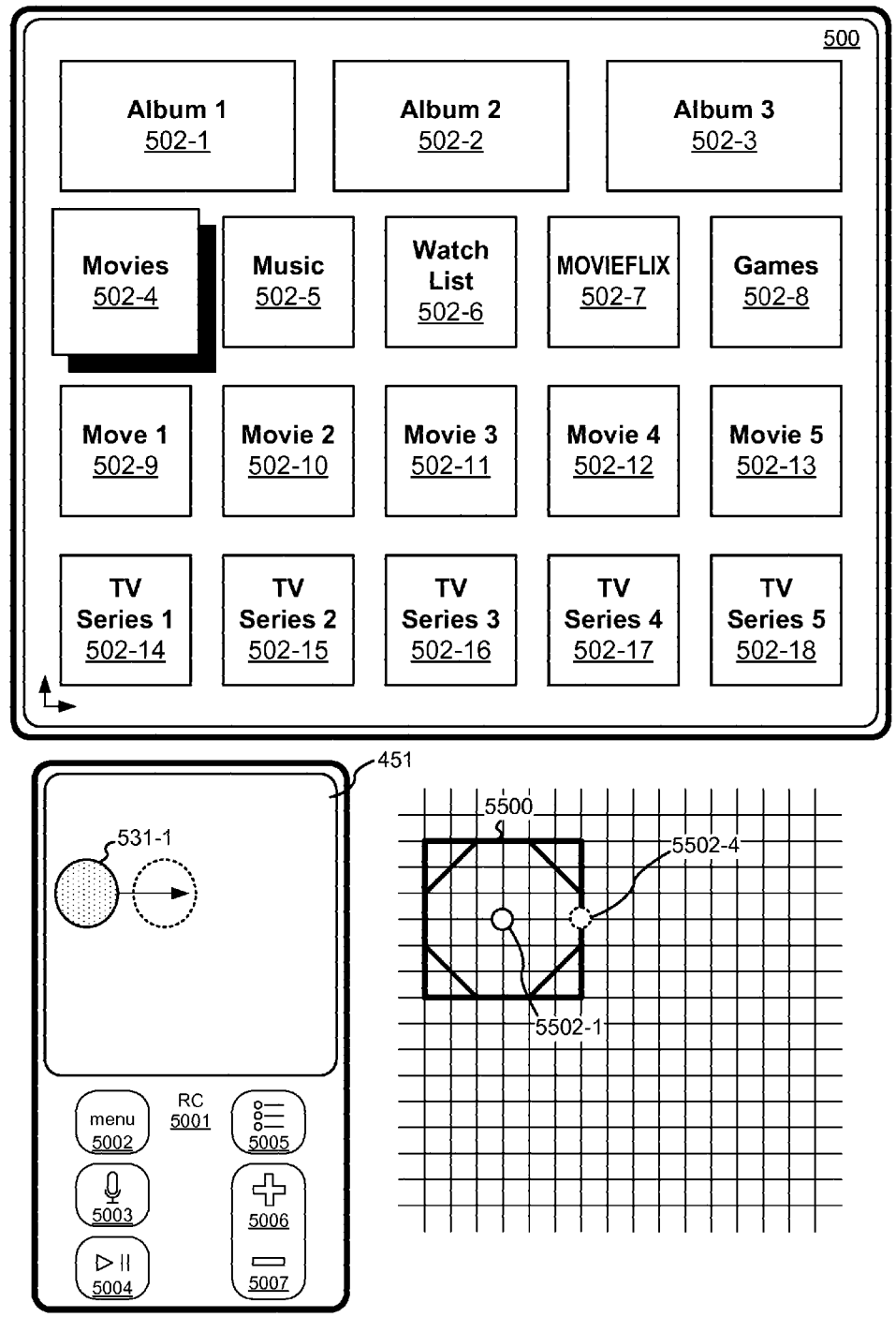
Figure 5B:
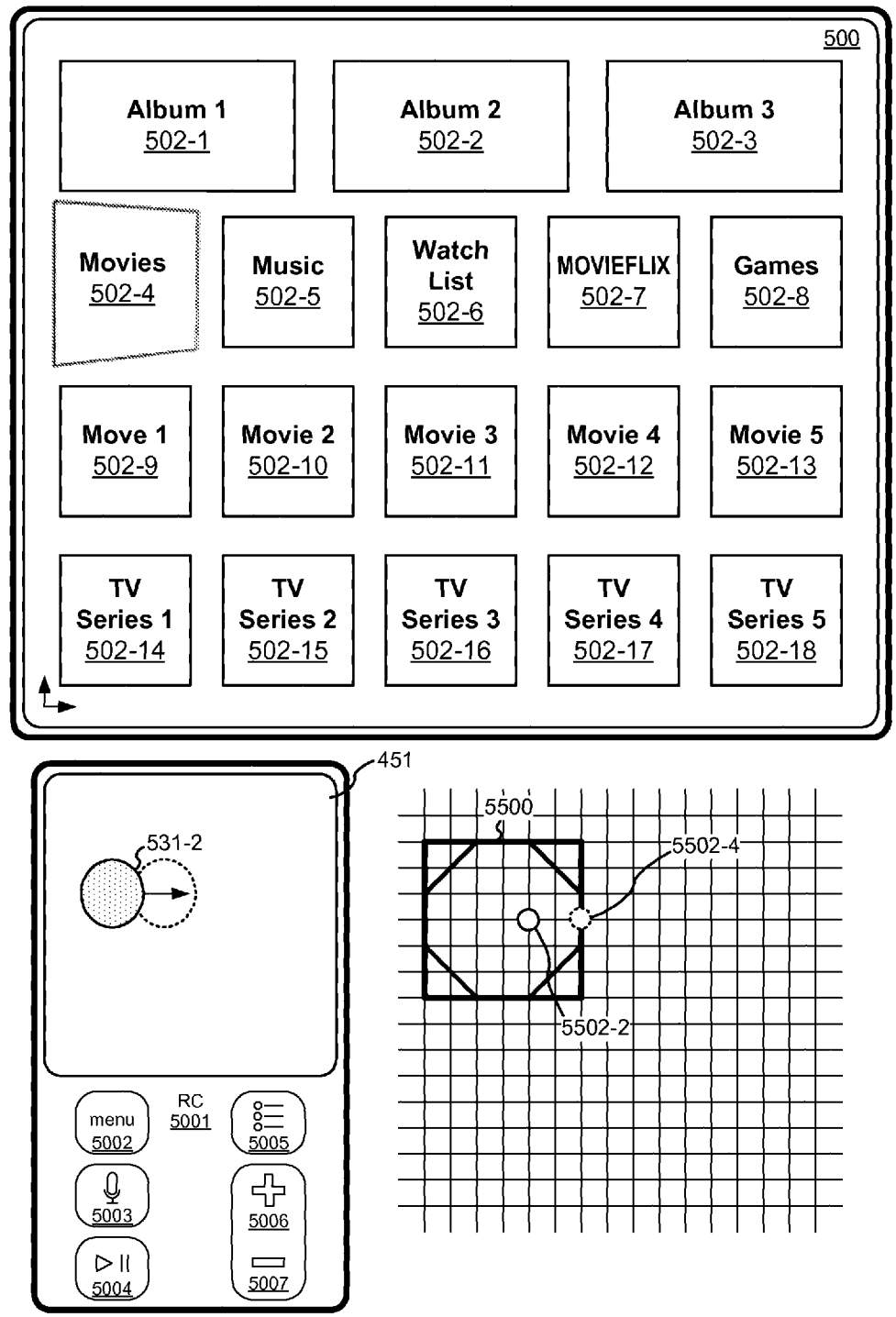
Figure 5C:
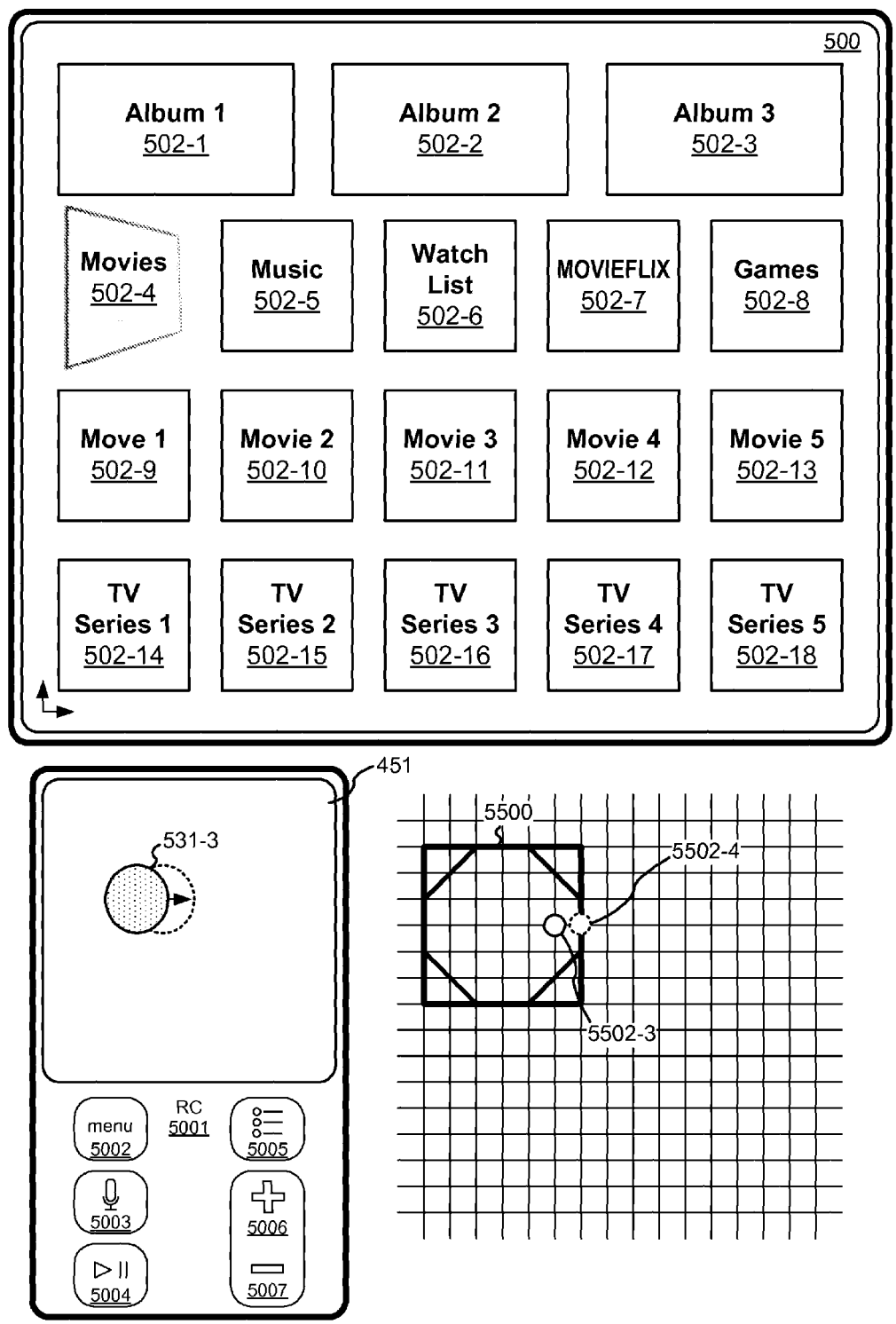
Figure 5D:
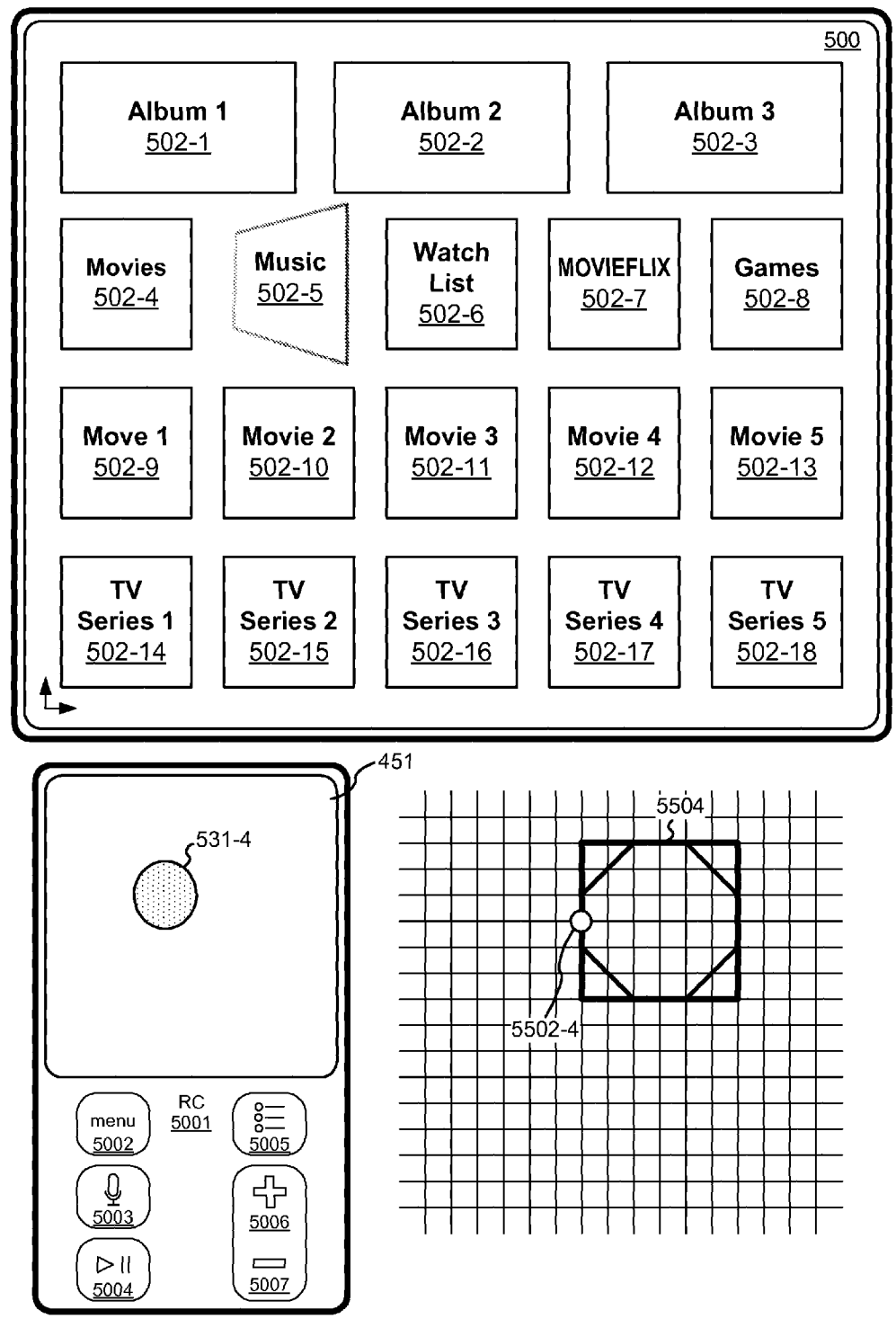
Figure 5E:
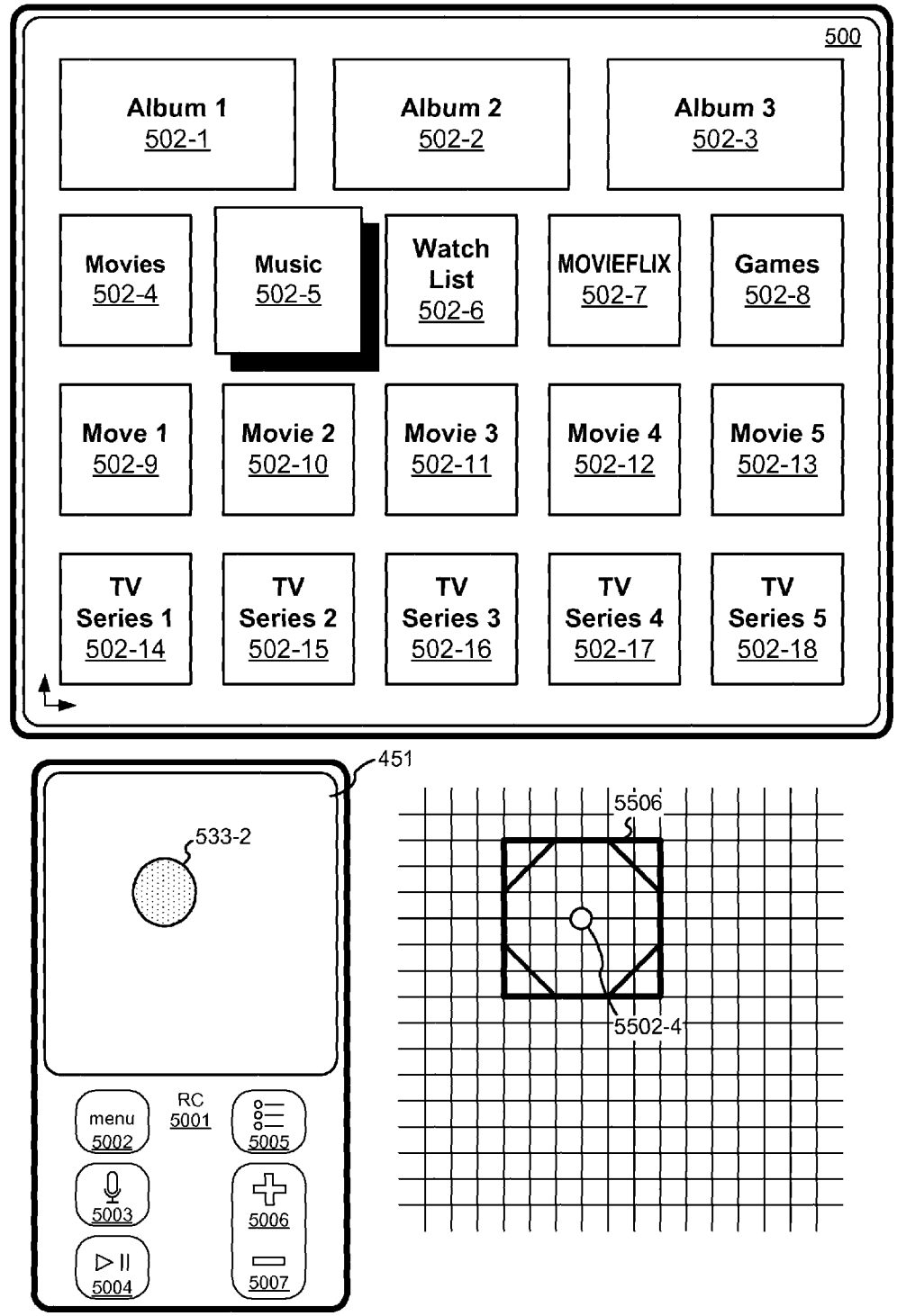
Figure 5F:
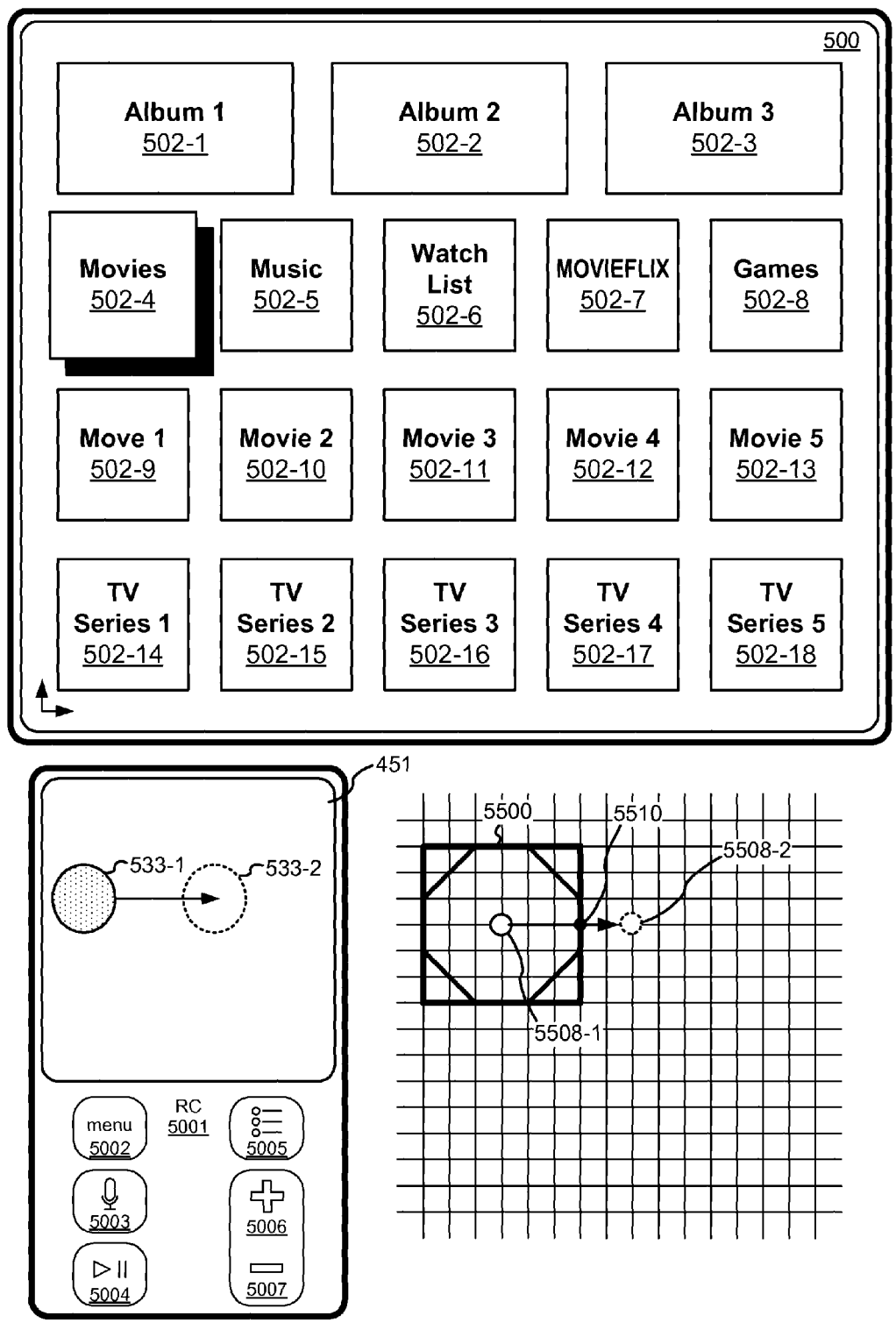
Figure 5G:
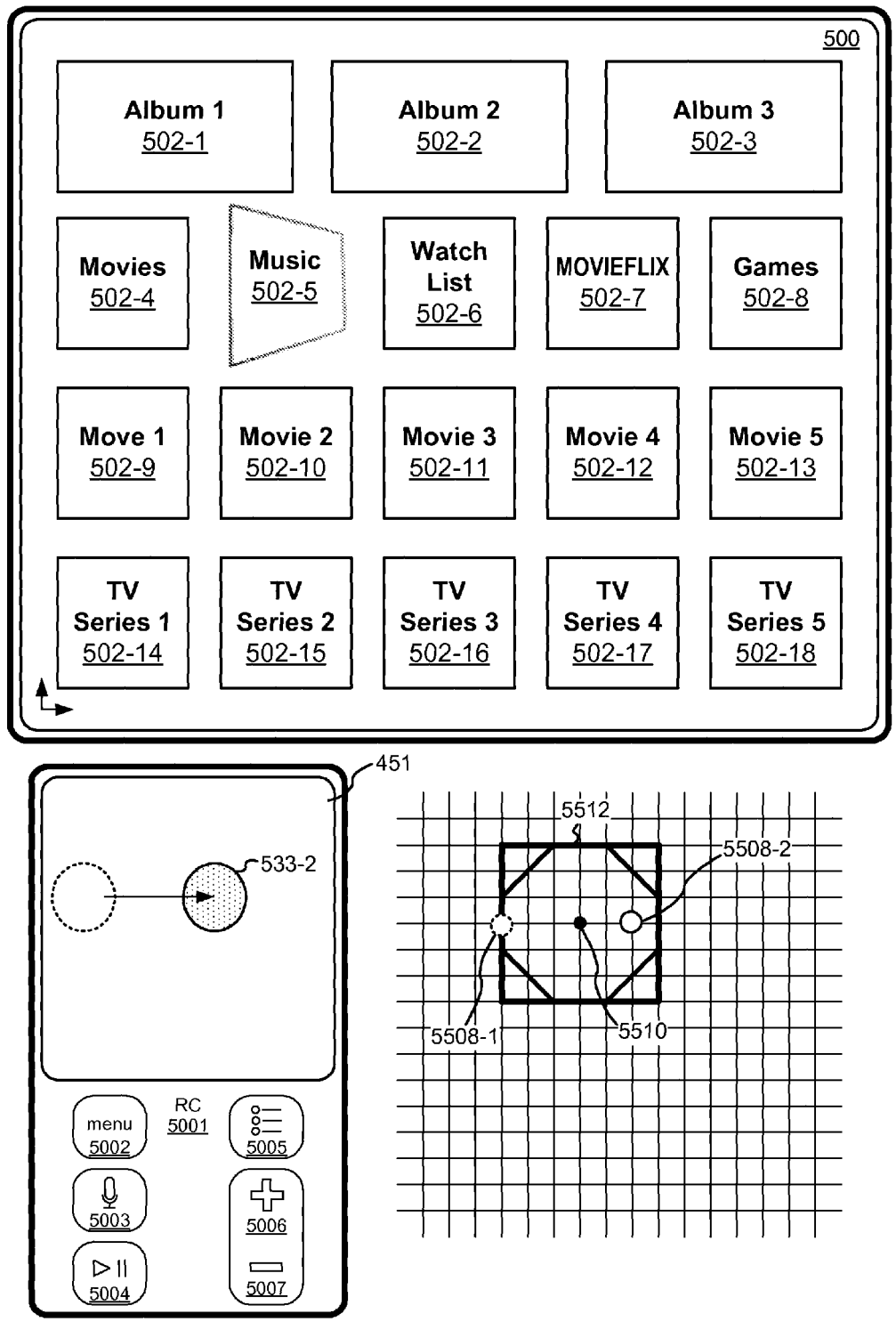

FIG. 5Z shows that, in response to the movement of contact 529, the current focus moves from icon 502-3 to icon 502-7 (instead of icon 502-8 as shown in FIG. 5Y), because the current focus previously moved from icon 502-7 to icon 502-3.

FIGS. 5AA-5GG illustrate moving the current focus in conjunction with providing an animation of tilting user interface objects in accordance with some embodiments.

FIGS. 5AA-5CC illustrate a movement of contact 531 from location 531-1 while the current focus is on icon 502-4. The movement of contact 531 is also illustrated using distance grid 5500, which shows a threshold distance at which the current focus moves to a next icon (e.g., a movement of contact 531 from initial location 5502-1 to threshold location 5502-4 initiates moving the current focus from a current icon to an adjacent icon).

FIG. 5BB shows that contact 531 has moved from location 531-1 to location 531-2, and icon 502-4 is tilted to indicate the movement of contact 531. Distance grid 5500 also shows that location of contact 531 has moved from location 5502-1 to location 5502-2.

FIG. 5CC shows that contact 531 has moved further from location 531-2 to location 531-3, and icon 502-4 is further tilted. Distance grid 5500 also shows that location of contact 531 has moved from location 5502-2 to location 5502-3, adjacent to threshold location 5502-4.

FIGS. 5DD-5EE illustrate a movement of contact 531 associated with moving the current focus from icon 502-4 to icon 502-5 in accordance with some embodiments.

FIG. 5DD shows an exemplary user interface that is shown in response to contact 531 moving from location 531-3 to location 531-4. In FIG. 5DD, icon 502-4 is shown without tilting, and icon 502-5 is tilted toward icon 502-4 to indicate that the current focus has moved from icon 502-4 to icon 502-5. In addition, new grid 5504 is shown in FIG. 5DD to indicate the location of the current focus relative to icon 502-5. In grid 5504, the location of contact 531-4 corresponds to location 5502-4, which is at an edge of grid 5504, indicating that a further movement of contact 531 toward the left side of touch-sensitive surface 451 will move the current focus back to icon 502-4.

FIG. 5EE shows an alternative user interface that is shown in response to contact 531 moving from location 531-3 to location 531-4. In FIG. 5EE, icon 502-4 is shown without tilting, and icon 502-5 is enlarged without tilting. Grid 5506 is shown in FIG. 5DD to indicate the location of the current focus relative to icon 502-5. In grid 5506, the location of contact 531-4 corresponds to location 5502-4, which is in the center of grid 5506, indicating that a movement of contact 531 from its current location 531-4 will initiate tilting of icon 502-5.

FIGS. 5FF-5GG illustrate a movement of contact 533 associated with moving the current focus from icon 502-4 to icon 502-5.

FIG. 5FF shows that contact 533 has moved from location 533-1 to location 533-2. Grid 5500 in FIG. 5FF shows that the movement of contact 533 from location 533-1 to location 533-2 corresponds to a movement of contact 533 from location 5508-1 in grid 5500 to location 5508-2 outside grid 5500, exceeding threshold location 5510.

FIG. 5GG shows that, in response to movement of contact 533 from location 533-1 to location 533-2, the current focus moves from icon 502-4 to icon 502-5. Grid 5512 associated with icon 502-5 is used to indicate the location of contact 533 relative to icon 502-5. In FIG. 5GG, icon 502-5 tilts in accordance with a portion of the movement of contact 533 from location 533-1 to location 533-2 that exceeds the threshold distance (e.g., a movement of the contact in grid 5500 or 5512 from location 5510 to location 5508-2).

FIGS. 6A-6B are flow diagrams illustrating method 600 of moving a current focus (e.g., to navigate through media content items) in accordance with some embodiments. Method 600 is performed at an electronic device (e.g., device 300, FIG. 3, or portable multifunction device 100, FIG. 1A) in communication with a display. In some embodiments, the electronic device is in communication with a user input device (e.g., a remote user input device, such as remote control 5001) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 600 are, optionally, combined and/or the order of some operations is, optionally, changed.

As described below, method 600 provides an efficient way to move a current focus (e.g., to navigate through media content items). The method reduces the number, extent, and/or nature of the inputs from a user when moving a current focus, thereby creating a more efficient human-machine interface. For battery-operated electronic devices, enabling a user to move a current focus faster and more efficiently conserves power and increases the time between battery charges.

In some embodiments, the device provides (602), to the display, data to present a user interface with a plurality of user interface objects (e.g., home screen user interface 500 in FIG. 5E). In some embodiments, the plurality of user interface objects is displayed in a scrollable two-dimensional array on the display (e.g., icons 502 in FIG. 5E). In some embodiments, the user interface objects are application icons, channel icons, content icons, or content group icons, which, when activated (e.g., by a tap gesture on touch-sensitive surface 451 of remote control 5001, or pressing play button 5004 of remote control 5001), lead to the display of a corresponding application, channel, content, or content group on the display (e.g., album icons 502-1 through 502-3, application icons 502-4 through 502-8, movie icons 502-9 through 502-13, and television series icons 502-14 through 502-18). In some embodiments, the plurality of user interface objects includes a first user interface object; and a current focus is on the first user interface object (e.g., the current focus is on icon 502-4 in FIG. 5E). In some embodiments, while the current focus is on a respective user interface object, the respective user interface object is visually distinguished from the other user interface objects in the plurality of user interface objects (e.g., in FIG. 5E, icon 502-4 is enlarged compared to application icons 502-5 through 502-8, and is shown with a shadow).

While the display is presenting the user interface, the device receives (604) a first input that corresponds to movement of a contact across the touch-sensitive surface of the user input device (e.g., an input that corresponds to movement of contact 507 across touch-sensitive surface 451 in FIG. 5E). In some embodiments, the movement of the contact across the touch-sensitive surface includes: a first component of movement of the contact that corresponds to movement along a first axis on the display (e.g., horizontal component 5104 in FIG. 5E), and a second component of movement of the contact that corresponds to movement along a second axis on the display that is perpendicular to the first axis (e.g., vertical component 5106 in FIG. 5E).

In some embodiments, the first axis is (606) a dominant axis of the movement of the contact across the touch-sensitive surface (e.g., in FIG. 5E, the horizontal axis is the dominant axis, because horizontal component 5104 is larger than vertical component 5106). In some embodiments, the method includes determining a dominant axis of the movement of the contact between the first predefined axis and the second predefined axis. For example, if the first distance exceeds the second distance, the device determines that the first axis is the dominant axis (e.g., the horizontal axis is a dominant axis in FIG. 5E). If the second distance exceeds the first distance, the device determines that the second axis is the dominant axis (e.g., the vertical axis is a dominant axis in FIG. 5I). In some embodiments, between the first axis and the second axis, the dominant axis is the axis along which there has been greater movement of the contact since touchdown of the contact on the touch-sensitive surface.

In some embodiments, the first axis is (608) determined as the dominant axis based in part on a number of prior swipe gestures along the first axis (e.g., the horizontal axis is determined as the dominant axis for the swipe gesture shown in FIG. 5O, based on prior horizontal swipe gestures shown in FIGS. 5M and 5N). For example, if three prior swipe gestures are horizontal swipe gestures, the likelihood of classifying the dominant axis for a current gesture as a horizontal axis is higher.

In some embodiments, the first axis is (610) a horizontal axis (e.g., left or right) and the second axis is a vertical axis (e.g., up or down).

In some embodiments, in response to receiving (612) the first input that corresponds to the movement of the contact across the touch-sensitive surface of the user input device: in accordance with a determination that the first axis is a dominant axis (e.g., based on a total direction of movement since touchdown): the device moves (614) a current focus in the user interface along the first axis by an amount that is based on the magnitude of the first component of movement; and moves the current focus in the user interface along the second axis by an amount that is based on the magnitude of the second component of movement (e.g., in FIG. 5E, the current focus moves based on horizontal and vertical components 5104 and 5106 of the movement of contact 507). The amount of movement of the current focus along the second axis is reduced relative to the amount of movement of the current focus along the first axis by a scaling factor that is based on a rate of movement of the contact across the touch-sensitive surface. For example, in FIG. 5E, scaled vertical component 5108 is used instead of vertical component 5106 to reduce the amount of vertical movement of the current focus. As shown in diagram 5200 of FIG. 5E, the scaling factor is determined based on the speed of movement of contact 507 across touch-sensitive surface 451.

In some embodiments, in accordance with a determination (616, FIG. 6B) that the second axis is a dominant axis (e.g., based on a total direction of movement since touchdown): the device moves a current focus in the user interface along the first axis by an amount that is based on the magnitude of the first component of movement; and moves the current focus in the user interface along the second axis by an amount that is based on the magnitude of the second component of movement (e.g., in FIG. 5I, the current focus moves based on horizontal and vertical components 5124 and 5126 of the movement of contact 511). The amount of movement of the current focus along the first axis is reduced relative to the amount of movement of the current focus along the second first by the scaling factor that is based on the rate of movement of the contact across the touch-sensitive surface. For example, in FIG. 5I, scaled horizontal component 5128 is used instead of horizontal component 5124 to reduce the amount of the horizontal movement of the current focus. As shown in diagram 5200 of FIG. 5I, the scaling factor is determined based on the speed of movement of contact 511 across touch-sensitive surface 451. This allows the user interface to provide feedback to a slow movement of a contact in two dimensions (e.g., the tilting and parallax that indicate the movement of the current focus in both up/down and right/left directions) while making the movement of the current focus precise when the contact moves quickly across the touch-sensitive surface.

In some embodiments, the electronic device determines a speed of the contact moving across the touch-sensitive surface (e.g., based on the coordinates provided by the user input device). In some embodiments, the user input device determines the speed and sends the speed data to the electronic device (e.g., the user input device determines the speed and sends the speed data to the electronic device, with or without coordinates of the contact).

In some embodiments, in accordance with a determination that a speed of the contact moving across the touch-sensitive surface satisfies one or more movement-component reduction criteria, a first scaling factor is used (618) as the scaling factor; and, in accordance with a determination that the speed of the contact moving across the touch-sensitive surface does not satisfy the one or more movement-component reduction criteria, a second scaling factor, that is lower than the first scaling factor, is used as the scaling factor. For example, in some cases, when the speed of the contact is higher than a predefined speed threshold, the first scaling factor of 10 is used (e.g., a 10× reduction), and, when the speed of the contact is lower than the predefined speed threshold, the second scaling factor of 2 is used (e.g., a 2× reduction). Thus, when the first axis is the dominant axis, if the speed of the contact satisfies the one or more movement-component reduction criteria, the amount of movement of the current focus along the second axis is reduced relative to the amount of movement of the current focus along the first axis by a factor of 10 and if the speed of the contact does not satisfy the one or more movement-component reduction criteria, the amount of movement of the current focus along the second axis is reduced relative to the amount of movement of the current focus along the first axis by a factor of 2 (e.g., when the contact is moving at a high speed, the amount of the movement of the current focus along the second axis is reduced further than when the contact is moving at a low speed, as shown in FIGS. 5K-5L).

In some embodiments, the speed of the contact moving across the touch-sensitive surface is (620) determined at each detection time of a sequence of detection times based on the movement of the contact between the detection time and an immediately preceding detection time (e.g., the movement of the contact is detected at a predefined rate, such as 60 Hz, and the speed is determined at the same predefined rate).

In some embodiments, the second scaling factor is determined (622) in accordance with the speed of the contact across the touch-sensitive surface. In some embodiments, the second scaling factor (and/or a ratio of the first scaling factor to the second scaling factor) is a number higher than 1 (e.g., a number above 1, such as 2, 3, 4, 5, 6, 7, 8, 9, or 10). For example, when the first scaling factor is 10 (e.g., a 10× reduction) and the second scaling factor is 2 (e.g., a 2× reduction), the ratio of the first scaling factor to the second scaling factor is 5 (=10/2).

In some embodiments, the scaling factor increases (624) as the speed of the contact across the touch-sensitive surface increases (e.g., in diagram 5200 shown in FIG. 5E, the scaling factor increases as the speed of the contact increases in a certain range of speed). In some embodiments, a ratio of the second scaling factor to the first scaling factor increases as the speed of the contact across the touch-sensitive surface increases.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6B. For example, the movement of the current focus described above with reference to method 600 optionally has one or more of the characteristics of the movement of the current focus described herein with reference to other methods described herein (e.g., methods 700 and 800). For brevity, these details are not repeated here.

The operations described above with reference to FIGS. 6A-6B are, optionally, implemented by components depicted in FIGS. 1A-1B or FIG. 9 (discussed below). For example, receiving operation 604, and current focus moving operation 614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 7C:
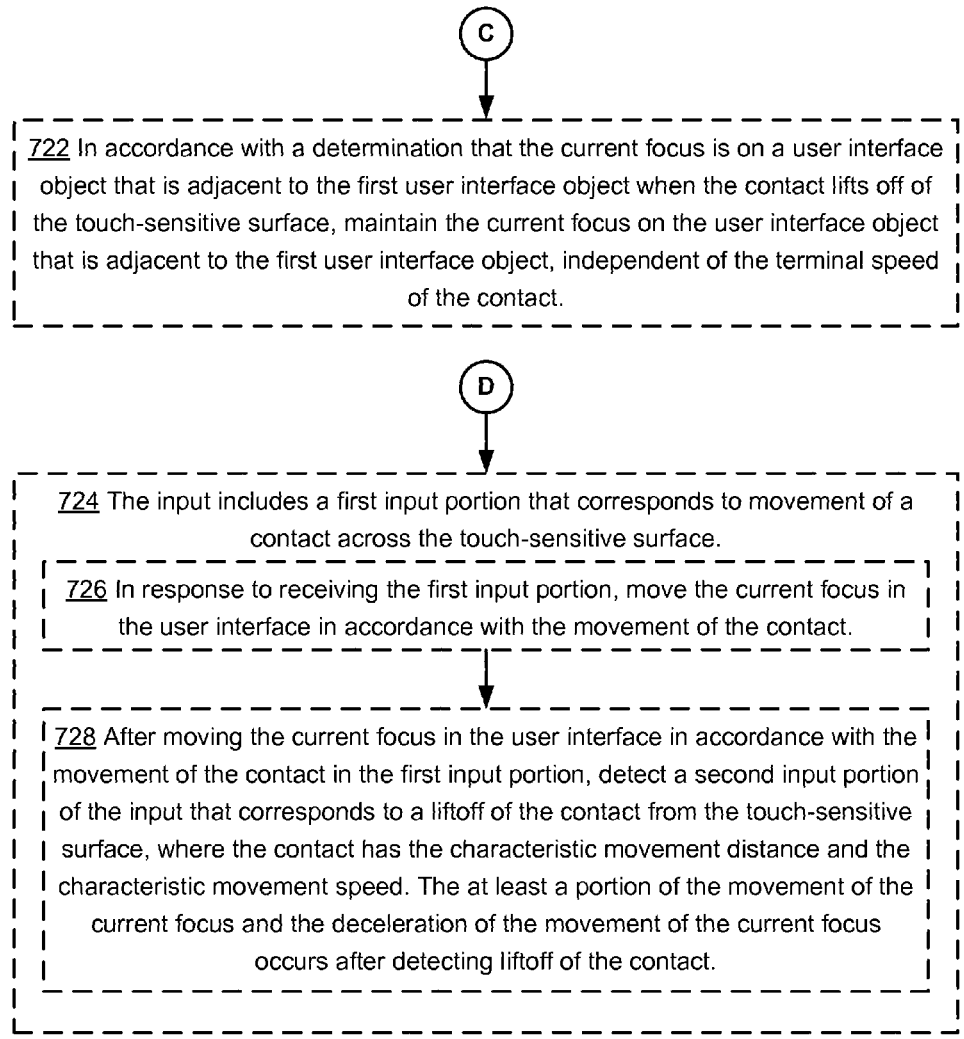

FIGS. 7A-7C are flow diagrams illustrating method 700 of moving a current focus (e.g., to navigate through user interface objects on a display) in accordance with some embodiments. Method 700 is performed at an electronic device (e.g., device 300, FIG. 3, or portable multifunction device 100, FIG. 1A) in communication with a display. In some embodiments, the electronic device is in communication with a user input device (e.g., a remote user input device, such as remote control 5001) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 700 are, optionally, combined and/or the order of some operations is, optionally, changed.

As described below, method 700 provides an efficient way to move a current focus (e.g., to navigate through user interface objects on a display). The method reduces the number, extent, and/or nature of the inputs from a user when moving a current focus, thereby creating a more efficient human-machine interface. For battery-operated electronic devices, enabling a user to move a current focus faster and more efficiently conserves power and increases the time between battery charges.

The device provides (702), to the display, data to present a user interface that includes: a plurality of user interface objects, and a current focus on a first user interface object of the plurality of user interface objects (e.g., home screen user interface 500 with the current focus on icon 502-4 as shown in FIG. 5Q). While the display is presenting the user interface, the device receives (704) an input that corresponds to a gesture (e.g., a swipe gesture on touch-sensitive surface 451 in FIG. 5Q) detected on the touch-sensitive surface of the user input device. The gesture includes a movement of a contact (e.g., contact 521 in FIG. 5Q) across the touch-sensitive surface followed by a lift-off of the contact from the touch-sensitive surface. The gesture includes a characteristic movement distance (e.g., a distance traveled by contact 521 in FIG. 5Q from a touchdown until the liftoff) and a characteristic movement speed (e.g., a velocity at liftoff or just before liftoff that is identified as the "liftoff" velocity).

In accordance with a determination (706) that the gesture satisfies coasting criteria (e.g., the characteristic movement distance satisfies a predefined distance threshold and/or the characteristic movement speed satisfies a predefined speed threshold, or a weighted sum of the characteristic movement distance and the characteristic movement speed satisfies a predefined threshold): the device moves (708) the current focus in the user interface (e.g., after detecting the end of the gesture). For example, the current focus discretely moves from its first user interface object to a destination user interface object, including sequentially highlighting the first user interface object, the destination user interface object, and any user interface objects located between the first user interface object and the destination user interface object in a sequence of user interface objects from the first user interface object to the destination user interface object (e.g., the current focus discretely moves from icon 502-4 to icon 502-8, sequentially highlighting icons in-between, such as icons 502-5, 502-6, and 502-7, in a manner analogous to those shown in FIGS. 5A-5C). In some embodiments, while the contact is detected on the touch-sensitive surface, the destination user interface object with the current focus is enlarged, and tilted based the first input (e.g., destination icon 502-5 is tilted in FIG. 5GG). Subsequent to the contact ceasing to be detected on the touch-sensitive surface, the destination user interface object is enlarged without tilting.

In some embodiments, prior to decelerating the movement of the current focus, in accordance with the determination that the gesture satisfies the coasting criteria, the current focus moves (710) on the display at a speed that corresponds to the speed of movement of the contact at an end of the gesture (e.g., upon the lift-off of the contact from the touch-sensitive surface). For example, the speed of the movement of the current focus in FIG. 5Q at time point 5304-2, when contact 521 is lifted off, corresponds to the speed of the movement of the current focus on display 450 before its deceleration starts. In some embodiments, the speed at which the current focus moves on the display upon liftoff of the contact from the touch-sensitive surface corresponds to the terminal speed of the contact upon lift-off of the contact. In some embodiments, because the dimensions of the touch-sensitive surface (e.g., touch-sensitive surface 451 of remote control 5001) are typically less than the dimensions of the display (e.g., display 450), the terminal speed of the contact upon lift-off is scaled up to a corresponding speed of the current focus moving on the display.

In accordance with a determination that the gesture satisfies coasting criteria: the device also decelerates (712) movement of the current focus across the series of user interface objects at a first deceleration rate that is based on the characteristic movement distance of the gesture, and the characteristic movement speed of the gesture (e.g., the movement of the current focus decelerates at a deceleration rate, shown in diagram 5400 or diagram 5402 of FIG. 5Q, which is based on a weighed sum of the characteristic speed of the gesture and the characteristic movement distance of the gesture). In some embodiments, movement of the current focus stops when the speed of the movement falls below a minimum threshold speed. In some embodiments, the first deceleration rate is determined based on the characteristic movement speed of the gesture and a simulated physical parameter that is selected based on the characteristic movement distance and the characteristic movement speed. In some embodiments, the simulated physical parameter includes one or more of inertia and friction. In some embodiments, the friction is increased for shorter distances and slower speeds and is decreased for longer distances and faster speeds.

In some embodiments, in accordance with a determination that a movement metric based on both the characteristic movement distance of the gesture and the characteristic movement speed of the gesture satisfies a first movement-metric threshold (e.g., a dimensionless weighted sum is above a first deceleration rate threshold), the device decelerates (714, FIG. 7B) movement of the current focus across the series of user interface objects using a first deceleration rate (e.g., a slow deceleration rate, such as an exponential decay with a small decay constant). For example, when the dimensionless weighted sum of the characteristic movement distance of the gesture and the characteristic movement speed of the gesture is above threshold 5406 shown in diagram 5402 of FIG. 5Q, the device decelerates movement of the current focus as $rate_1$.

In some embodiments, the first deceleration rate is used based on a determination that the weighted sum of the distance of the movement of the contact across the touch-sensitive surface and the terminal speed of the contact satisfies the first deceleration rate threshold, independent of a variation in the distance of the movement of the contact across the touch-sensitive surface and/or a variation in the terminal speed of the contact, provided the weighted sum satisfies the first deceleration rate threshold. For example, the first deceleration rate is selected for both: (1) a first weighted sum of a first distance of the movement of the contact across the touch-sensitive surface and a first terminal speed of the contact (e.g. a long travel distance at a low speed), and (2) a second weighted sum, distinct from the first weighted sum, of a second distance of the movement of the contact across the touch-sensitive surface and a second terminal speed of the contact (e.g., a short travel distance at a high speed), provided the first weighted sum and the second weighted sum each satisfy the first deceleration rate threshold.

In some embodiments, in accordance with a determination that the movement metric based on both the characteristic movement distance of the gesture across the touch-sensitive surface and the characteristic movement speed of the gesture satisfies a second movement-metric threshold (e.g., the dimensionless weighted sum is below a second deceleration rate threshold), the device decelerates (716) movement of the current focus across the series of user interface objects using a second deceleration rate that is distinct from the first deceleration rate (e.g., when the dimensionless weighted sum of the characteristic movement distance of the gesture and the characteristic movement speed of the gesture is below threshold 5408 shown in diagram 5402 of FIG. 5Q, the device decelerates movement of the current focus as rate$_2$). In some embodiments, the second deceleration rate is higher than the first deceleration rate (e.g., the second deceleration rate is a fast deceleration rate, such as an exponential decay with a large decay constant). In some embodiments, the second deceleration threshold is identical to the first deceleration threshold (e.g., diagram 5400 in FIG. 5Q).

In some embodiments, in accordance with a determination that the movement metric based on both of the characteristic movement distance of the gesture and the characteristic movement speed of the gesture meets movement-metric criteria based on the first movement-metric threshold and the second movement-metric threshold (e.g., the weighted sum is between threshold 5406 and threshold 5408), the device decelerates (718) movement of the current focus across the series of user interface objects using a third deceleration rate that is distinct from the first deceleration rate and the second deceleration rate (e.g., rate$_3$ in diagram 504 of FIG. 5Q). In some embodiments, the third deceleration rate is between the first deceleration rate and the second deceleration rate. In some embodiments, the third deceleration rate is predefined (e.g., fixed). In some embodiments, the third deceleration rate is an interpolation between the first deceleration rate and the second deceleration rate.

In some embodiments, in accordance with a determination that the gesture satisfies distance criteria (and optionally, that the gesture meets the first movement-metric threshold), distinct from the coasting criteria, the device moves (720) the current focus from the first user interface object to a user interface object that is adjacent to the first user interface object (e.g., in FIGS. 5R-5S, a movement of contact 523 on touch-sensitive surface 451 initiates moving the current focus from icon 502-4 to adjacent icon 502-5). In some embodiments, the distance criteria are satisfied if the distance of the movement of the contact across the touch-sensitive surface during the gesture corresponds to a distance on the display that is greater than a predefined fraction, less than 1, of a dimension of the first user interface object (e.g., a width or height of the first user interface object). For example, if the distance of a movement of the contact across the touch-sensitive surface during a horizontal swipe gesture corresponds to a distance on the display that is greater than a predefined fraction (e.g., 15%, 25%, 30%, 40%, or 50%) of the width of the first user interface object (e.g., distance threshold 5038 in FIG. 5R), the current focus moves horizontally to the adjacent user interface object on the display. The distance criteria make it easy to move the current focus to an adjacent user interface object with a short swipe gesture on the touch-sensitive surface. In some embodiments, moving the current focus from the first user interface object contact to a user interface object that is adjacent to the first user interface object is independent of the terminal speed of the contact upon the lift-off of the contact from the touch-sensitive surface (e.g., as shown in FIG. 5S, movement 5036 with a slow speed and movement 5044 with a fast speed both initiate moving the current focus from icon 502-4 to adjacent icon 502-5).

In some embodiments, in accordance with a determination that the current focus is on a user interface object that is adjacent to the first user interface object when the contact lifts off of the touch-sensitive surface (e.g., and, optionally, that the gesture meets the first movement-metric threshold), the device maintains (722, FIG. 7C) the current focus on the user interface object that is adjacent to the first user interface object, independent of the terminal speed of the contact. For example, in FIGS. 5T-5U, if the current focus is on icon 502-5 when contact 525 lifts off of touch-sensitive surface 451, the current focus is maintained on icon 502-5 regardless of whether the characteristic speed of contact 525 is high (e.g., as represented by movement 5046 in FIG. 5U) or slow (e.g., as represented by movement 5052 in FIG. 5U). This makes it easy to move the current focus to an adjacent user interface object with a swipe gesture on the touch-sensitive surface, without overshooting the current focus to another user interface object.

In some embodiments, the input includes (724) a first input portion that corresponds to movement of a contact across the touch-sensitive surface (e.g., the movement of contact from location 521-1 to location 521-2 in FIG. 5Q). In response to receiving the first input portion, the device moves (726) the current focus in the user interface in accordance with the movement of the contact (e.g., movement 5032 of the current focus in FIG. 5Q). After moving the current focus in the user interface in accordance with the movement of the contact in the first input portion, the device detects (728) a second input portion of the input that corresponds to a liftoff of the contact from the touch-sensitive surface (e.g., the lift-off of the contact at location 521-2 as shown in FIG. 5Q), where the contact has the characteristic movement distance and the characteristic movement speed, (e.g., a velocity at liftoff or just before liftoff that is identified as the "liftoff" velocity). In some embodiments, at least a portion of the movement of the current focus and the deceleration of the movement of the current focus occurs after detecting liftoff of the contact (e.g., in response to detecting the second input portion). For example, movement 5034 of the current focus with a deceleration during time period 5306 occurs after the lift-off of contact 521 at time point 5304-2.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIGS. 7A-7C. For example, the movement of the current focus described above with reference to method 700 optionally has one or more of the characteristics of the movement of the current focus described herein with reference to other methods described herein (e.g., methods 600 and 800). For brevity, these details are not repeated here.

The operations described above with reference to FIGS. 7A-7C are, optionally, implemented by components depicted in FIGS. 1A-1B or FIG. 10 (discussed below). For example, receiving operation 704 and current focus moving operation 708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer

180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8C are flow diagrams illustrating method 800 of moving a current focus (e.g., to navigate through media content) in accordance with some embodiments. Method 800 is performed at an electronic device (e.g., device 300, FIG. 3, or portable multifunction device 100, FIG. 1A) in communication with a display. In some embodiments, the electronic device is in communication with a user input device (e.g., a remote user input device, such as a remote control, that is separate and distinct from the electronic device and the display) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 800 are, optionally, combined and/or the order of some operations is, optionally, changed.

As described below, method 800 provides an efficient way to move a current focus (e.g., to navigate through user interface objects on a display using a remote control). The method reduces the number, extent, and/or nature of the inputs from a user when moving a current focus, thereby creating a more efficient human-machine interface. For battery-operated electronic devices, enabling a user to move current focus faster and more efficiently conserves power and increases the time between battery charges.

In some embodiments, the device provides (802), to the display, data to present a user interface that includes: a plurality of user interface objects (e.g., icons 502 in home screen user interface 500 as shown in FIG. 5V). The plurality of user interface objects includes a first group of user interface objects (e.g., a first row of user interface objects or a first column of user interface objects, such as a row of application icons 502-4 through 502-8) and a second group of user interface objects (e.g., a second row of user interface objects or a second column of user interface objects, such as a row of album icons 502-1 through 502-3); and the first group of user interface objects includes at least a first user interface object (e.g., icon 502-7). The user interface also includes a current focus on the first user interface object of the first group of user interface objects (e.g., icon 502-7 is visually distinguished from the rest of application icons in FIG. 5V).

In some embodiments, the first group of user interface objects corresponds (804) to user interface objects of a first type (e.g., the first group of user interface objects are application icons 502-4 through 502-8 in FIG. 5V), and the second group of user interface objects corresponds to user interface objects of a second type that is distinct from the first type (e.g., the second group of user interface objects are album icons 502-1 through 502-3 in FIG. 5V). In some embodiments, the first group of user interface objects corresponds to media content from a first media content source (e.g., media content items from Movieflix) and the second group of user interface objects corresponds to media content from a second media content source that is distinct from the first media content source (e.g., television series from a particular television channel).

While the display is presenting the user interface that includes the plurality of user interface objects, the device receives (806) a first input that corresponds to a first user input on the user input device (e.g., movement of contact 527 in FIG. 5V). In response to receiving (808) the first input and in accordance with a determination that the first user input on the user input device corresponds to a request to move the current focus to a user interface object in the second group of user interface objects (e.g., a swipe gesture toward the second group of user interface objects, such as movement of contact 527 in FIG. 5V, or pressing a directional button that corresponds to a direction toward the second group of user interface objects), the device determines (810) a projection of the first user interface object in a direction on the display that corresponds to a direction of the first user input on the user input device (e.g., projection 5054 of icon 502-7 in FIG. 5V); identifies (812) one or more user interface objects that overlap with the projection of the first user interface object in the direction on the display that corresponds to the direction of the first user input on the user input device (e.g., using a hit test with projection 5054 of icon 502-7, icons 502-2 and 502-3 are identified as user interface objects that overlap with projection 5054 of icon 502-7 in FIG. 5V); and moves (814) the current focus to a second user interface object of the one or more identified user input objects (e.g., the current focus moves to icon 502-3 in FIG. 5W). In some embodiments, the projection of the first user interface object is a "beam" or area whose width corresponds to the width of the first user interface object perpendicular to the direction on the display that corresponds to the direction of the first user input on the user input device, as shown in FIG. 5V. In some embodiments, the projection of the first user interface object is a rectangular area, as shown in FIG. 5V. In some embodiments, the projection of the first user interface object is not displayed on the display. For example, although projection 5054 of icon 502-7 is shown in FIG. 5V to illustrate the above-discussed operations, projection 5054 of icon 502-7 is not included in user interface 500 (e.g., projection 5054 of icon 502-7 is not displayed on display 450).

In some embodiments, in response to receiving the first input and in accordance with the determination that the first user input on the user input device corresponds to a request to move the current focus to a user interface object in the second group of user interface objects, the device selects (816, FIG. 8B) the second user interface object of the one or more identified user interface objects as a destination of the current focus (e.g., between icons 502-2 and 502-3 that overlap with the projection of icon 502-7, icon 502-3 is selected as the destination of the current focus in FIG. 5W).

In some embodiments, the second user interface object of the one or more identified user interface objects is (818) selected based on a distance between the first user interface object and the second user interface object. For example, a user interface object that is the closest to the first user interface object of the one or more user interface objects that overlap with the projection of the first user interface object is selected as the destination of the current focus (e.g., between icons 502-2 and 502-3 that overlap with projection 5054 of icon 502-7 as shown in FIG. 5V, icon 502-3, which has a shorter center-to-center distance to icon 502-7 than a center-to-center distance from icon 502-2 to icon 502-7, is selected as the destination of the current focus in FIG. 5W).

In some embodiments, for two icons that are the same distance from the icon with a current focus, the icon with greater overlap with the projection of the icon with the current focus is chosen.

In some embodiments, the second user interface object of the one or more identified user interface objects is selected (820) as a destination of the current focus in response to the first user input (e.g., the selection operation is performed in response to the movement of contact 527 in FIG. 5V, without preselecting icon 502-3 as a destination of the current focus from icon 502-7 prior to the movement of contact 527).

In some embodiments, the first group of user interface objects is arranged (822) in a first sequence (e.g., application icons 502-4 through 502-8 are arranged in a row); the first user interface object is located at a position other than a first position (e.g., other than a left-most position) in the first sequence (e.g., icon 502-7 is not the left-most icon among application icons 502-4 through 502-8); the second group of user interface objects is arranged in a second sequence (e.g., album icons 502-1 through 502-3 are arranged in a row); the second user interface object is located at a position, in the second sequence, that is distinct from the position of the first user interface object in the first sequence (e.g., icon 502-3 is the third icon from the left, among album icons 502-1 through 502-3, and icon 502-7 is the fourth icon from the left, among application icons 502-4 through 502-8). After moving the current focus to the second user interface object, while the current focus is on the second user interface object of the second group of user interface objects, the device receives a second input that corresponds to a second user input on the user input device (e.g., in FIG. 5X, the movement of contact 529 is received while the current focus is on icon 502-3). In response to receiving the second input and in accordance with a determination that the second user input on the user input device corresponds to a request to move the current focus to a user interface object in the first group of user interface objects, the device moves the current focus back to the first user interface object (e.g., in response to the movement of contact 529 shown in FIG. 5X, the current focus moves back to icon 502-7 as shown in FIG. 5Z).

In some embodiments, the user input device is (824, FIG. 8C) a remote user input device that includes a touch-sensitive surface (e.g., remote control 5001 with touch-sensitive surface 451); and the first user input includes a movement of a contact across the touch-sensitive surface (e.g., in a first direction).

In some embodiments, the device further determines (826) whether the movement of the contact exceeds pre-defined movement criteria (e.g., a predefined distance threshold); and, in response to determining that a distance of the movement of the contact exceeds the predefined movement criteria: the device moves the current focus to the second user interface object; and tilts the second user interface object in accordance with a distance of the movement of the contact that exceeds the predefined movement criteria (e.g., a predefined distance threshold). For example, as shown in FIGS. 5AA-5DD, a movement of contact 531 by the predefined distance threshold (e.g., a movement of contact 531 from location 531-1 to location 531-4, which corresponds to a movement from location 5502-1 to location 5502-4 in grid 5500) initiates movement of the current focus from icon 502-4 to icon 502-5. As shown in FIGS. 5EE-5FF, a further movement of the contact (e.g., a movement of contact 533 from location 533-1 to location 533-2), exceeding the predefined distance threshold, initiates tilting the second user interface object (e.g., in addition to moving the current focus from icon 502-4 to icon 502-5, icon 502-5 is tilted based on the distance traveled by contact 533 more than the predefined distance threshold).

In some embodiments, the current focus moves (828) to the second user interface object in accordance with a scaled movement of the contact across the touch-sensitive surface (e.g., as described above with respect to FIGS. 5A-5P and FIGS. 6A-6B, the scaled movement component is used to improve an alignment of an input on touch-sensitive surface 451 with either a horizontal axis or a vertical axis).

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8C. For example, the movement of the current focus described above with reference to method 800 optionally has one or more of the characteristics of the movement of the current focus described herein with reference to other methods described herein (e.g., methods 600 and 700). For brevity, these details are not repeated here.

The operations described above with reference to FIGS. 8A-8C are, optionally, implemented by components depicted in FIGS. 1A-1B or FIG. 11 (discussed below). For example, receiving operation 806, and current focus moving operation 814 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9:
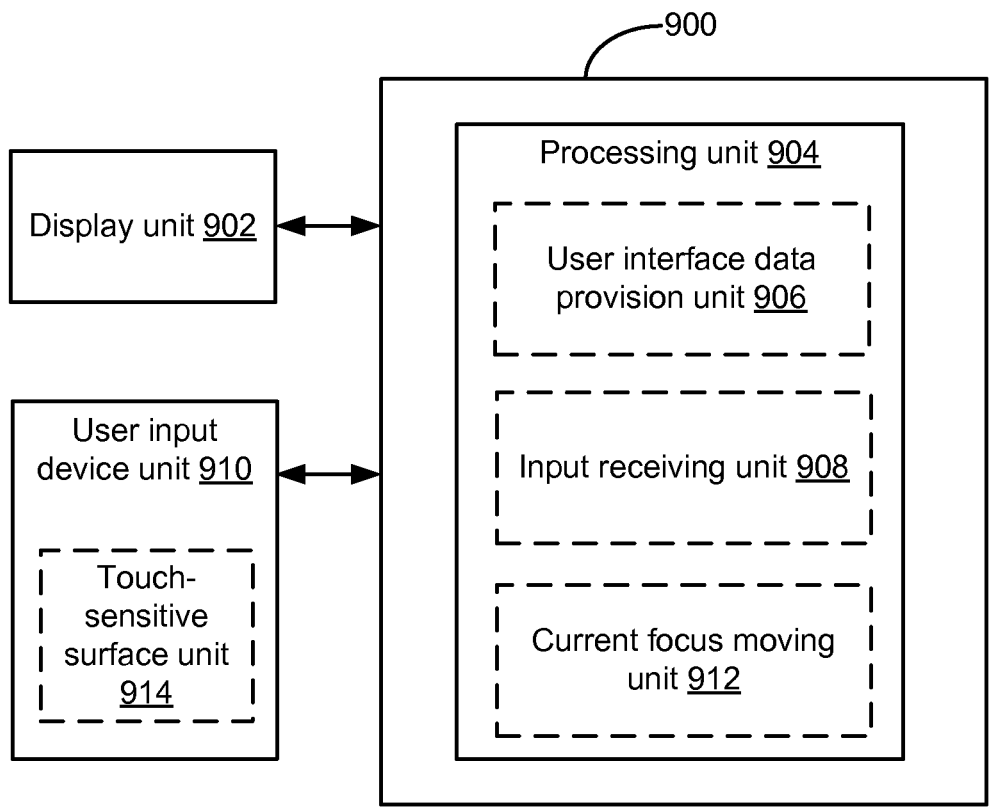
FIGS. 9-11 are functional block diagrams of electronic devices in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, electronic device 900 is in communication with display unit 902 and user input device unit 910

(e.g., a remote controller), which includes touch-sensitive surface unit 914. Display unit 902 is configured to display user interfaces. User input device unit 910 is configured to detect user inputs. Electronic device 900 includes processing unit 904. In some embodiments, processing unit 904 includes user interface data provision unit 906, input receiving unit 908, and current focus moving unit 912.

Processing unit 904 is configured to provide, to display unit 902 (e.g., using user interface data provision unit 906), data to present a user interface with a plurality of user interface objects. The plurality of user interface objects includes a first user interface object; and a current focus is on the first user interface object. While display unit 902 (e.g., using user interface data provision unit 906) is presenting the user interface, processing unit 904 is configured to receive (e.g. with input receiving unit 908, and/or, optionally in conjunction with user input device unit 910) a first input that corresponds to movement of a contact across touch-sensitive surface unit 914 of user input device unit 910. The movement of the contact across touch-sensitive surface unit 914 includes: a first component of movement of the contact that corresponds to movement along a first axis on display unit 902 (e.g., using user interface data provision unit 906), and a second component of movement of the contact that corresponds to movement along a second axis on display unit 902 (e.g., using user interface data provision unit 906) that is perpendicular to the first axis.

Processing unit 904 is configured to, in response to receiving (e.g. with input receiving unit 908 or, optionally in conjunction with user input device unit 910) the first input that corresponds to the movement of the contact across touch-sensitive surface unit 914 of user input device unit 910, in accordance with a determination that the first axis is a dominant axis: move (e.g., with current focus moving unit 912) a current focus in the user interface along the first axis by an amount that is based on the magnitude of the first component of movement; and move (e.g., with current focus moving unit 912) the current focus in the user interface along the second axis by an amount that is based on the magnitude of the second component of movement, wherein the amount of movement of the current focus along the second axis is reduced relative to the amount of movement of the current focus along the first axis by a scaling factor that is based on a rate of movement of the contact across touch-sensitive surface unit 914.

Processing unit 904 is configured to, in accordance with a determination that the second axis is a dominant axis: move (e.g., with current focus moving unit 912) a current focus in the user interface along the first axis by an amount that is based on the magnitude of the first component of movement; and move (e.g., with current focus moving unit 912) the current focus in the user interface along the second axis by an amount that is based on the magnitude of the second component of movement, wherein the amount of movement of the current focus along the first axis is reduced relative to the amount of movement of the current focus along the second first by the scaling factor that is based on the rate of movement of the contact across touch-sensitive surface unit 914.

In some embodiments, in accordance with a determination that a speed of the contact move (e.g., with current focus moving unit 912) across touch-sensitive surface unit 914 satisfies one or more movement-component reduction criteria, a first scaling factor is used as the scaling factor; and, in accordance with a determination that the speed of the contact move (e.g., with current focus moving unit 912) across touch-sensitive surface unit 914 does not satisfy the one or more movement-component reduction criteria, a second scaling factor, that is lower than the first scaling factor, is used as the scaling factor.

In some embodiments, the speed of the contact move (e.g., with current focus moving unit 912) across touch-sensitive surface unit 914 is determined at each detection time of a sequence of detection times based on the movement of the contact between the detection time and an immediately preceding detection time.

In some embodiments, the second scaling factor is determined in accordance with the speed of the contact across touch-sensitive surface unit 914.

In some embodiments, the scaling factor increases as the speed of the contact across touch-sensitive surface unit 914 increases.

In some embodiments, the first axis is a dominant axis of the movement of the contact across touch-sensitive surface unit 914.

In some embodiments, the first axis is determined as the dominant axis based in part on a number of prior swipe gestures along the first axis.

In some embodiments, the first axis is a horizontal axis and the second axis is a vertical axis.

The operations in the information processing methods described above are, optionally implemented by running one or more functional modules in information processing apparatus such as general purpose processors (e.g., as described above with respect to FIGS. 1A and 3) or application specific chips.

Figure 10:
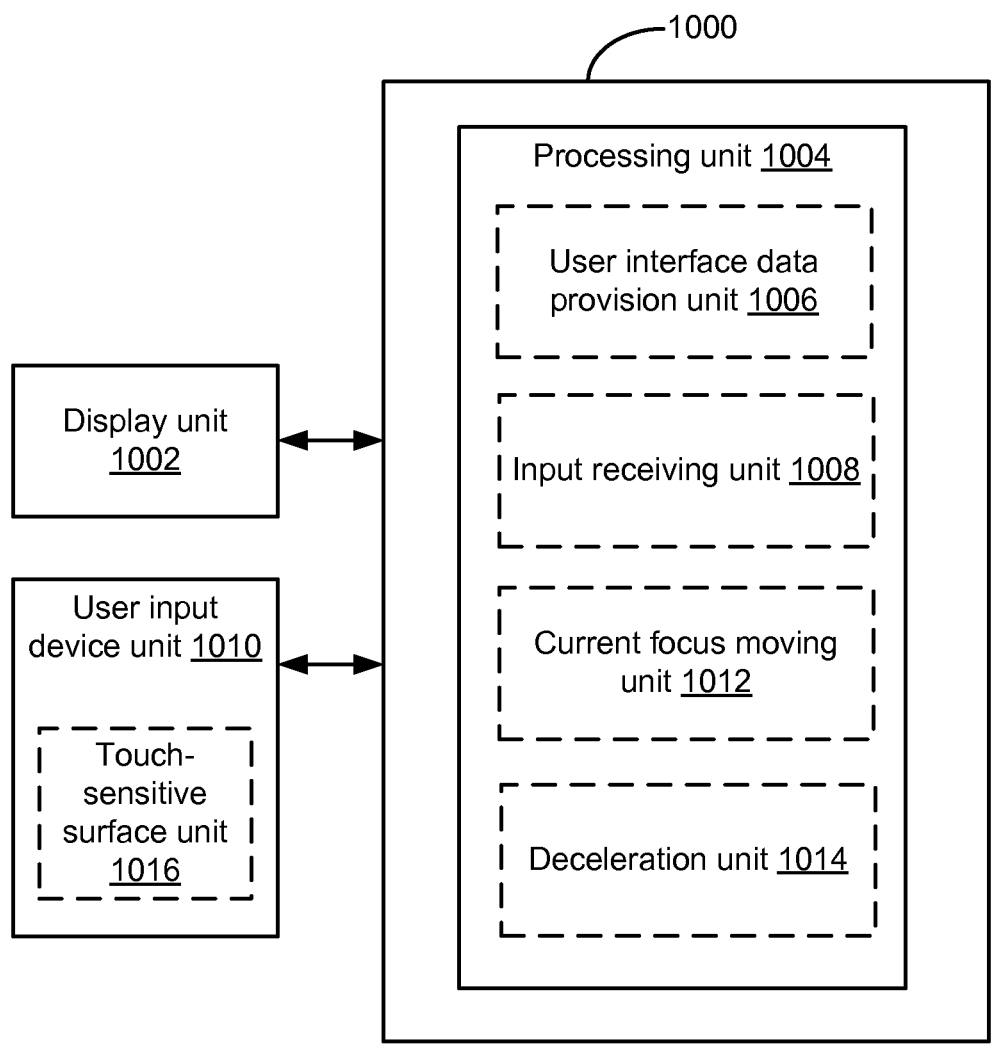

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, electronic device 1000 is in communication with display unit 1002 and user input device unit 1010 that includes touch-sensitive surface unit 1016. Display unit 1002 is configured to display user interfaces. User input device unit 1010 is configured to detect user inputs. Electronic device 1000 includes processing unit 1004. In some embodiments, processing unit 1004 includes user interface data provision unit 1006, input receiving unit 1008, current focus moving unit 1012, and deceleration unit 1014 in accordance with some embodiments.

Processing unit 1004 is configured to provide, to display unit 1002 (e.g., using user interface data provision unit 1006), data to present a user interface that includes: a plurality of user interface objects, and a current focus on a first user interface object of the plurality of user interface objects. While display unit 1002 (e.g., using user interface data provision unit 1006) is presenting the user interface, processing unit 1004 is configured to receive (e.g. with input receiving unit 1008 or, optionally in conjunction with remote user input device unit 1010) an input that corresponds to a gesture detected on touch-sensitive surface unit 1016 of user input device unit 1010. The gesture includes a movement of a contact across touch-sensitive surface unit 1016 followed by a lift-off of the contact from touch-sensitive surface unit 1016. The gesture includes a characteristic movement distance and a characteristic movement speed. Processing unit 1004 is configured to, in accordance with a determination that the gesture satisfies coasting criteria: move (e.g., with current focus moving unit 1012) the current focus in the user interface; and, decelerate (e.g., with deceleration unit 1014) movement of the current focus across the series of user interface objects at a first deceleration rate that is based on the characteristic movement distance of the gesture, and the characteristic movement speed of the gesture.

In some embodiments, prior to decelerating (e.g., with deceleration unit 1014) the movement of the current focus, in accordance with the determination that the gesture satisfies the coasting criteria, the current focus moves on display unit 1002 (e.g., using user interface data provision unit 1006) at a speed that corresponds to the speed of movement of the contact at an end of the gesture.

In some embodiments, processing unit 1004 is configured to, in accordance with a determination that a movement metric based on both the distance of the characteristic movement distance of the gesture and the characteristic movement speed of the gesture satisfies a first movement-metric threshold, decelerate (e.g., with deceleration unit 1014) movement of the current focus across the series of user interface objects using a first deceleration rate.

In some embodiments, processing unit 1004 is configured to, in accordance with a determination that the movement metric based on both the characteristic movement distance of the gesture across touch-sensitive surface unit 1016 and the characteristic movement speed of the gesture satisfies a second movement-metric threshold, decelerate (e.g., with deceleration unit 1014) movement of the current focus across the series of user interface objects using a second deceleration rate that is distinct from the first deceleration rate.

In some embodiments, processing unit 1004 is configured to, in accordance with a determination that the movement metric based on both of the characteristic movement distance of the gesture and the characteristic movement speed of the gesture meets movement-metric criteria based on the first movement-metric threshold and the second movement-metric threshold, decelerate (e.g., with deceleration unit 1014) movement of the current focus across the series of user interface objects using a third deceleration rate that is distinct from the first deceleration rate and the second deceleration rate.

In some embodiments, processing unit 1004 is configured to, in accordance with a determination that the gesture satisfies distance criteria, distinct from the coasting criteria, move (e.g., with current focus moving unit 1012) the current focus from the first user interface object contact across touch-sensitive surface unit 1016 to a user interface object that is adjacent to the first user interface object.

In some embodiments, processing unit 1004 is configured to, in accordance with a determination that the current focus is on a user interface object that is adjacent to the first user interface object when the contact lifts off of touch-sensitive surface unit 1016, maintain (e.g., with current focus moving unit 1012) the current focus on the user interface object that is adjacent to the first user interface object, independent of the terminal speed of the contact.

In some embodiments, the input includes an input portion that corresponds to movement of a contact across touch-sensitive surface unit 1016, and in response to receiving (e.g. with input receiving unit 1008 or, optionally in conjunction with remote user input device unit 1010) the first input portion, processing unit 1004 is configured to move (e.g., with current focus moving unit 1012) the current focus in the user interface in accordance with the movement of the contact; and after moving (e.g., with current focus moving unit 1012) the current focus in the user interface in accordance with the movement of the contact in the first input portion, processing unit 1004 is configured to detect a second input portion of the input that corresponds to a liftoff of the contact from touch-sensitive surface unit 1016, where the contact has the characteristic movement distance and the characteristic movement speed. At least a portion of the movement of the current focus and the deceleration of the movement of the current focus occurs after detecting liftoff of the contact.

The operations in the information processing methods described above are, optionally implemented by running one or more functional modules in information processing apparatus such as general purpose processors (e.g., as described above with respect to FIGS. 1A and 3) or application specific chips.

Figure 11:
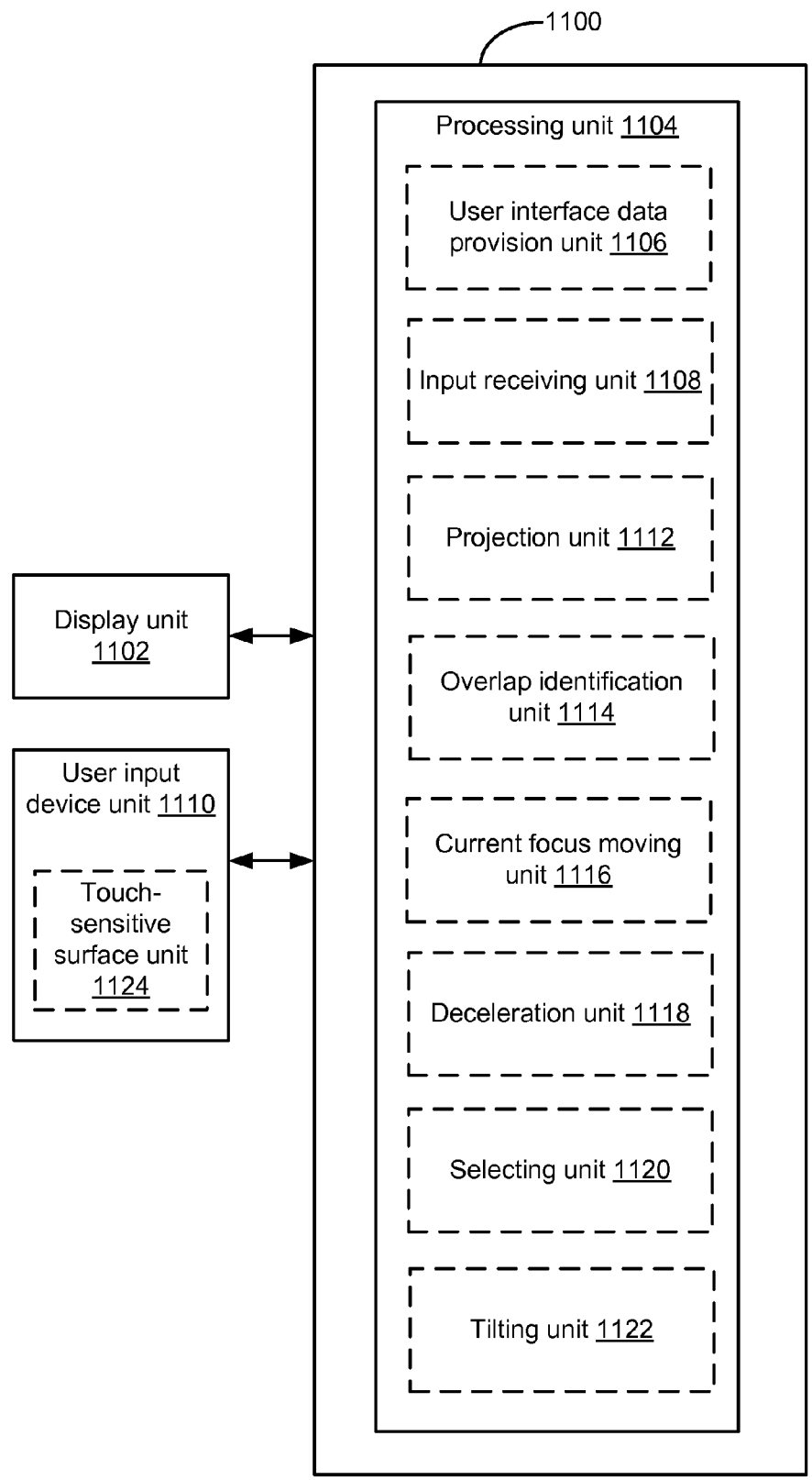

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, electronic device 1100 is in communication with display unit 1102 and user input device unit 1110 that includes touch-sensitive surface unit 1124. Display unit 1102 is configured to display user interfaces. User input device unit 1110 is configured to detect user inputs. Electronic device 1100 includes processing unit 1104. In some embodiments, processing unit 1104 includes user interface data provision unit 1106, input receiving unit 1108, projection unit 1112, overlap identification unit 1114, current focus moving unit 1116, deceleration unit 1118, selecting unit 1120, and tilting unit 1122, in accordance with some embodiments.

Processing unit 1104 is configured to provide, to display unit 1102 (e.g., using user interface data provision unit 1106), data to present a user interface that includes: a plurality of user interface objects. The plurality of user interface objects includes a first group of user interface objects and a second group of user interface objects; and the first group of user interface objects includes at least a first user interface object. The user interface also includes a current focus on the first user interface object of the first group of user interface objects.

While display unit 1102 (e.g., using user interface data provision unit 1106) is presenting the user interface that includes the plurality of user interface objects, processing unit 1104 is configured to receive (e.g. with input receiving unit 1108 or, optionally in conjunction with user input device unit 1110) a first input that corresponds to a first user input on user input device unit 1110. In response to receiving the first input and in accordance with a determination that the first user input on user input device unit 1110 corresponds to a request to move the current focus to a user interface object in the second group of user interface objects:

processing unit 1104 is configured to (a) determine a projection (e.g., with projection unit 1112) of the first user interface object in a direction on display unit 1102 that corresponds to a direction of the first user input on user input device unit 1110; (b) identify (e.g., with overlap identification unit 1114) one or more user interface objects that overlap with the projection of the first user interface object in the direction on display unit 1102 that corresponds to the direction of the first user input on user input device unit 1110; and (c) move (e.g., with current focus moving unit 1116) the current focus to a second user interface object of the one or more identified user input objects.

In some embodiments, processing unit 1104 is configured to, in response to receiving the first input and in accordance with the determination that the first user input on user input device unit 1110 corresponds to a request to move the current focus to a user interface object in the second group of user interface objects, select (e.g., with selecting unit 1120) the second user interface object of the one or more identified user interface objects as a destination of the current focus.

In some embodiments, the second user interface object of the one or more identified user interface objects is selected (e.g., with selecting unit 1120) based on a distance between the first user interface object and the second user interface object.

In some embodiments, the second user interface object of the one or more identified user interface objects is selected (e.g., with selecting unit 1120) as a destination of the current focus in response to the first user input.

In some embodiments, the first group of user interface objects corresponds to user interface objects of a first type, and the second group of user interface objects corresponds to user interface objects of a second type that is distinct from the first type.

In some embodiments, the first group of user interface objects is arranged in a first sequence; the first user interface object is located at a position other than a first position in the first sequence; the second group of user interface objects is arranged in a second sequence; the second user interface object is located at a position, in the second sequence, that is distinct from the position of the first user interface object in the first sequence; and processing unit 1104 is configured to, after moving the current focus to the second user interface object, while the current focus is on the second user interface object of the second group of user interface objects, receive (e.g. with input receiving unit 1108, and/or optionally in conjunction with user input device unit 1110) a second input that corresponds to a second user input on user input device unit 1110. In response to receiving the second input and in accordance with a determination that the second user input on user input device unit 1110 corresponds to a request to move (e.g., with current focus moving unit 1116) the current focus to a user interface object in the first group of user interface objects, processing unit 1104 is configured to move (e.g., with current focus moving unit 1116) the current focus back to the first user interface object.

In some embodiments, user input device unit 1110 is a user input device that includes a touch-sensitive surface; and the first user input includes a movement of a contact across touch-sensitive surface unit 1124.

In some embodiments, processing unit 1104 is configured to: determine whether the movement of the contact exceeds predefined movement criteria; and, in response to determining that a distance of the movement of the contact exceeds the predefined movement criteria: move (e.g., with current focus moving unit 1116) the current focus to the second user interface object; and tilt (e.g., with tilting unit 1122) the second user interface object in accordance with a distance of the movement of the contact that exceeds the predefined movement criteria.

In some embodiments, the current focus moves (e.g., with current focus moving unit 1116) to the second user interface object in accordance with a scaled movement of the contact across touch-sensitive surface unit 1124.

The operations in the information processing methods described above are, optionally implemented by running one or more functional modules in information processing apparatus such as general purpose processors (e.g., as described above with respect to FIGS. 1A and 3) or application specific chips.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with one or more processors and memory, wherein the electronic device is in communication with a display and a user input device that includes a touch-sensitive surface:
providing, to the display, data to present a user interface that includes:
a plurality of user interface objects, and
a current focus on a first user interface object of the plurality of user interface objects;
while the display is presenting the user interface, receiving an input that corresponds to a gesture detected on the touch-sensitive surface of the user input device, wherein the gesture includes a movement of a contact across the touch-sensitive surface followed by a lift-off of the contact from the touch-sensitive surface, wherein the gesture includes a characteristic movement distance and a characteristic movement speed; and,
in accordance with a determination that the gesture satisfies coasting criteria:
moving the current focus in the user interface; and
decelerating movement of the current focus across the plurality of user interface objects at a first deceleration rate that is based on:
the characteristic movement distance of the gesture, and
the characteristic movement speed of the gesture.

2. The method of claim 1, wherein, prior to decelerating the movement of the current focus, in accordance with the determination that the gesture satisfies the coasting criteria, the current focus moves on the display at a speed that corresponds to the speed of movement of the contact at an end of the gesture.

3. The method of claim 1, including:
in accordance with a determination that a movement metric based on both the distance of the characteristic movement distance of the gesture and the characteristic movement speed of the gesture satisfies a first movement-metric threshold, decelerating movement of the current focus across the series of user interface objects using a first deceleration rate.

4. The method of claim 3, including:
in accordance with a determination that the movement metric based on both the characteristic movement distance of the gesture across the touch-sensitive surface and the characteristic movement speed of the gesture satisfies a second movement-metric threshold, decelerating movement of the current focus across the series of user interface objects using a second deceleration rate that is distinct from the first deceleration rate.

5. The method of claim 4, including:
in accordance with a determination that the movement metric based on both of the characteristic movement distance of the gesture and the characteristic movement speed of the gesture meets movement-metric criteria based on the first movement-metric threshold and the second movement-metric threshold, decelerating movement of the current focus across the series of user interface objects using a third deceleration rate that is distinct from the first deceleration rate and the second deceleration rate.

6. The method of claim 1, including:
in accordance with a determination that the gesture satisfies distance criteria, distinct from the coasting criteria, moving the current focus from the first user interface object to a user interface object that is adjacent to the first user interface object.

7. The method of claim 1, including:
in accordance with a determination that the current focus is on a user interface object that is adjacent to the first user interface object when the contact lifts off of the touch-sensitive surface, maintaining the current focus on the user interface object that is adjacent to the first user interface object, independent of a terminal speed of the contact.

8. The method of claim 1, wherein:
the input includes an input portion that corresponds to movement of a contact across the touch-sensitive surface; and
the method includes:
in response to receiving the first input portion, moving the current focus in the user interface in accordance with the movement of the contact; and
after moving the current focus in the user interface in accordance with the movement of the contact in the first input portion, detecting a second input portion of the input that corresponds to a liftoff of the contact from the touch-sensitive surface, where the contact has the characteristic movement distance and the characteristic movement speed,
wherein at least a portion of the movement of the current focus and the deceleration of the movement of the current focus occurs after detecting liftoff of the contact.

9. An electronic device that is in communication with a display and a user input device that includes a touch-sensitive surface, the electronic device comprising:
one or more processors;
memory; and
one or more programs, wherein the one or more programs are stored in the memory and configured to be executed by the one or more processors, the one or more programs including instructions for:
providing, to the display, data to present a user interface that includes:
a plurality of user interface objects, and
a current focus on a first user interface object of the plurality of user interface objects;
while the display is presenting the user interface, receiving an input that corresponds to a gesture detected on the touch-sensitive surface of the user input device, wherein the gesture includes a movement of a contact across the touch-sensitive surface followed by a lift-off of the contact from the touch-sensitive surface, wherein the gesture includes a characteristic movement distance and a characteristic movement speed; and,
in accordance with a determination that the gesture satisfies coasting criteria:
moving the current focus in the user interface; and,
decelerating movement of the current focus across the series of user interface objects at a first deceleration rate that is based on:
the characteristic movement distance of the gesture, and
the characteristic movement speed of the gesture.

10. A non-transitory computer readable storage medium storing one or more programs, the one or more programs comprising instructions which, when executed by an electronic device that is in communication with a display and a user input device that includes a touch-sensitive surface, cause the electric device to:
provide, to the display, data to present a user interface that includes:
a plurality of user interface objects, and
a current focus on a first user interface object of the plurality of user interface objects;
while the display is presenting the user interface, receive an input that corresponds to a gesture detected on the touch-sensitive surface of the user input device, wherein the gesture includes a movement of a contact across the touch-sensitive surface followed by a lift-off of the contact from the touch-sensitive surface, wherein the gesture includes a characteristic movement distance and a characteristic movement speed; and,
in accordance with a determination that the gesture satisfies coasting criteria:
move the current focus in the user interface; and,
decelerate movement of the current focus across the series of user interface objects at a first deceleration rate that is based on:
the characteristic movement distance of the gesture, and
the characteristic movement speed of the gesture.

11. The electronic device of claim 9, wherein, prior to decelerating the movement of the current focus, in accordance with the determination that the gesture satisfies the coasting criteria, the current focus moves on the display at a speed that corresponds to the speed of movement of the contact at an end of the gesture.

12. The electronic device of claim 9, including instructions for:
in accordance with a determination that a movement metric based on both the distance of the characteristic movement distance of the gesture and the characteristic movement speed of the gesture satisfies a first movement-metric threshold, decelerating movement of the current focus across the series of user interface objects using a first deceleration rate.

13. The electronic device of claim 12, including instructions for:
in accordance with a determination that the movement metric based on both the characteristic movement distance of the gesture across the touch-sensitive surface and the characteristic movement speed of the gesture satisfies a second movement-metric threshold, decelerating movement of the current focus across the series of user interface objects using a second deceleration rate that is distinct from the first deceleration rate.

14. The electronic device of claim 13, including instructions for:
in accordance with a determination that the movement metric based on both of the characteristic movement distance of the gesture and the characteristic movement speed of the gesture meets movement-metric criteria based on the first movement-metric threshold and the second movement-metric threshold, decelerating movement of the current focus across the series of user interface objects using a third deceleration rate that is distinct from the first deceleration rate and the second deceleration rate.

15. The electronic device of claim 9, including instructions for:
in accordance with a determination that the gesture satisfies distance criteria, distinct from the coasting criteria, moving the current focus from the first user interface object to a user interface object that is adjacent to the first user interface object.

16. The electronic device of claim 9, including instructions for:
in accordance with a determination that the current focus is on a user interface object that is adjacent to the first user interface object when the contact lifts off of the touch-sensitive surface, maintaining the current focus on the user interface object that is adjacent to the first user interface object, independent of a terminal speed of the contact.

17. The electronic device of claim 9, wherein:
the input includes an input portion that corresponds to movement of a contact across the touch-sensitive surface; and
the electronic device includes instructions for:
in response to receiving the first input portion, moving the current focus in the user interface in accordance with the movement of the contact; and
after moving the current focus in the user interface in accordance with the movement of the contact in the first input portion, detecting a second input portion of the input that corresponds to a liftoff of the contact from the touch-sensitive surface, where the contact has the characteristic movement distance and the characteristic movement speed,
wherein at least a portion of the movement of the current focus and the deceleration of the movement of the current focus occurs after detecting liftoff of the contact.

18. The computer readable storage medium of claim 10, wherein, prior to decelerating the movement of the current focus, in accordance with the determination that the gesture satisfies the coasting criteria, the current focus moves on the display at a speed that corresponds to the speed of movement of the contact at an end of the gesture.

19. The computer readable storage medium of claim 10, including instructions which, when executed by the electronic device, cause the electronic device to:
in accordance with a determination that a movement metric based on both the distance of the characteristic movement distance of the gesture and the characteristic movement speed of the gesture satisfies a first movement-metric threshold, decelerate movement of the current focus across the series of user interface objects using a first deceleration rate.

20. The computer readable storage medium of claim 19, including instructions which, when executed by the electronic device, cause the electronic device to:
in accordance with a determination that the movement metric based on both the characteristic movement distance of the gesture across the touch-sensitive surface and the characteristic movement speed of the gesture satisfies a second movement-metric threshold, decelerate movement of the current focus across the series of user interface objects using a second deceleration rate that is distinct from the first deceleration rate.

21. The computer readable storage medium of claim 20, including instructions which, when executed by the electronic device, cause the electronic device to:
in accordance with a determination that the movement metric based on both of the characteristic movement distance of the gesture and the characteristic movement speed of the gesture meets movement-metric criteria based on the first movement-metric threshold and the second movement-metric threshold, decelerate movement of the current focus across the series of user interface objects using a third deceleration rate that is distinct from the first deceleration rate and the second deceleration rate.

22. The computer readable storage medium of claim 10, including instructions which, when executed by the electronic device, cause the electronic device to:
in accordance with a determination that the gesture satisfies distance criteria, distinct from the coasting criteria, move the current focus from the first user interface object to a user interface object that is adjacent to the first user interface object.

23. The computer readable storage medium of claim 10, including instructions which, when executed by the electronic device, cause the electronic device to:
in accordance with a determination that the current focus is on a user interface object that is adjacent to the first user interface object when the contact lifts off of the touch-sensitive surface, maintain the current focus on the user interface object that is adjacent to the first user interface object, independent of a terminal speed of the contact.

24. The computer readable storage medium of claim 10, wherein:
the input includes an input portion that corresponds to movement of a contact across the touch-sensitive surface; and
the computer readable storage medium includes instructions which, when executed by the electronic device, cause the electronic device to:
in response to receiving the first input portion, move the current focus in the user interface in accordance with the movement of the contact; and
after moving the current focus in the user interface in accordance with the movement of the contact in the first input portion, detect a second input portion of the input that corresponds to a liftoff of the contact from the touch-sensitive surface, where the contact has the characteristic movement distance and the characteristic movement speed,
wherein at least a portion of the movement of the current focus and the deceleration of the movement of the current focus occurs after detecting liftoff of the contact.

* * * * *